US005649099A

United States Patent [19]

Theimer et al.

[11] Patent Number: 5,649,099

[45] Date of Patent: Jul. 15, 1997

[54] METHOD FOR DELEGATING ACCESS RIGHTS THROUGH EXECUTABLE ACCESS CONTROL PROGRAM WITHOUT DELEGATING ACCESS RIGHTS NOT IN A SPECIFICATION TO ANY INTERMEDIARY NOR COMPRISING SERVER SECURITY

[75] Inventors: Marvin M. Theimer; David A. Nichols, both of Mountain View; Douglas B. Terry, San Carlos, all of Calif.

[73] Assignee: Xerox Corporation, Stamford, Conn.

[21] Appl. No.: 71,649

[22] Filed: Jun. 4, 1993

[51] Int. Cl.$^6$ .......... G06F 13/00

[52] U.S. Cl. .......... 395/187.01; 395/186; 395/200.03; 395/490; 395/491; 395/684

[58] Field of Search .......... 395/725, 650, 395/600, 700, 187.01, 186, 200.03, 490, 491, 684; 380/23, 4; 370/60

[56] References Cited

U.S. PATENT DOCUMENTS 5,210,795 5/1993 Lipner et al. .......... 380/23

OTHER PUBLICATIONS

Eichin and Rochlis, "With Microscope and Tweezers: An Analysis of the Internet Virus of Nov. 1988", 1989, pp. 326–343.

J. E. Donnelley et al. "Resource Access Control in a Network Operating System," Univ. of CA, Lawrence Livermore Lab. pp. 115–125.

R. M. Needham et al. "Using Encryption for Authentication in Large Networks of Computers," *Communications of the ACM,* Dec. 1978, vol. 21, No. 12 pp. 993–999.

D. E. R. Denning "Cryptography and Data Security," (excerpts) '82, pp. 7–16, 56–58, 101–126, 129–133, 161–179, 187–190, 191–329.

Russel Sandberg et al. "Design and Implementation of the Sun Network Filesystem," USENIX Association Summer Conference Proc. Portland, 1985, Jun. 11–14,1985, pp. 119–130.

A. S. Tanenbaum "Using Sparse Capabilities in a Distributed Operating System," The 6th Intl. Conf. on Distributed Computing Systems, Cambridge, Mass., May 19–23, 1986, pp. 558–563.

Richard Stallman "GNU Emacs Manual," Fifth Edition, Emacs Ver. 18, Oct. 1986.

Xerox, "Authentication Protocol," Xerox System Integration Standard, May 1986.

James Gosling "SUNDEW: A Distributed and Extensible Window Sys.," USENIX, '86 Winter USNIX TECH. CONF., Colorado pp. 98–103.

J. G. Steiner "Kerberos: An Authentication Service for Open Network Syst." USENIX Winter Conf. Feb. 9–12, '88, TX, pp. 191–202.

B.N. Bershad "Watchdogs: Extending the UNIX File System," USENIX Winter Conference Feb. 9–12, 1988, Texas pp. 267–275.

J.W. Stamos et al. "Remote Evaluation," ACM Trans. on Programming Languages and Systems, vol. 12, No. 4, Oct. 1990 pp. 537–565.

K. R. Sollins "Cascaded Authentication," Proceedings 1988 IEEE Symposium on Security and Privacy Apr. 18–21, '88, CA pp. 156–163.

(List continued on next page.)

*Primary Examiner*—Lance Leonard Barry, Esq.
*Assistant Examiner*—Le Hien Luu
*Attorney, Agent, or Firm*—Alexander E. Silverman

[57] ABSTRACT

A method in which access control programs (ACPs) permit controlled delegation of access rights from clients to untrusted intermediaries. ACPs are programs that encode arbitrary specifications of delegated access rights. In the method, a client creates an ACP and associates it with a request to a server, the request being made through one or more intermediaries. When processing a request received from an intermediary, the server executes the access control program to determine whether or not to grant the request.

36 Claims, 10 Drawing Sheets

OTHER PUBLICATIONS

J. H. Howard et al. "Scale and Performance in a Distributed File System," ACM Transactions on Computer Systems, vol. 6, No. 1, Feb. 1988, pp. 51–81.

M. Satyanarayanan "Integrating Security in a Large Distributed System," ACM Transactions on Computer Systems, vol. 7, No. 3, Aug. 1989, pp. 247–280.

Morrie Gasser et al. "An Architecture for Practical Delegation in a Distributed System," CH2884–5/90/0000/0020$01.00 © 1990 IEEE pp. 20–30.

J. K. Ousterhout "Tel: An Embeddable Command Language," USENIX Association of the Winter 1990 USENIX Conference, Jan. 22–26, 1990, Washington, D.C., USA pp. 133–146.

SunOS™ Reference Manual, Sun Microsystems, (excerpts) Comm. Commands, Misc. Ref. Man. Pages, Chapt. 1, 4, 8 and 14.

$$M_1 = op_0(obj, \ldots), <P>^{I_0}$$
$$M_2 = op_1(obj, \ldots), <P>^{I_0}$$

$$M = op(obj, \ldots), <P_0>^{I_0}, <P_1>^{I_1}, \ldots <P_{n-1}>^{I_{n-1}}$$

METHOD FOR DELEGATING ACCESS RIGHTS THROUGH EXECUTABLE ACCESS CONTROL PROGRAM WITHOUT DELEGATING ACCESS RIGHTS NOT IN A SPECIFICATION TO ANY INTERMEDIARY NOR COMPRISING SERVER SECURITY

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

Software Appendix

An appendix comprising two printed files is included as part of this application. The first file is entitled "Diffs," and is 28 pages long plus a cover sheet. It represents the differences in source code between release 3 of the Andrew File System (as it appeared on the Aug. 19, 1990 Mt. Xinu release tape of the Mach operating system) and a modified version of release 3 of the Andrew File System, described below, that embodies the method of the present invention. The second file is entitled "TCLDiffs" and is 25 pages long plus a cover sheet. It represents the differences in source code between release 3.3 of Tool Command Language and a version of Tool Command Language modified from release 3.3 to support the embodiment of the invention in the modified version of the Andrew File System as described below. The modifications made to Andrew File System release 3 and Tool Command Language release 3.3 in order to produce the embodiment of the present invention in the modified version of the Andrew File System as described below represent unpublished work, Copyright © 1991 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

BACKGROUND OF THE INVENTION

The present invention relates to computing systems and more particularly to client-server systems, including but not limited to distributed client-server systems.

In a distributed client-server system, a client program often requires an intermediary to perform an operation on some server. The intermediary must be able to convince the server that it is operating on behalf of the client and hence that it should be granted the right to perform the requested operation. Furthermore, to limit exposure to untrusted intermediaries, the client will want to grant to the intermediary only that subset of its rights that are necessary for completing the requested operation.

An example of such a situation is the use of a print server to print a file that resides on a file server. The initiating user would like to grant the print server access to the file to be printed so that it can directly retrieve the file from the file server. However, the user would like to prevent the print server from being able to retrieve any other files. The user might also wish to place a time limit on how long the print server has access rights to the file.

A second example is remote compilation on a compute server. The compute server must be given read access to all the relevant source files. It should also be permitted to create or overwrite the relevant object files while being prevented from modifying source files. Additionally, suppose the compute server does a recompilation as a set of parallel tasks, each running on a separate machine. Then the server will want to delegate some of the rights it has acquired to other hosts that are performing subtasks.

This example can be further complicated if the files and directories involved are owned by someone other than the user who is invoking the compilation. The user (e.g., as member of a group) may have permission to read and write various files in a directory, but may lack permission to modify the access controls of those files or the directory they are in. Hence it may not even be possible for the user to delegate access rights to a third party.

A more application-specific example is a self-paced course in which students submit their homework assignments by creating a file in a well-known directory. The solutions to each homework assignment also reside in files in that directory; however, each student should only be given access to the solutions after they have handed in their answers for that assignment. The access control specification in this case is that only students in the class may read or write files in the directory, no student in the class may read a solution file without having already written a corresponding homework file and no student may write any given homework file more than once.

Finally, one may wish to limit access to resources that can be subdivided, such as electronic funds. This implies being able to specify quantitative limits on resources for which access rights have been delegated.

Techniques proposed in the prior art for granting/delegating access control have centered around access control lists and capability schemes. Access control lists (ACLs) are lists of (name, access right) tuples. Such lists may be implemented as bit tables, linked lists, or other suitable data structures. Servers maintain ACLs and use them to decide whether or not to grant any given access request. Capability schemes are based on capability tokens that servers hand out to clients. A requestor, such as an intermediary between a client and a server, presents a capability token along with an access request to prove that the requestor has the right to make the request of the server.

Both ACL- and capability-based systems provide ways for a client to delegate its access rights to an intermediary, but provide only limited facilities for restricting the rights granted to the intermediary. ACL-based systems can deal with restricted delegation by allowing the creation of roles, which explicitly represent the entity to whom a restricted set of access rights is being delegated. Capability-based systems enable restricted delegation by either handing out multiple tokens or by handing out tokens that can be securely subsetted to a certain degree. Both of these approaches to restricted delegation depend on servers' having an explicit understanding of all access controls: Concepts such as restrictions over file types, access time limits, the homework example restrictions, or resource quotas must be implemented at the servers. Servers must know in advance of any client requests all the various access rights and restrictions that clients may want to delegate.

With either ACL- or capability-based systems, if a client wishes to enforce access controls that are not understood by the server(s) available to him, he has only one option, namely, to use or build other servers. For example, consider a distributed file system that does not ordinarily support access time limits. An example is the Unix distributed file system known as NFS, which is described, for example, in Russell Sandberg, David Goldberg, Steve Kleiman, Dan Walsh, and Bob Lyon, "Design and Implementation of the Sun Network File System," in *Proceedings of the Summer 1985 USENIX Conference* (Portland, Ore., June 1985) at 119–130. To build a print service that understands access time limits on NFS files requires that a new print server be built that both understands time-limit-based access controls and is trusted with access to all NFS files that any clients might wish to print. Similarly, to implement the homework example on top of prior art file servers (or any file servers whose access controls lack the concepts necessary to express the homework constraints) requires that someone build a "homework server." Furthermore, students' ability to hand their homework in and receive solution sets back depends on the availability of this homework server.

To better understand the limitations of the prior art, it is helpful to consider an analogy. Suppose that a movie theater shows ten different movies. Some are suitable for viewers of all ages, while others are suitable only for adults. Like most movie theaters, this theater sells tickets separately for each individual movie. A patron who holds a ticket for, say, "Gone With the Wind," is thereby entitled to see "Gone With the Wind" but is not entitled to see "Jaws" or "Unforgiven" or any other movie playing at the theater.

Now suppose that a parent wishes to send her child, who is thirteen years old and not to be trusted, to see a movie unaccompanied. The parent wants the child to see only "Grated" movies, that is, movies deemed suitable for viewers of all ages, and no other movies. She is concerned that if she simply gives the child money to purchase a ticket, left to his own devices the child (possibly with the assistance of an adult or older teenager posing as his "guardian") will purchase a ticket to an "R-rated" movie intended for more mature viewers. Thus the parent runs the risk that if she tells her child to go see "Bambi," the child will sneak in to see "Basic Instinct." What the parent really wants is to be able to purchase in advance, and give to her child, a movie ticket redeemable for access to any G-rated movie and for no other movies. Unfortunately the movie theater does not sell such tickets. Short of persuading the movie theater to change its ticket-selling policies, the parent is stuck with either having to accompany her child to the theater or else running the risk that the child will disobey her.

It can be seen that the parent is analogous to a client program, the child to an intermediary, the movie theater to a server, and the movie ticket to a capabilities token in a capability-based system. The parent-client is stuck with the kind of tickets that the theater-server sells, and cannot order a custom-made ticket that would allow her to grant some independence to her intermediary-child while simultaneously maintaining a certain measure of control over the intermediary-child's behavior. The system provides no straightforward way for a client to design a restricted set of access privileges, e.g., at run time, and delegate these to a potentially untrustworthy intermediary.

What is needed as an alternative to embedding an ever-increasing multitude of access control concepts into each server or building an ever-increasing set of application-specific "front-end" servers is to provide clients and servers with a language with which they can dynamically build generalized capabilities and define application-specific access rights at the time those rights are to be delegated.

SUMMARY OF THE INVENTION

The present invention provides a method for delegation in client-server systems that is based on client-manufactured access control programs (ACPs) that can encode arbitrarily general access rights specifications. According to one aspect of the invention, an intermediary making a request of a server on behalf of a client presents an appropriate client-created ACP along with the request. The server executes the ACP to determine whether or not the requestor—that is, the intermediary—has been granted by the client the right to make the given request. If and only if the requestor has been granted the right to make the given request does the server carry out the request. In another aspect of the invention, two or more intermediaries stand between the client and server. Each intermediary creates its own additional ACP in order to delegate some or all the rights it has to the next intermediary in the chain. The server checks all the ACPs before carrying out a request issued by the last intermediary in the chain.

An important advantage of the method of the present invention is that a wide range of applications and access control schemes can be built on top of any server that implements an ACP interpreter and a relatively small number of access control concepts. Another advantage is that the method finds applicability in distributed and nondistributed systems. Still another advantage is that ACPs can be digitally signed to prevent their forgery, thus allowing them to be freely passed around or even published. A further understanding of the nature and advantages of the present invention may be realized by reference to the remaining portions of the specification and the drawings.

DESCRIPTION OF SPECIFIC EMBODIMENTS

Figure 1A:
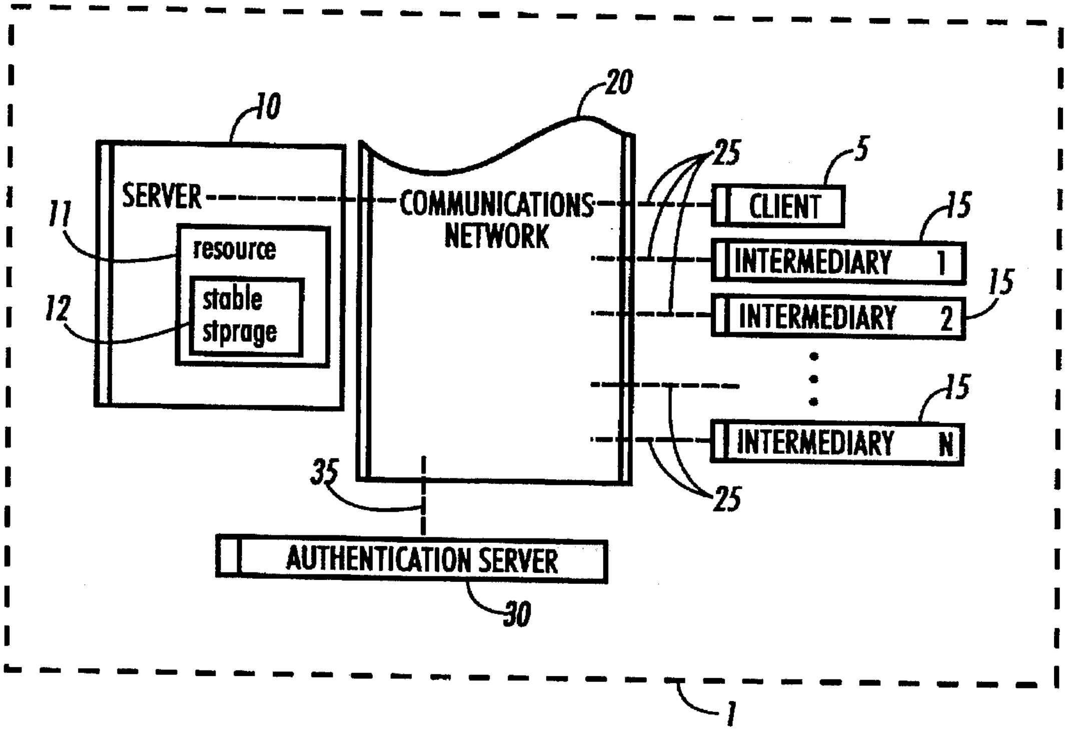
FIG. 1A schematically depicts a client-server system suitable to the method of the present invention.

The disclosures in this application of all articles and references, including patent documents, are incorporated herein by reference. Also incorporated by reference are sections 1C, 2V, and 3V of the *SUN Solaris* 1.1 *User Manual*, respectively for their descriptions of the Unix command rsh, the Unix command stat, and the Unix setuid facility.

1. Introduction

1.1 Overview and Design Considerations

To get an overview of ACPs, it is helpful to begin with some illustrative analogies. Returning for a moment to the movie theater analogy given earlier, recall that the parent wants to be able to give her child access to any G-rated movie but to no other movies. The parent would like to be able to purchase an advance ticket redeemable for G-rated movies. Better still, the parent would like to avoid the trouble of advance purchase. She would like to be able to write a check for the price of admission to the theater, say $7, with special instructions on the check as follows: "Sell my Child a ticket to a G-rated movie only; pay to Theater $7 for this purpose. Signed, Parent." The theater would accept this check in lieu of cash and give the child access to any G-rated film. Of course, the theater would first ask the child for identification, to be sure that the child was indeed the Child mentioned on the check. Also the theater would check Parent's signature to ensure that the check was not forged.

Translating this example to the client-server domain, the signed check with special instructions is analogous to an ACP of the present invention. The parent-client writes a "check"—an ACP—that grants the child-intermediary only those access rights that the parent-client specifically delegates. The child-intermediary presents the check to the theater-server, who confirms the child-intermediary's identity, verifies the parent-client's digital signature on the ACP, and then executes the ACP to determine whether to grant the child-intermediary access to a particular movie-resource.

In another analogy, consider a person who signs a power-of-attorney document. The power-of-attorney document delegates to an attorney certain rights to do on the person's behalf what the person could do for himself, for example, to draw funds from the person's bank account. Importantly, the person can delegate to the attorney only such rights as he actually has; he cannot, for example, give the attorney the right to draw funds from somebody else's bank account. The person signs the power-of-attorney document to prove that the document is genuine. When the attorney presents the document to a third party, such as a bank, the attorney also presents her own identification to show that the attorney is who she purports to be. It can be seen that the person is analogous to a client, the attorney to an intermediary, the bank to a server, the client's bank account to a resource controlled by the server, and the power-of-attorney document to an ACP. Before allowing the attorney-intermediary to draw funds, the bank-server confirms the attorney-intermediary's identity and authenticates the ACP by verifying the person-client's digital signature attached to the ACP. Thereafter the bank-server reads the power-of-attorney document-that is, executes the ACP. If all is in order, the bank-server then allows the attorney-intermediary to draw funds from the person-client's account-resource on the person-client's behalf.

Several considerations arise in the design of an architecture incorporating access control programs. These include: how ACPs are transmitted between the interested parties-that is, between the client, server, and intermediaries; how ACPs are used by the servers that receive them; how powerful the language that is used to write ACPs should be; how ACPs are revoked once issued; and how ACPs can be used to restrict the rights delegated by other ACPs. The following sections of the description address these considerations and also describe a specific embodiment of the invention that integrates ACPs into a particular file system called the Andrew File System.

1.2 Glossary

The following terms are intended to have the following general meanings:

AFS: "Andrew File System": a particular distributed file system.

Access Right: The right to obtain access to or use some resource. Examples: the right to obtain read access for a particular file; the right to execute a particular program. Synonyms: "right"; "privilege."

Access Control List: A list of access rights for a particular resource.

Access Control Program: A programmatic specification of access rights.

Authentication: The act of checking that something or someone is what they claim they are.

Authentication Server: A trusted program or machine that can authenticate various things and/or that can issue encrypted data items that others can use for authentication purposes.

Authentication Ticket: The encrypted data items that an authentication server provides to its clients for authentication purposes.

Capability: A token of some sort that can be used as proof of some access right.

Check (name, resource, request): A function used by a server in some embodiments of the present invention. This function checks whether the user or process whose name is "name" has access rights to "resource" that allow "request" to be performed on "resource".

Client: A program that desires access to some resource or operation controlled by a server.

Client Request: A request for access to some resource or operation that is controlled by a server.

Client-Server System: Any system in which resources are managed/controlled by server programs/processes and requests for access to and use of those resources are made by client programs/processes.

Communications Channel: A means by which two parties can reliably communicate with each other.

Create (resourceName, revocationName): A function that a client can request of a server that will create a revocation object with name "revocationName" for the server's resource named by "resourceName".

Destroy (revocationName): A function that a client can request of a server that will destroy an existing revocation object whose name is "revocationName". Only the client who created a revocation object may destroy it.

Digital Signature: A property private to a user or process that is used for signing sequences of data items. A digital signature for a sequence of data items is a unique data value that is a function of the private property and the sequence of data items to be signed.

Initiator: The original client of a request; the one who has access rights allowing the request without need for delegation of access rights from some other party.

Intermediary: Someone making a request on behalf of some other client. An intermediary must receive delegated access rights in order to successfully make a request to a server.

Intermediary Request: The request made by an intermediary on behalf of some other client.

Kerberos protocol: A particular authentication protocol.

Key: As in encryption key.

NFS: "Network File System"—a particular distributed file system.

Privilege: See "access right."

Revocation Object: An object controlled by a server that can be destroyed at the request of a client in order to invalidate all or part of an access control program that that client has created.

Right: See "access right."

Role: An artificial user identity that has been created in order to specify a specific set of access rights; for example, those pertaining to some particular job or administrative function.

rsh: A Unix command that executes a program on another machine from the one that "rsh" is invoked on.

Secure Channel: A communications channel whose contents cannot be monitored by third parties.

Server: A program that controls resources that various clients of a system may wish to use or gain access to.

Service Request: A request to a server for access to or use of some resource.

stat: A Unix system call that returns information about a particular file, including its last modification time and who may access it in what fashion.

Template: A prototype for an access control program, containing various fields that must be filled in with specific values in order to instantiate a specific access control program.

Thread of Computation: A specific sequence of computer instructions actually executed by a computer. A computer can interleave the execution of multiple threads of computation by running multiple programs "simultaneously".

2. The Method

2.1 System configuration

FIG. 1A illustrates a system configuration suitable to the method of the present invention. System 1 comprises client 5, server 10, and one or more intermediaries 15, all connected to one another via communications network 20 that comprises a plurality of channels 25. System 1 can in some embodiments further comprise additional servers, clients, and intermediaries (not shown). Server 10 manages a resource 11 to which client 5 has access rights. Client 5 wants to delegate some or all of these rights to one or more of the intermediaries 15.

Client 5, server 10, and intermediaries 15 are processes that execute on one or more computing nodes (not shown). Each process is a software entity that comprises an address space (or protection domain), one or more threads of execution, and possibly one or more input/output streams. Each node is a computer comprising memory and one or more processors. Typically, but not always, processes are associated one-to-one with nodes, so that each process executes on its own node. Threads need not be associated one-to-one with processors.

It is assumed that each process is protected from every other process. Thus where all the processes-client, server, and intermediaries-execute on a single node, each process has its own protected address space in the node's memory. Where different processes execute on different nodes, each node is assumed to have its own individual memory that cannot freely be accessed by other nodes.

The processes communicate with one another through communications network 20. Communications network 20 comprises channels 25 through which the various processes can communicate with one another. Where all the processes execute on a single node, the communications network is a set of interprocess communication links that also execute on the node. Where different processes execute on different nodes, the communications network comprises hardware links and software protocols through which the nodes can communicate with one another. The communications network can, for example, be a local area network or a wide area network and can, for example, incorporate wire, coaxial cable, fiber optic, or wireless hardware links. The communications network can provide for data encryption in some embodiments.

Server 10 can be any process that controls a resource shared by multiple processes. Without limitation server 10 can be, for example, a storage server, such as a file server or database server; an input/output server, such as a print server; a compute server or remote execution server, such as a supercomputer or mainframe that is shared by multiple users; or a process control server, such as a robot or computer-controlled manufacturing machine. Where the server is a storage server, the server can provide for data encryption in some embodiments.

Resource 11 can be anything upon which server 10 can perform operations on behalf of other processes. Thus, for example, if server 10 is a file server, resource 11 can be a file or a set or system of files; if server 10 is a print server, resource 11 can be a printer or a print queue; if server 10 is a compute server, resource 11 can be a compiler, graphics package, numerical simulation code, or any other program that the server can execute; if server 10 is a remote on-line banking computer, resource 11 can be a bank account; and so forth without limitation. Put another way, resource 11 is something that a client or intermediary can use, access, or do through server 10. It will further be appreciated that resource 11 can be one of a plurality of resources (not shown) controlled by server 10.

The bulk of the description given herein speaks as though system 1 comprises a single client, a single server, and one or more intermediaries, as depicted in FIG. 1A. Accordingly, the term "client" is most often used herein to indicate the process that issues an initial request, "server" to indicate the ultimate process that responds to the request, and "intermediary" to indicate a process situated between the client and the server. However, as noted above, system 1 can in some embodiments comprise multiple servers and clients, each communicating with the remainder of system 1 through communications network 20. Moreover, it will be appreciated that the terms "server," "client," and "intermediary" are in some sense relative terms, in that the same process can be viewed as a client with respect to one process, a server with respect to another, and an intermediary with respect to a third. For example, in a case in which a client issues a request to a server through a chain of several intermediaries, each intermediary other than the last one in the chain effectively stands in a client relationship to the server, and each intermediary other than the first one in the chain effectively stands in a server relationship to the client. As another example, consider once again the case in which a client, for instance a workstation, uses a print server to print a file that resides on a file server. In this example, the print server is an intermediary with respect to the client workstation, and the file server is the server. Now suppose that a later time the same client workstation wants to use the print server to print a different file that is stored locally by the print server, using certain header information to be supplied by a second workstation. Now the second workstation becomes the intermediary, and the print server is the ultimate server with respect to the client workstation.

In some embodiments, as is described more fully below, the invention contemplates the authentication of ACPs by means of digital signatures that can be verified by server 10. In other embodiments, to support ACP authentication system 1 further comprises an authentication server 30 that communicates with the rest of system 1 through communications network 20 via one or more secure channels 35. This is shown in FIG. 1A. Still other kinds of ACP authentication can be used within the scope of the invention.

In some embodiments, as is described more fully below, the invention contemplates two-party authentication, such that server 10 can identify or authenticate the client 5 and each intermediary 15. Authentication server 30 and its associated secure channels 35 can be included in system 1 for the purpose of two-party authentication, whether or not authentication server 30 is also used to support ACP authentication. Various other kinds of two-party authentication can also be used within the scope of the invention.

In some embodiments, as is described more fully below, the invention contemplates revocation objects associated with ACPs. In such embodiments, to support revocation objects server 10 has associated with it stable storage 12 that is accessible to server 10. "Stable" data storage is data storage wherein the stored data will survive a server failure, for example an unexpected loss of power to the server. Such storage is typically in the form of a disk file or nonvolatile medium. In embodiments where server 10 is a file server and the server's associated resource 11 is file storage, stable storage 12 can be part of, or the same as, resource 11. This is the situation shown in FIG. 1A. In other embodiments stable storage 12 can be separate and distinct from resource 11.

2.2 Requests

The present invention contemplates the use of ACPs in requests that involve a client, a server, and one or more intermediaries interposed between the client and server. It will be observed that the term "request" can be used in different ways. For example, in the case of a client that makes a request to a server via a single intermediary (or, put differently, the case of a single intermediary that makes a request on behalf of a client), the term "request" is used variously to refer to the client's request to the intermediary, the intermediary's request to the server, and to the overall request from the client to the server. In the case of a client that makes a request to a server via a chain of intermediaries (or, put differently, the case of a last-in-the-chain intermediary that makes an ultimate request of a server on behalf of the client and all preceding intermediaries in the chain), the term "request" is used to refer variously to the client's request to the first intermediary in the chain, the first intermediary's request to the second intermediary in the chain, and so on down the chain through the last intermediary's request to the server, as well as to the overall request from the client to the server.

Figure 1B:
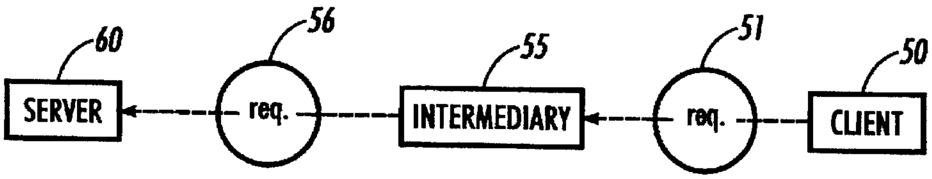
FIG. 1B schematically depicts a client request and an intermediary request that is also a service request.

In the case of the single intermediary, the term "client request" can be used more precisely to indicate the client's request to the intermediary, the term "intermediary request" to indicate the intermediary's request to the server, and the term "service request" to indicate the request received by the server, which in this case is the same as the intermediary request. This is illustrated in FIG. 1B. Client 50 issues request 51, which is a client request, to intermediary 55. In complying with client request 51, intermediary 55 issues its own request 56 to server 60. Request 56 is an intermediary request because it is issued by an intermediary. It is also a service request because it is received by a server.

Figure 1C:
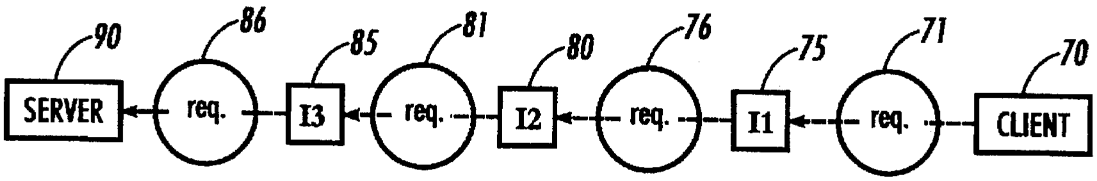
FIG. 1C schematically depicts a client request, a first intermediary request, and additional intermediary requests, the last of which is also a service request.

In the case of multiple intermediaries, the term "client request" can be used more precisely to indicate the client's request to the first intermediary, the term "intermediary request" to indicate any intermediary's request to another intermediary or to the server, the term "first intermediary request" to indicate the first intermediary's request to the second intermediary, the term "additional intermediary request" to indicate the second or a higher-numbered intermediary's request to the next intermediary in the chain, and the term "service request" to indicate the last intermediary's request to the server. This is illustrated in FIG. 1C for the case of three intermediaries. Client 70 issues request 71, which is a client request, to first intermediary 75. In complying with client request 71, first intermediary 55 issues its own request 76 to second intermediary 80. Request 76 is an intermediary request because it is issued by an intermediary, and more particularly is a first intermediary request because it is issued by the first intermediary. Second intermediary 80, in turn, issues its own request 81 to third intermediary 85. Request 81 is an intermediary request, and more particularly is an additional intermediary request because it is issued by an intermediary other than the first. Finally, the third and last intermediary 85 issues request 86 to server 90. Request 86 is the ultimate and final request in the chain. It is an intermediary request, and more particularly is an additional intermediary request. It is also a service request because it is received by the server.

Figure 1D:
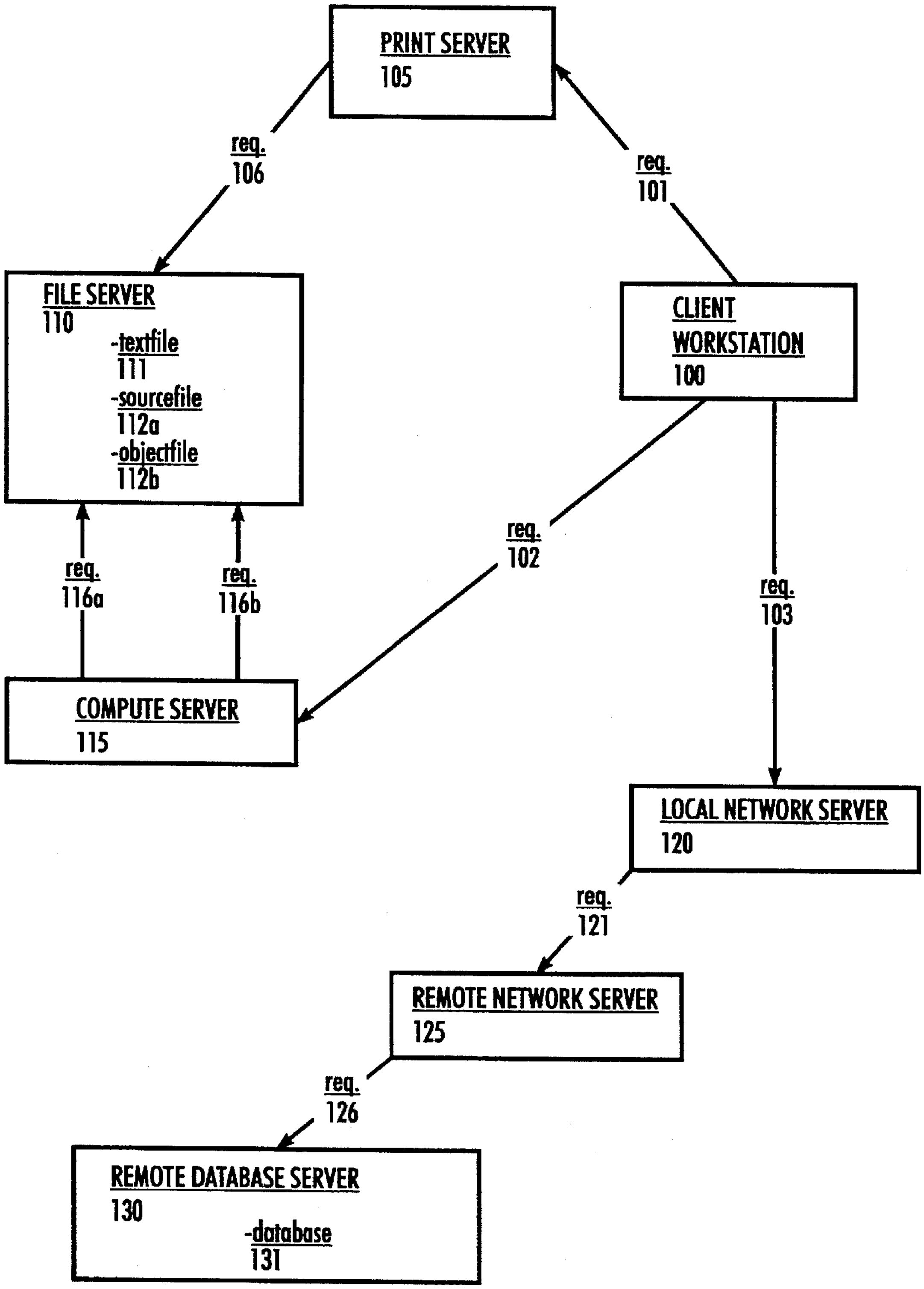
FIG. 1D schematically depicts an example of multiple contemporaneous requests.

It should be noted that at any time there can be an arbitrary number of requests issued by the client or by any intermediary. An example is shown in FIG. 1D. Client 100, a user workstation, issues three client requests 101, 102, and 103. Request 101 is a request to intermediary 105, a print server, to print a file 111 that is stored on file server 110. In response to request 101 intermediary 105 issues service request 106 to server 110. Request 102 is a request to intermediary 115, a compute server, to compile a source code file **112*a* on file server 110 with the resulting object code to be saved in file 112*b* on file server 110. In response to request 102 intermediary 115 issues a service request 116*a* to server 110, asking to read the source code file 112*a*. Later, after compilation is complete, intermediary 115 issues another service request 116*b* to server 110, asking to write the object code file 112*b*. Request 103 is a request to intermediary 120, a network server, to access a database 131 located on server 130, a database server at a location remote from client 100. In response to request 103, intermediary 120 issues a first intermediary request 121 to intermediary 125, a network server at the remote location. Intermediary 125 then issues an additional intermediary request 126, which is the service request, to server 130 on behalf of client 100 and intermediary 125**.

In what follows, requests are sometimes referred to as remote procedure calls (RPCs). This is because requests take the form of RPCs in certain embodiments of the invention, notably in the embodiment of the invention in a modified version of the Andrew File System as described below. It is to be understood that referring to requests as remote procedure calls or RPCs is merely a convenient shorthand that implies no loss of generality. Other kinds of request besides RPCs are very much within the scope of the invention.

2.3 Delegation via ACPs

Figure 2A:
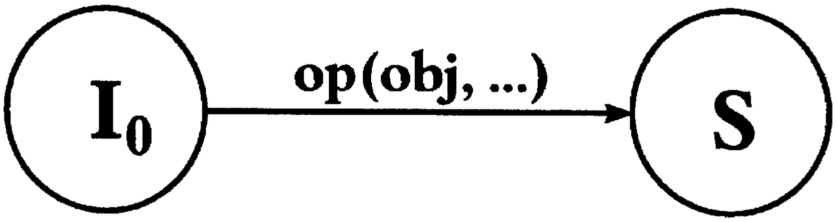
FIG. 2A schematically depicts an authenticated remote procedure call with no delegation of rights, as in the prior art.

The present invention contemplates the use of ACPs in requests such as remote procedure calls that involve a client, a server, and one or more intermediaries interposed between the client and server. For ease of exposition, however, the case of an authenticated remote procedure call that does not involve any intermediaries or delegation of rights will briefly be considered first. This case, which is known in the prior art, is shown in FIG. 2A. Client $I_0$ makes an RPC to a server S, the call being of the form "op (object . . . )". When the server S receives the call, it must determine whether or not to execute the request. The server S proceeds in two steps:

1. First, S verifies the identity of the caller $I_0$. This it does using authentication protocols such as, for example, those described by R. M. Needham and M. D. Schroeder in their article "Using Encryption for Authentication in Large Networks of Computers," *Communications of the ACM* 21(12) 993–999, Dec. 1978.
2. Second, S verifies that $I_0$ has permission to perform this request. For example, S calls a function Check ($I_0$, op, object, . . . ) which returns true or false. This check may look up $I_0$ on access lists, check permission bits, or use some other means of checking authorizations.

Figure 2B:
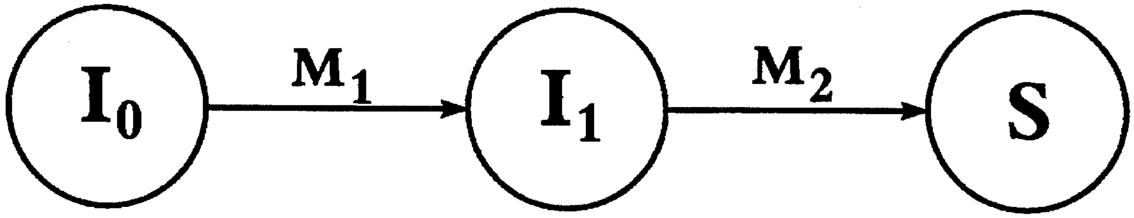
FIG. 2B schematically depicts a remote procedure call with delegation of rights via an access control program.

With the case of the simple RPC thus understood, the more complex operations that are the subject of the present invention will now be considered. These operations involve delegation of access rights to intermediaries. With reference to FIG. 2B, suppose $I_0$ requests some other process $I_1$ to perform an operation on its behalf. In this case, $I_0$ is termed an initiator and $I_1$ an intermediary. According to the method of the present invention, $I_0$ creates an access control program P that specifies the set of rights that it wishes to delegate to $I_1$. The access control program is a procedure that takes as parameters a caller, the operation being performed, and the arguments to this operation, and that returns an indication (e.g., true or false) of whether or not the operation is allowed. After creating P, in a preferred embodiment $I_0$ digitally signs it with its digital signature, thereby producing $\langle P\rangle^{I}0$, which $I_0$ includes in its request to $I_1$. (Digital signatures are known in the art and are described, for example, in D. E. Denning, *Cryptography and Data Security*, Reading, Mass.: Addison-Wesley Publishing Co., 1982.) The meaning of $\langle P\rangle^{I}0$ is "$I_0$ authorizes anyone to make requests on its behalf, as long as P approves each such request." $I_1$ then makes a request to S and transmits $\langle P\rangle^{I}0$ along with the request.

Figure 2C:
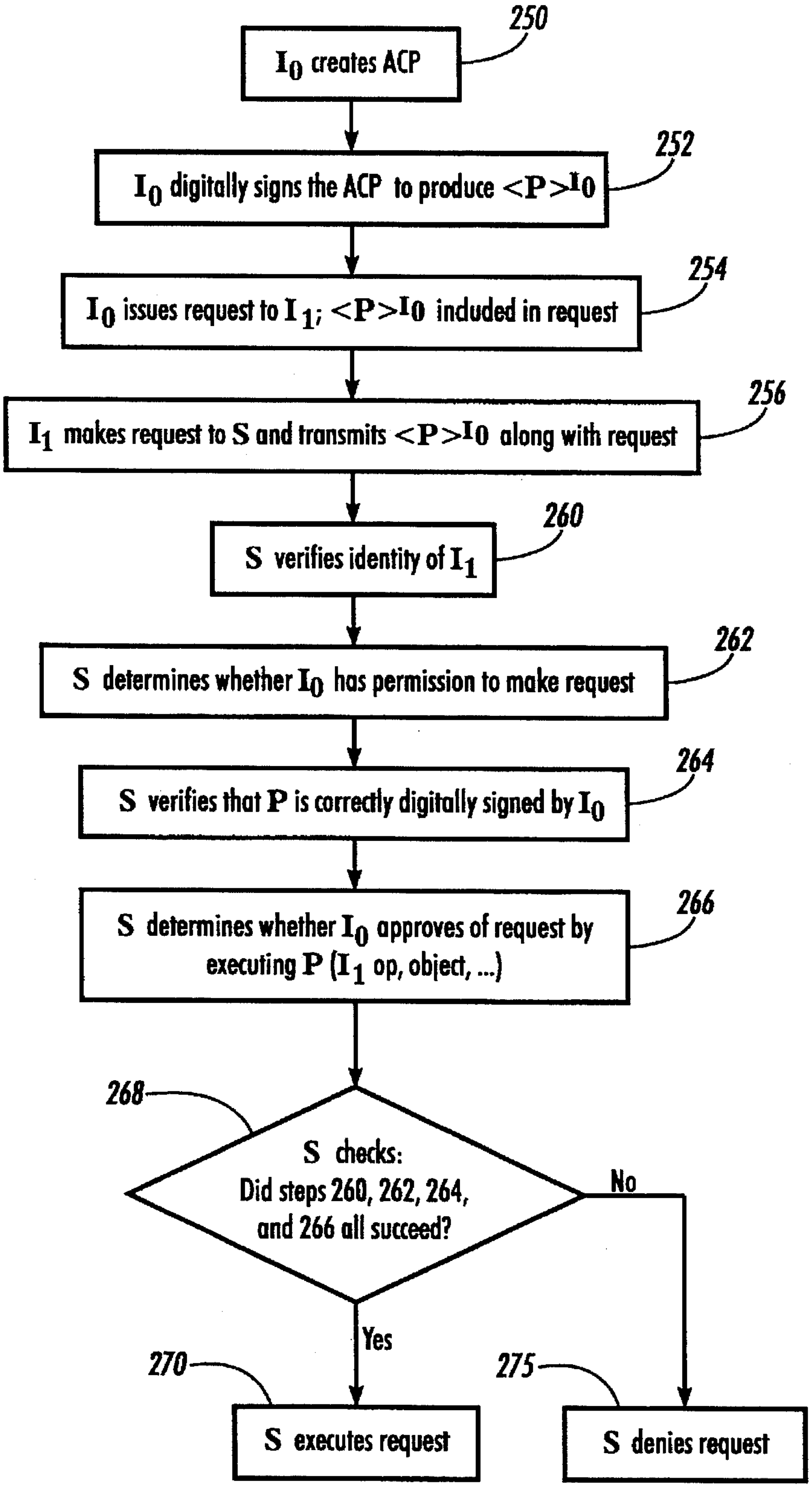
FIG. 2C is a flowchart illustrating the steps of a remote procedure call with delegation via an access control program.

The flowchart of FIG. 2C further illustrates the preceding steps, as well as the steps executed thereafter by the server S. In step 250 $I_0$ creates the ACP. In step 252 $I_0$ digitally signs the ACP to produce $\langle P\rangle^{I}0$. In step 254 $I_0$ issues its request to $I_1$; $\langle P\rangle^{I}0$ is included in this request. In step 256 $I_1$ makes a request to S and transmits $\langle P\rangle^{I}0$ along with the request.

Before honoring the request, server S proceeds as follows:

1. In step 260 S verifies the identity of $I_1$, the principal making the request.
2. In step 262 S determines whether $I_0$ has permission to make this request. $I_0$ cannot delegate rights it does not have. This step can be carried out, for example, as a call to Check ($I_0$, op, object, . . . ).
3. In step 264 S verifies that P is correctly digitally signed by $I_0$.
4. In step 266 S determines whether $I_0$ approves of the request by executing P ($I_1$ op, object, . . . ).

Thereafter, in step 268 S determines whether steps 260, 262, 264, and 266 all have succeeded. If so, then execution proceeds at step 270, in which S executes the request. Otherwise execution proceeds at step 275, in which access is denied and S refuses to execute the request.

Steps 260 and 262 are the same as in the case of a no-intermediary RPC such as that depicted in FIG. 1A with one important difference: The access check in step 262 is based on the initiator $I_0$ rather than the caller $I_1$. Step 264 ensures that the intermediary has not tried to acquire additional rights by manufacturing a forged ACP or by tampering with an existing ACP. Step 266 checks that this particular request meets the restrictions imposed by $I_0$ on $I_1$ as specified in P.

The four checks of steps 260, 262, 264, and 266 are the only ones required of the server. In particular, the server does not enforce bounds on an ACP's lifetime or on who is permitted to use the ACP. Because ACPs are programs, they can check these things themselves. If an ACP is to remain valid for only a limited period of time, then it can always return "access denied" if the current time is greater than some built-in expiration date. If an initiator wishes to delegate only to certain intermediaries, then its ACP can check that the caller is one of the valid delegatees. By putting power into the ACP, the delegation mechanisms are simplified.

The purpose of having $I_0$ digitally sign the ACP is twofold. First, the digital signature proves to the server that the ACP being given to the server is the same ACP that was created and sent by the initiator $I_0$. Second, the digital signature proves that the initiator $I_0$, and not an impostor, actually created the ACP. This twofold purpose can also be accomplished in ways other than through the use of digital signatures. For example, in an embodiment to be described below in which the invention is incorporated in a modified version of the Andrew File System, an authentication server is used. As another example, in some systems in which a client, an intermediary, and a server execute on a single node, the node's operating system provides adequate security to ensure that the client's ACP is genuine, and no authentication as such is required. These two examples by no means exhaust the possibilities.

Deciding what operations to allow and disallow in an ACP requires that the initiator know enough about the implementation of the intermediary to give out the appropriate access rights. Note that this is inherent to the tasks of restricted access delegation and is not specific to ACPs. As an example, consider once again the delegation chain illustrated in FIG. 2C. The operation that $I_0$ requests of $I_1$ need not be the same operation that $I_1$ requests of S. Often, $I_1$ will need to perform a series of lower-level operations on S in the process of servicing $I_0$'s request. For example, $I_0$ may instruct $I_1$ to print a file which resides on S. $I_1$ may have to make a series of calls to S in order to resolve the file's pathname, open the file, read it, and finally close it. When $I_0$ writes program P, it must be aware of the operations that $I_1$ will need to make to S since P must be certain to grant these, and ideally only these operations. A later section of this description tells how $I_0$ can avoid having to know $I_1$'s implementation in some embodiments of the present invention.

2.4 Programming language considerations

Many languages can be used for writing ACPs, ranging from full-featured programming languages to non-procedural languages that simply list patterns to match against the arguments. Any Turing-complete language will suffice, and other languages can also be suitable. Languages containing control constructs (e.g., conditional branching) are an interesting class because they enable multiple possible paths of execution through an ACP.

Of the Turing-complete languages, simple interpreted languages such as Lisp or Tcl (tool command language) are good candidates for writing ACPs. These languages have successfully been used as extension languages to augment the base functionality of various programs. Because ACPs serve a similar purpose, namely, that of extending the core set of access control concepts that a server provides, they are likely to benefit from the same advantages these languages have exhibited in other settings. An example of using Lisp as an extension language is described in R. Stallman, *GNU Emacs Manual* (Free Software Foundation, Oct. 1986); an example of using Tcl as an extension language is described in J. K. Ousterhout, "Tcl: An embeddable command language," *Proceedings of the USENIX Association* 1990 *Winter Conference* (1990).

Where a general-purpose language is used for ACPs, a concern arises with the safety of the server. A malicious or faulty ACP should be prevented from corrupting the server or using excessive resources. The server needs to be protected from program faults, such as NIL pointer differences and division by zero, and needs to enforce limits on CPU and storage use. One way to achieve this is to use a carefully coded interpreter for the ACP language. When the interpreter detects one of these conditions it aborts execution of the ACP. If an ACP is aborted, then it is assumed to have returned false, and the request is denied. Because ACPs are expected to be relatively short, strict limits can be placed on them without severely limiting their usefulness.

ACPs depend on access to request parameters and server state information to implement their checks. A core set of information that servers should provide in any ACP implementation includes the requested action and its arguments, the authenticated identity of the requestor, and the current time. Access to the requestor's identity allows checks that restrict who may make the request, and knowing the current time enables expiration checks. Provision of the current time implies the need for globally synchronized clocks. In practice this is not a problem since most modern distributed systems already employ some form of clock synchronization.

Some clients may wish to specify access controls based on additional information, such as the existence of files. Letting ACPs examine any state in the server could violate security because an ACP can transmit information to an intermediary via the success or failure of the intermediary's server requests. A better model is to allow an ACP to examine any state which the ACP author could have examined through the normal server interface.

In some embodiments of the invention ACPs can also be allowed to make changes to server state. Such a feature introduces a variety of problems concerning resource management. For the most part, a change to server state is preferably made by explicit request rather than as a side effect of an access check. One notable exception to this rule is described in the next section.

2.5 Revocation

The creator of a ACP may want the ability to unilaterally and instantly revoke the rights granted by an ACP. The following is one technique for ACP revocation. The initiator writes the ACP so that the ACP checks for the existence of a revocation object, such as a file, each time it is run. If the revocation object does not exist, the request is denied. At the time the initiator creates the ACP, it also designates the revocation object. When the initiator wishes to revoke the delegated rights it simply eliminates the revocation object. All subsequent requests from the intermediary will be denied by the ACP. This revocation scheme requires no cooperation from the intermediary. It also requires no involvement by the server, except that the server must allow an ACP to inquire about its associated revocation object, and in some embodiments, that the server must create and destroy revocation objects at the initiator's request.

An important question is where to store revocation objects. If an ACP restricts access to one or more objects that reside on a single server, then that server-or, more precisely, its associated stable storage-is the ideal storage site for the ACP's revocation object. The check for the existence of the revocation object can be done locally by the server in this case. Things become more complex if an ACP can be used on multiple servers. In this case, either the ACP must be able to read a revocation object stored on a remote server, or else the revocation object must be replicated across the servers.

Another important question concerns how revocation objects are designated. A straightforward scheme is to have the server create revocation objects for each client upon the client's request. The client can request creation of revocation objects at any time; however, to avoid the overhead of repeatedly having to request revocation objects, the client typically requests that a plurality of revocation objects be created ahead of time, for example when the client is initialized or reinitialized. These objects are then available to the client for later use. The client maintains a record of its revocation objects: which ones are in use in connection with particular ACPs, which ones are free and available for use with other ACPs, and which ones have been destroyed and are thus no longer available. When the client wants to create a revocable ACP, the client designates one or more of its free revocation objects by associating these objects with particular rights that are to be delegated in the ACP. The client includes code in the ACP such that the delegation of a particular right or rights in the ACP depends on the continued existence of the designated revocation object or objects. The client also updates its record of revocation objects to reflect the designation.

Still another important question concerns how revocation objects are eliminated. Typically, the client eliminates a revocation object in order to revoke the access right that is associated with the revocation object and has previously been delegated in an ACP. The client can also eliminate a revocation object for other reasons, for example, if the client decides that the ACP is no longer needed. Continuing the preceding straightforward scheme, to eliminate a revocation object the client simply requests the server to destroy the object. In response, the server authenticates the client's identity to ensure that the client is not trying to destroy someone else's revocation objects. Upon successful authentication the server complies with the client's request and destroys the revocation object. The client deletes the eliminated object from its record of revocation objects.

By allowing clients to create revocation objects ahead of time, the foregoing scheme for delegating and eliminating revocation objects minimizes communication between client and server. It also preserves an important advantage of the present invention, namely that the client can specify at run time which intermediaries are to have which access privileges and can do so without the need for further interaction with the server. The exact implementation of the scheme depends on the particular system in which the method of the invention is embodied.

Other schemes to create, designate, eliminate, and destroy revocation objects are within the scope of the invention. For example, if a server can support only a limited number of revocation objects, an allocation policy can be established to determine how many revocation objects any given client can have with respect to the server. Any of a number of such allocation policies, including preallocation of all revocation objects among clients, is possible. No matter what scheme is used, it is important that revocation objects be stored in stable storage, so that they are not inadvertently destroyed, for example through server failures.

There can be as many revocation objects per ACP as is necessary to carry out the purposes of the ACP. In particular, a single ACP can be associated with multiple revocation objects in order to provide for independent revocation of individual access rights with respect to the same request. For example, suppose client C creates an ACP that gives temporary read access to a first file called FILEONE and temporary write access to a second file called FILETWO, both of which are stored on file server S. If there are two revocation objects, one for the access rights to FILEONE and one for the access rights to FILETWO, the client can then, for example, revoke an intermediary's permission to access FILETWO while still permitting access to FILEONE. It does so by eliminating FILETWO's associated revocation object.

Figure 2D:
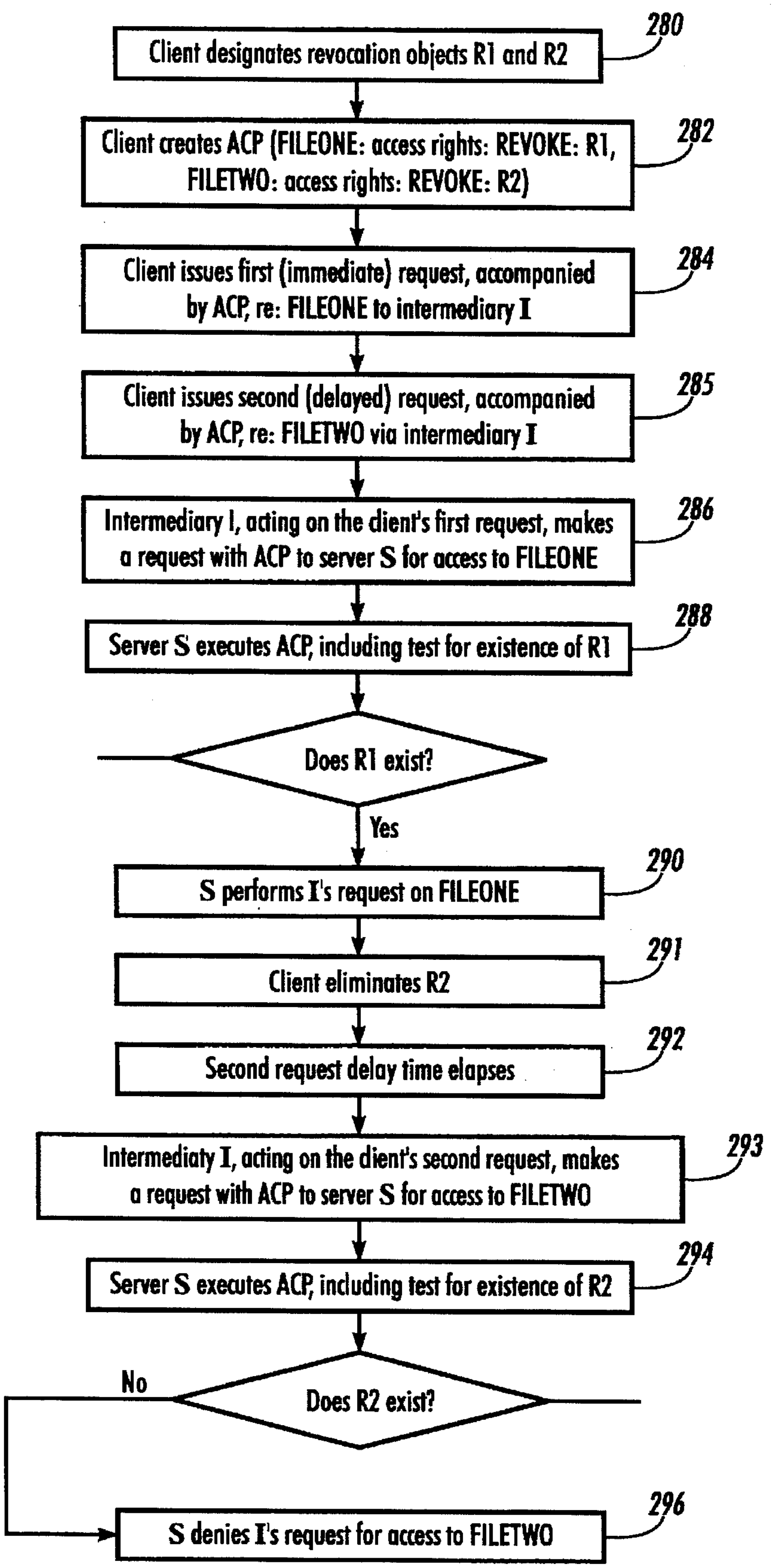
FIG. 2D is a flowchart illustrating the steps for revoking access privileges using revocation objects with an example ACP.

FIG. 2D shows the steps involved in revoking access privileges using revocation objects for another example involving FILEONE and FILETWO in one embodiment of the invention. In this example the client makes two requests of the server via the intermediary. The first request concerns FILEONE and is to be executed immediately while the second request concerns FILETWO and is to be delayed by the intermediary. The client revokes the access privileges to FILETWO before the end of the delay period, so that the second request is partly denied by the server. It is to be understood that this illustrative example concerns only one of the many situations in which revocation objects can be used.

The steps of this example proceed as follows: It is assumed that a number of revocation objects, including R1 and R2, have been created ahead of time by client C at server S. In step 280 client C designates revocation objects R1 and R2 that will correspond respectively, to delegated access rights for FILEONE and FILETWO. In step 282, the client creates the ACP. The ACP grants access rights to FILEONE only for so long as the revocation object R1 continues to exist and to FILETWO only for so long as the revocation object R2 continues to exist. In step 284 the client issues a first request to the server via an intermediary I. This request involves access to FILEONE. It is accompanied by the ACP. In step 285 the client issues a second request that involves access to FILETWO to the server via the same intermediary I. This request is also accompanied by the ACP. The second request is a delayed request, which the intermediary will not process until a specified delay time elapses.

Next in step 286 the intermediary I, acting on the client's first request, makes a request to the server S for access to FILEONE. This service request is accompanied by the ACP. In step 288 server S executes the ACP. In so doing, the server tests for the existence of the revocation object R1 before granting access to FILEONE. If the revocation object exists, the request is performed; otherwise it is denied. At this stage of the example, both revocation objects R1 and R2 exist, so the request for access to FILEONE is performed in step 290.

Thereafter in step 291 the client eliminates the revocation object R2, which corresponds to the access rights for FILETWO. In step 292 the delay time for the client's second request elapses. In step 293, the intermediary I, acting on the client's second request after the elapse of the delay, makes a request to the server S for access to FILETWO. This service request is accompanied by the ACP. In step 294 server S executes the ACP. In so doing, the server tests for the existence of the revocation object R2 before granting access to FILETWO. At this stage of the example, R2 no longer exists, so that the ACP returns false and the request for access to FILETWO is denied in step 296.

Figure 2E:
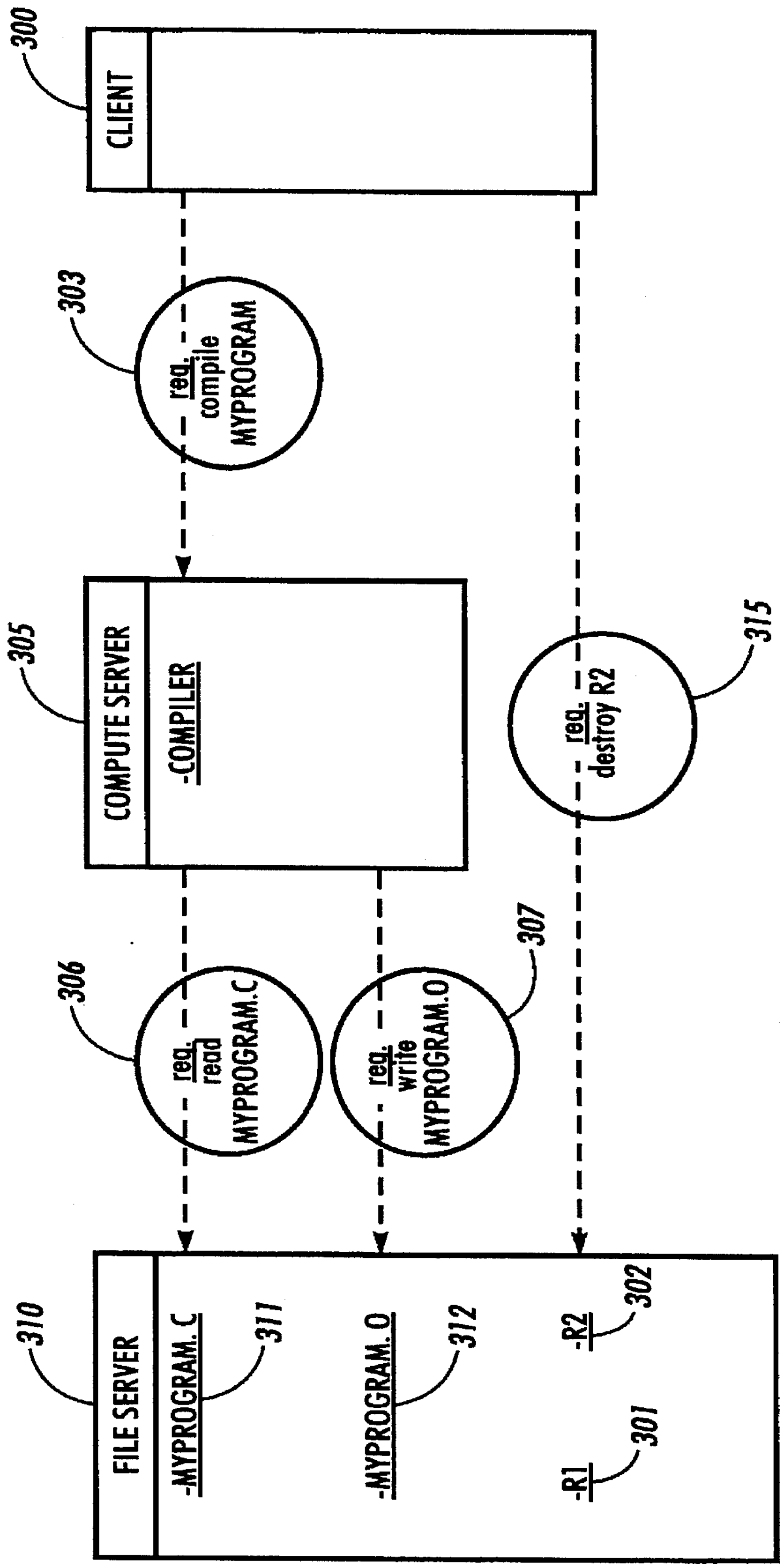
FIG. 2E schematically depicts an example that illustrates the use of revocation objects in a situation wherein a single client request generates two intermediary requests.
Figure 2F:
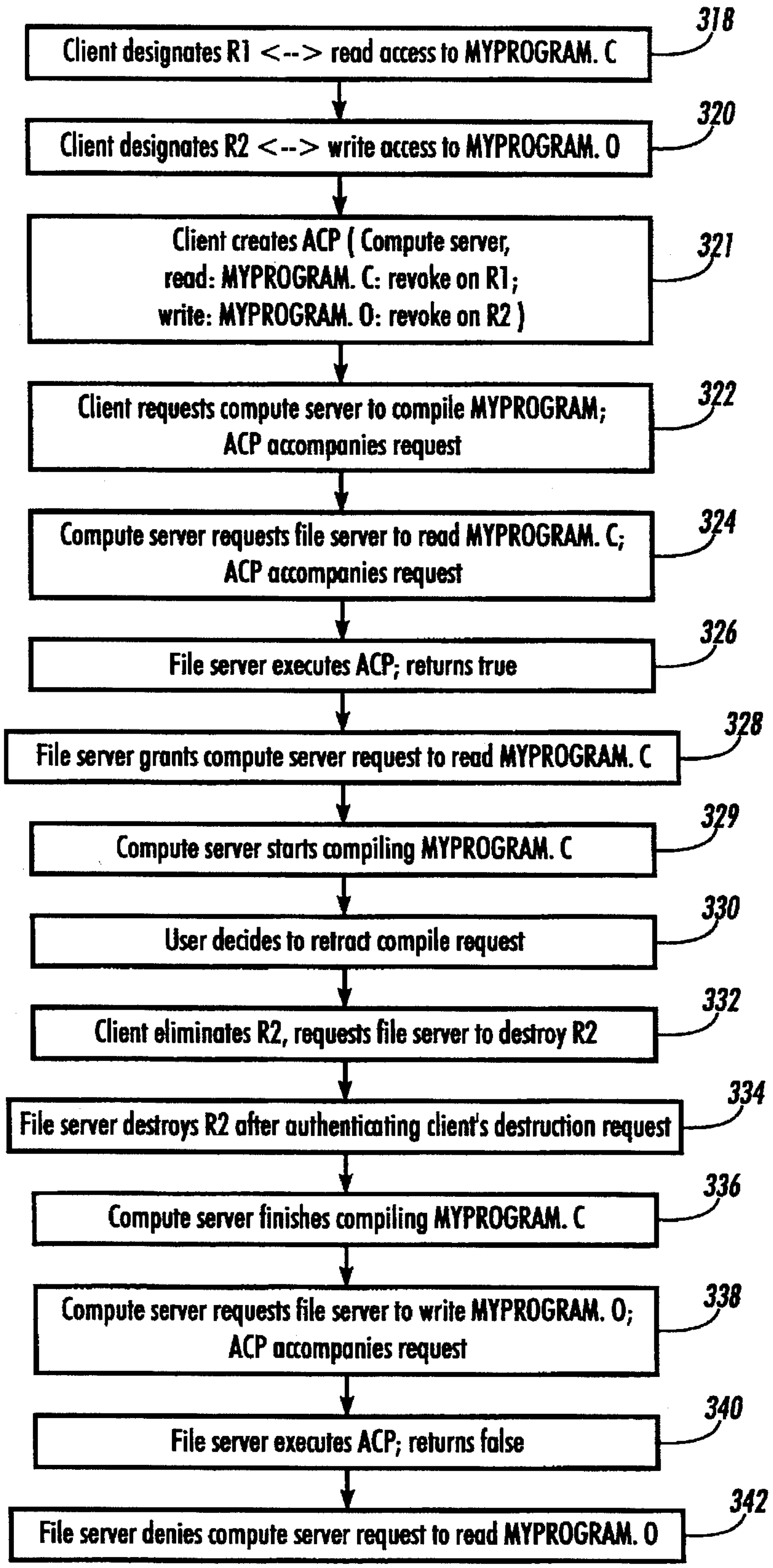
FIG. 2F is a flowchart illustrating the sequence of steps followed in the example of FIG. 2E.

An additional example, shown in FIGS. 2E and 2F, illustrates the use of revocation objects in a situation in which a single client request generates two intermediary requests. In FIG. 2E, client 300 is a user command process executing, for example, on a workstation. Client 300 sends request 303 to compute server 305, asking compute server 305 to compile source code file 311 which is stored on file server 310. Request 303 has an access control program that delegates to compute server 305 the rights to read source code file 311 and to write object code file 312, a version of which is already stored on file server 312 at the beginning of this example. These access rights depend respectively on the continued existence of designated revocation objects 301 and 302. In response to client request 303, compute server 305 will make two service requests to file server 310. The first will be a request 306 to read source code file 311 prior to compilation. The second will be a request 307 to write object code file 312 after compilation is completed.

Next consider what happens if during compilation the user decides that the compilation request was a mistake, and that compute server 305 must not be allowed to replace the existing version of the object code file 312 with a newly compiled version. The user's command process 300 eliminates the revocation object 307 by requesting in request 315 that file server 310 destroy revocation object 302. Thereafter, when compute server requests in request 307 to write object code file 312, the ACP returns false and request 307 is denied.

FIG. 2F flowcharts these steps in greater detail. In step 318 the client designates revocation object R1, which corresponds to revocation object 301 in FIG. 2E, as being associated with the right to read source code file MYPROGRAM.C, which corresponds to source code file 311 in FIG. 2E. Similarly, in step 320 the client designates revocation object R2, which corresponds to revocation object 302 in FIG. 2E, as being associated with the right to write object code file MYPROGRAM.O, which corresponds to object code file 312 in FIG. 2E. In step 321 the client creates the ACP to delegate rights to read MYPROGRAM.C and to write MYPROGRAM.O contingent upon the continued existence of R1 and R2 respectively. In step 322 the client issues its compilation request to the compute server, accompanied by the ACP. In step 324 the compute server issues to the file server a request, accompanied by the ACP, to read MYPROGRAM.C. This request corresponds to request 306 in FIG. 2E. In step 326, the file server executes the ACP. R1 exists and the ACP returns true. In step 328, the file server grants read access to MYPROGRAM.C to the compute server. In step 329 the compute server proceeds to compile MYPROGRAM.C. In step 330, the user decides not to compile after all, and accordingly the client eliminates revocation object R2 in step 332 by requesting the file server to destroy R2. In step 334 the file server complies with this request and destroys R2. In step 336 the compute server finishes compiling MYPROGRAM.C. In step 338 the compute server issues to the file server a request, accompanied by the ACP, to write MYPROGRAM.O. This request corresponds to request 307 in FIG. 2E. In step 340, the file server executes the ACP. R2 no longer exists and the ACP returns false. In step 342, the file server denies write access to MYPROGRAM.O to the compute server. This completes the example.

If revocation is used often, special support for revocation objects can be provided by servers. The revocation objects are cached in memory to allow quick checks by the ACPs. The only operations on the cached revocation objects are Create, TestForExistence, and Destroy, which, respectively, create, test for the existence of, and destroy the revocation objects. Only the TestForExistence operation is available to the ACP itself.

Another form of revocation is "use-once" semantics in which an ACP is automatically revoked after it is used, rather than being available for reuse by the initiator. In the printer example given earlier, suppose the initiator wishes that the printer only be allowed to read the file to be printed once. This can be supported by allowing ACPs to invoke the Destroy operation on its associated revocation objects. While this violates the principle that ACPs should be free of side-effects, permitting an ACP to destroy its revocation objects can be considered safe enough and useful enough to warrant an exception to the rule.

Still other revocation schemes are within the scope of the present invention. For example, a revocation object could be a file that is associated with multiple ACPs and that contains a list of tuples (ACP, revocation status). To check for revocation in this scheme, the ACP accesses its associated revocation object and determines whether its status is revoked. In comparison with the one-ACP-per-revocation-object scheme described above, this scheme does not take full advantage of the fact that file servers typically are optimized to check very rapidly for the existence of files and are not optimized to search through data within files.

2.6 Chained delegation

Figure 3A:
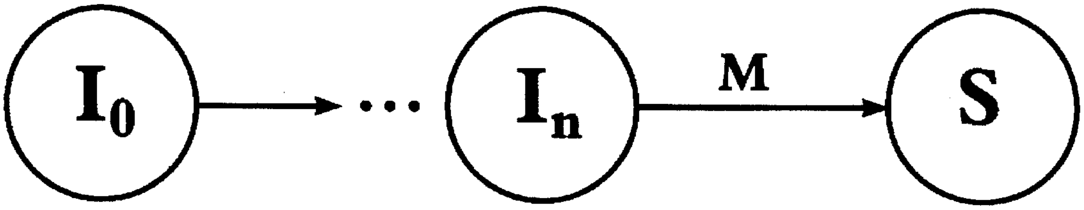
FIG. 3A schematically depicts a remote procedure call with chained delegation.

Now that the use of ACPs to delegate access rights to a single intermediary has been described, next is considered the case of cascaded delegation among multiple intermediaries. With reference to FIG. 3A, after $I_0$ has delegated rights to $I_1$, $I_1$ may wish to delegate some of these rights to a second intermediary, $I_2$. To do so, $I_1$ writes a second ACP $P_1$, digitally signs it and sends both ACPs to $I_2$. $I_2$ presents both ACPs to the server when it makes its request.

Figure 3B:
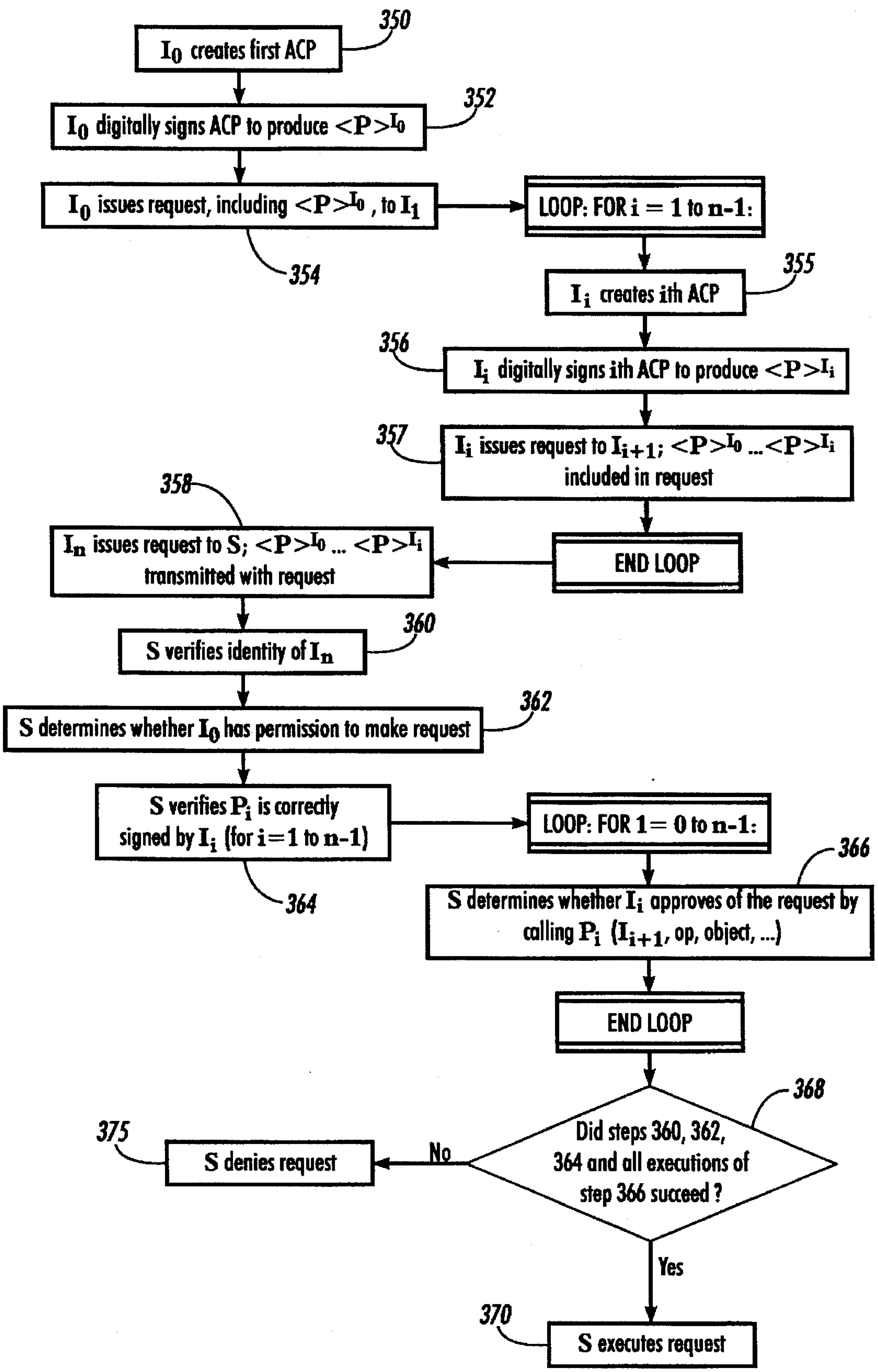
FIG. 3B is a flowchart illustrating the steps of a remote procedure call with chained delegation.

The flowchart of FIG. 3B further illustrates the preceding steps, as well as the steps executed thereafter by the server S, for the general case of n intermediaries. In step 350 $I_0$ creates a first ACP. In step 352 $I_0$ digitally signs this ACP to produce $\langle P\rangle^{I}0$. In step 354 $I_0$ issues its request to $I_1$; $\langle P\rangle^{I}0$ is included in this request. Steps 355, 356, and 357 are then executed repeatedly for values of i from 1 to n-1 inclusive. In step 355 $I_i$ creates an ith ACP. In step 356 $I_i$ digitally signs this ACP to produce $\langle P\rangle^{I}i$. In step 357 $I_i$ issues its request to $I_{i+1}$; all the ACPs created so far, that is, $\langle P\rangle^{I}0 \ldots \langle P\rangle^{I}i$, are included in this request. In step 358, $I_n$ issues a request to S and transmits all the ACPs, that is, $\langle P\rangle^{I}0 \ldots \langle P\rangle^{I}i$, along with the request.

When the server S receives this request, it must check, by calling $P_0$, that $I_0$ has delegated rights to $I_1$. Similarly, by calling $P_1$, S checks that $I_1$ has delegated rights to $I_2$. In the general case, S has received a call from $I_n$ along with n ACPs, $\langle P_0\rangle^{I}0$, $\langle P_1\rangle^{I}1$, . . . $\langle P_{n-1}\rangle^{I}{}_{n-}1$. It proceeds as follows:

1. In step 360 S verifies the identity of In, the principal making the request.
2. In step 362 S determines whether $I_0$ has permission to make this request. This is carried out, for example, as a call to Check ($I_0$, op, object, . . . ).
3. In step 364 S verifies that each $P_i$ is correctly signed by $I_i$.
4. In step 366, which is executed repeatedly n times, S verifies that $I_i$ has delegated the required rights to $I_{i+1}$ for values of i ranging from 0 to n-1, viz:
   S determines whether $I_0$ approves of the request by calling $P_0$ ($I_1$, op, object, . . . ).
   S determines whether $I_1$ approves of the request by calling $P_1$ ($I_2$, op, object, . . . ).
   . . .
   S determines whether $I_i$ approves of the request by calling Pi ($I_{i+1}$, op, object, . . . )
   . . .
   S determines whether $I_{n-1}$ approves of the request by calling $P_{n-1}$ ($I_n$, op, object, . . . ).

Thereafter, in step 368 S determines whether steps 360, 362, 364, and all executions of step 366 have succeeded. If so, S executes the request in step 370. Otherwise execution proceeds at step 375, in which access is denied and S refuses to execute the request.

The delegation of rights along the chain from intermediary to intermediary can be represented by way of a formula. Let the initiator's set of rights be denoted as R. The set R specifies what operations the initiator is allowed to perform on which objects. Let $D(I_i)$ denote the rights delegated by intermediary $I_i$ via its ACP. $D(I_0)$ is the set of rights delegated by the initiator's ACP. Then the general formula for the set of rights obtained by the nth intermediary is $$A(I_n)=R\cap D(I_0)\cap D(I_1)\cap \ldots \cap D(I_{n-1})$$

This formula says that the rights of intermediary $I_n$ are the rights of the initiator as restricted by all the access control programs of the intermediaries along the way (including the initiator's).

Cascades of intermediaries can be more complex than the simple chain described here. For example, the present invention contemplates situations in which multiple intermediaries execute in parallel as well as or in addition to a serial chain. Moreover, in any situation involving a cascade of intermediaries, some or all of the intermediaries can have revocation objects associated with their ACPs. It will be appreciated that these example situations are illustrative and are not intended to limit the invention's scope.

3. A Specific Embodiment Using a Modified Version of the Andrew File System

Files represent a type of object that is widely used and for which access control is crucial. An embodiment of the present invention has been built wherein ACPs have been integrated into a distributed file system called the Andrew File System (AFS). Aspects of AFS that are relevant to the present invention are described below. A more complete description of AFS may be had by reference to the article by J. Howard, M. Kazar, S. Menees, D. Nichols, M. Satyanarayanan, R. Sidebotham, and M. West, "Scale and Performance in a Distributed File System," *ACM Transactions on Computer Systems* 6(1):51–81, Feb. 1988. It is to be understood that ACPs according to the method of the present invention find applicability with other file systems besides AFS and with other types of servers besides file servers.

The Appendix to this application shows the modifications made to Andrew File System release 3 (as it appeared on the Aug. 19, 1990 Mt. Xinu release tape of the Mach operating system) and Tool Command Language release 3.3 in order to produce the embodiment of the present invention in the Andrew File System as described below. More about the Appendix, including copyright information, is discussed in the section "Software Appendix" that appears near the beginning of this application.

3.1 Integrating ACPs into AFS

AFS is a distributed file system that operates in the context of the Unix operating system. It allows for one or more file servers and one or more clients. Each client and each server executes on its own separate node. All the clients can communicate with all the servers via a communications network. Clients can act as intermediaries with respect to one another through the use of a remote invocation facility, through which clients can execute Unix commands on other clients.

AFS supports the caching of files, that is, the local copying by a client of certain heavily used files that the client obtains from a server. When a client finds a current copy of a file in its cache, it is spared the overhead of having to go to the server to get the file. AFS has a cache manager that maintains cache coherence; that is, the cache manager ensures that a client gets the correct version of a file and does not mistake an obsolete cached version of the file for the current version. For example, suppose that file FILEONE is on server S1. Client C1 reads FILEONE and caches it. Thereafter client C2 writes a new version of FILEONE to server S1. The next time client C1 reads FILEONE, AFS must ensure that C1 reads the new version of FILEONE from server S1 and ignores the now-obsolete version of FILEONE stored in its cache.

Figure 4A:
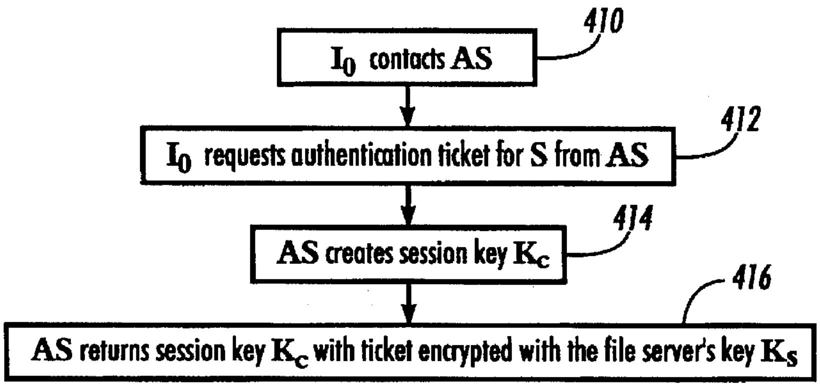
FIG. 4A is a flowchart illustrating the steps of the authentication protocol in the Andrew File System of the prior art.

In the prior art, AFS uses a combination of access control lists and protection bits to control access to files. A variant of the Kerberos protocol is used to authenticate clients. (A description of the Kerberos protocol is found in J. G. Steiner, B. C. Newman, and J. I. Schiller, "Kerberos: An Authentication Service for Open Network Systems," in *Proceedings of the Winter* 1988 *USENIX Conference* (Dallas, Tex., Feb. 1988) at 191–201.) The protocol that AFS uses to authenticate clients in the prior art is as shown in the flowchart of FIG. 4A: In step 410 a client $I_0$ contacts an authentication server AS. In step 412 the client $I_0$ requests from the authentication server AS an authentication ticket for communicating with a file server S. This request is made on a secure channel. (Secure channels are known in the prior art and are described, for example, in Denning, *Cryptography and Data Security,* supra.) In step 414 the authentication server AS creates a session key $K_c$. In step 416 the authentication server AS returns the session key $K_c$ with a ticket that has been encrypted with the file server's key $K_s$. This ticket contains the session key along with timeout information and $I_0$'s identity.

Figure 4B:
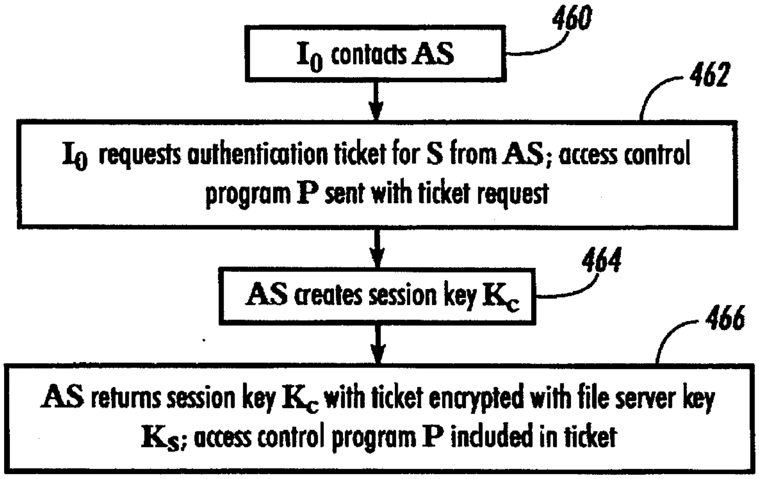
FIG. 4B is a flowchart illustrating the steps of the authentication protocol in a version of the Andrew File System modified according to a specific embodiment of the present invention.

In the specific embodiment of the present invention that will now be described, the prior art AFS authentication protocol of FIG. 4A is replaced by the protocol illustrated in the flowchart of FIG. 4B. The format of the authentication tickets used in AFS is modified so that they can optionally include an ACP. To obtain such a ticket, a client $I_0$ proceeds as follows: In step 460, the client $I_0$ contacts an authentication server AS. In step 462 the client $I_0$ requests from the authentication server AS through a secure channel an authentication ticket for communicating with a file server S. $I_0$ sends an access control program P along with the request to AS. In step 464 the authentication server AS creates a session key $K_c$. In step 466 the authentication server AS returns the session key $K_c$ with a ticket that has been encrypted with the file server's key $K_s$. AS includes the access control program P in this ticket. The ticket, when transmitted to S, convinces S that AS believed $I_0$ was the author of P. This is the signature needed to convince S to use the ACP.

Tickets in AFS are at most 2000 bytes long, which leaves room for an ACP of approximately 1900 bytes in this embodiment. Variations of the embodiment can accommodate larger ACPs through more substantial changes to the AFS protocol. There is an advantage, however, to keeping ACPs short, namely, that short ACPs are less apt to contain programming bugs than are longer ACPs, and are therefore more likely to be trustworthy. With short ACPs, the initiator minimizes the possibility that it will inadvertently give away to intermediaries any access rights other than the ones it intends to give away.

Aside from generating ACPs and including them in requests to the authentication server, no changes are made to the AFS client in this embodiment of the invention. When the AFS client obtains a ticket from the AS, the client passes the ticket to a server along with a file system request in the usual manner. When a server receives a request that includes an ACP, it interprets the ACP to determine whether or not to grant the request.

Figure 4C:
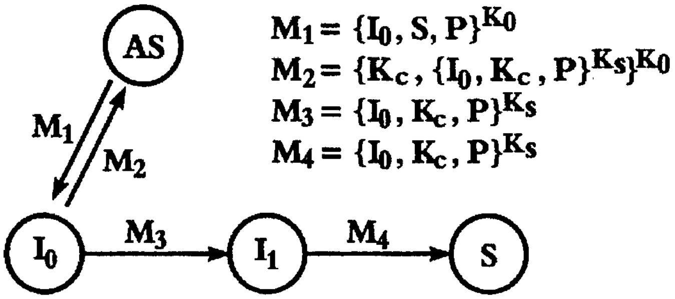
FIG. 4C schematically depicts an access control program passed in an authentication ticket via a remote invocation facility.

The specific embodiment permits ACPs to be used in conjunction with the existing remote invocation facility of AFS. This facility, which is a modified version of the Unix rsh (remote shell) command, executes an arbitrary Unix command on another workstation. FIG. 4C illustrates an interaction in which an AFS client, $I_0$, uses the remote invocation facility to run some command on intermediary $I_1$. When the intermediary contacts the server, it presents the ticket containing the ACP. The server treats this as though the initiator had made the connection, but restricts access as specified by the ACP.

The specific embodiment of the present invention in AFS affords increased security over the unmodified AFS system. AFS's version of rsh simply passes the user's authentication ticket and session key to the intermediary in the clear. The intermediary, as well as an intruder eavesdropping on the net, can use the ticket to obtain the full rights of the initiator. With ACPs, these rights can be restricted and given short expiration times.

Variations on the specific embodiment can provide still more security by incorporating means whereby the server can independently authenticate the intermediary. For example, in one such variation the server is passed two authentication tickets, one for the initiator, which contains the ACP, and one for the intermediary. This provides additional security because the ACPs can discriminate based on the identity of the intermediary.

The specific embodiment permits an intermediary to receive or modify only data for which at least one of the client's users has access. For example, if the client is a workstation, at least one of the workstation's users must have access to the data. The embodiment does not ensure that data belonging to an individual user of the workstation is protected against unauthorized access by another user of the same workstation. This follows from the operation of the AFS cache manager at the workstation. Because a workstation can be used by more than one user, the AFS cache manager duplicates the permission checks that the file server performs. This prevents a user from reading a file for which he has no access rights but that is in the cache due to another user on the same workstation. However, the intra-workstation security check sometimes fails to protect data properly. Variations on the embodiment can incorporate changes to the cache manager to ensure data protection for each individual user.

3.2 An ACP language

The specific embodiment of the invention in AFS uses Tcl as the language for writing ACPs. Tcl is suitable because it has a small re-entrant interpreter. Although Tcl delivers adequate performance, the Tcl interpreter is not optimized for speed. Other languages having faster interpreters can be used in variations of the specific embodiment. Lisp is one possibility. The GNU Emacs Lisp interpreter (described in R. Stallman, *GNU Emacs Manual,* supra) is 3–50 times faster than the Tcl interpreter, depending on the mix of integer and string operations.

ACPs written in Tcl cannot make calls on the file system or modify the state of the server in any way. Nevertheless, they do have access to some information in addition to the requested operation and its actual parameters. This information includes a classification of the request as to whether it reads or writes data, the parent directory of the file being operated upon, and the current time. The classification information simplifies ACPs since they need not list all possible operations. The parent directory makes it convenient to write ACPs that restrict access to a single directory.

The embodiment incorporates a few changes made to the Tcl interpreter to protect the server from malicious or faulty ACPs. These changes include a bound on the number of Tcl statements that can be executed in an ACP, a bound on the amount of storage an ACP can allocate, and a bound on recursion depth. If an ACP exceeds any of these bounds, then it is terminated and treated as though it returned false, i.e., access is denied.

Following is a source code listing for a sample ACP written in Tcl that a user might want to use within the specific embodiment:

```
                                /*Example 1*/
expr {
    [string compare $opclass
        "fetch"] == 0
    && [string compare $filename
        "/user/joe/paper.ps"] == 0
    && [string compare $caller
        "fred"] == 0
    }
```

The user would intend the program to allow read access by user "fred" to a single file, "/user/joe/paper.ps". Although the program appears at first to be a reasonable ACP, it does not actually work in this embodiment. The reasons that it does not work are described in the next section.

3.3 Problems encountered in practice

Three major problems prevent users from writing simple ACPs like that presented in the preceding source code listing. Although these problems are specific to AFS, they are worth discussing since they are representative of the types of difficulties that can be encountered in integrating ACPs into existing systems.

First, an intermediary does not have an identity of its own. The AFS designers decided to avoid the substantial administrative overhead that would be entailed in establishing identities for all workstations and in handling key distribution and protection. This is not unusual in existing systems. Therefore, even in a variation on the specific embodiment in which authentication tickets can be passed to the server as described above, the server cannot require an authentication ticket from the intermediary. Thus, an ACP cannot check the identity of the intermediary.

Second, file servers in systems like AFS or NFS employ unique object identifiers (ids) instead of human-readable names in most of their access requests. ACPs must refer to these file identifiers. This requirement makes it substantially harder for humans to write ACPs than would be the case if the ACPs could refer to human-readable names. Moreover, this requirement prevents ACPs from checking whether a file name matches some pattern. For example, it may be desirable for an ACP to grant access to files having names of the form "*.o," where "*" is a wildcard, but not to files having names of the form "*.c." This is not possible in the specific embodiment since ACPs are passed file ids rather than names. A variation of the specific embodiment can be constructed in which the server provides a mapping from object id to the appropriate human-readable name for an object. However, the human-readable name for an object may not be unique since AFS allows symbolic links, that is, indirect references to files by means of human-readable names that point directly or indirectly to actual file identifiers. In this case the server must take care to map the object id to the appropriate name, probably the name under which a file was opened. Depending on the server, the information needed to decide which mapping to use may or may not be available at the time an access request is made.

Third, AFS clients are responsible for resolving a file's pathname. Each of the directories from the root of the file system to the file name must be retrieved by the client workstation. Thus, an ACP that wants to delegate read access to an individual file must also give read permission to the directories in the file's pathname.

Following is a source code listing for a valid ACP that provides read access to file "/user/joe/paper.ps":

```
                                /*Example 2*/
expr {
    [string compare $opclass
        "fetch"] ==0
    && ([string compare $fid
        "20000012 00000d24 00001a8d"] == 0
    || [string compare $fid
        "20000001 00000001 00000032"] == 0
    || [string compare $fid
        "2000000a 00000e30 000024c2"] == 0
    || [string compare $fid
        "20000012 00001b65 00000092"] == 0
    }
```

In this program, the file id for "paper.ps" is "20000012 00000d24 00001a8d". The ACP also includes the file ids for the "/", "user" and "joe" directories This ACP, which has the same intended effect as the nonworking one introduced above, works properly and actually can be used within the specific embodiment of the present invention in AFS.

Users may find it cumbersome to write ACPs like that presented in the previous program (Example 2). A tool that automatically converts an ACP like the one in Example i to one like Example 2 is thus desirable. Such a tool is outlined in a later section.

3.4 Performance

To determine the overhead of using ACPs in the specific embodiment, some simple experiments were performed. The first experiment consisted of measuring the elapsed time for a stat system call under various conditions. stat is a Unix command that returns information about a file, such as the file's owner, length and modification date. The stat system call causes the AFS client to make a FetchStatus RPC to the server to fetch a block of information about a file including such information as the owner, length, and modification date. FetchStatus is an AFS command that a client uses when synchronizing its cache. FetchStatus sends a message from the client to the server on which the file is stored. The server responds by providing the client with the file's owner, length, and modification date. The client uses this result to determine whether its cached version of the file is obsolete.

Three cases were tested. In the first case no ACP is supplied with the stat call. In this case, the modifications to the AFS server have a negligible performance impact. In the second case, an ACP is supplied that always returns true. In the third case, an ACP is supplied that restricts writing to a particular directory. The source code listing for the ACP used in this third case is as follows:

```
                         /*ACP for third test case */
expr {
    ( [string compare $filetype
        "dir"] == 0
    && [string compare $fid
        "20000012 0000009d 00001a3a"] == 0)
    ||||[string compare $parentfid
        "20000012 0000009d 00001a3a"] == 0
    ||||[string compare $opclass
        "fetch"] == 0
    }
```

This ACP allows changes to the directory (first clause), changes to files within the directory (second clause), and reads to any other files (third clause). In the test, the files referenced by the stat calls were not in the directory named by the ACP, so the ACP did three string comparisons.

The test configuration comprised a Sun 4/110 running the AFS file server code and a Sun SparcStation 2 running the client code. The 4/110 is roughly half the speed of the SparcStation 2. The results of running the test are shown in Table 1.

TABLE 1

Elapsed times for stat call under various conditions.

| Test Case | Execution Time |
|---|---|
| No ACP | 7.7 ms |
| ACP that returns "true" | 9.5 ms |
| ACP in FIG. 7 | 12.8 ms |

4. Coping with ACP Complexity

The general nature of ACPs makes them both powerful and dangerous. A simple coding bug can grant undesired access rights, possibly for an unbounded length of time. The complexity of creating the desired correct ACP can be addressed in at least two ways: ACP language support and the provision of ACP templates.

A first approach to controlling complexity is through the incorporation of default provisions into ACPs. A variety of default provisions are desirable in most or even all ACPs. These include expiration times, intended users, and intended access scope. Rather than forcing ACP writers to specify these checks procedurally in each ACP, the ACP language can provide a declarative section in which the relevant values can be succinctly specified, with appropriate default values being supplied in their absence.

A second approach to controlling complexity is to place the burden of generating correct ACPs on the application and server writers instead of the application user. The application writer is more likely than the user to know the implementation details of the intermediary, and hence to know which access rights need to be delegated. This second approach, then, assumes that the application and server writers can be trusted to provide safe ACPs and that the principal culprits to safeguard against are individual instances of machines or services claiming to be something that they are not.

The print program described earlier serves as an example of this second approach. The publicly available print software (stored on a safe file server) is responsible for generating an ACP that grants access only to the file to be printed. The application writer can generate ACPs by providing a template that instantiates into a specific ACP at runtime. This template consists of an ACP that is written in advance by the application author, with slots to be filled in with usage parameters. The print ACP template can itself employ lower level templates provided by the file servers it knows about. Some example templates are:

ReadOneFile(name, lifetime, user)
  restrict reading to the file given by name; access may only be by user and must occur before lifetime. Both lifetime and user can have default values ReadOnly(lifetime, user)
  restrict rights to the user's read rights.

WriteInDir(directory, lifetime, user)
  restrict writing to a single directory

When one of these is instantiated, it becomes an ACP with the arguments hard-coded in.

5. Additional Aspects of the Invention

Several additional aspects of the invention will now be presented. These aspects are presented by way of illustration and are in no way intended to limit the scope of the invention.

ACPs according to the method of the present invention are useful for delegation in other settings beyond the context of distributed systems. One such setting is a system in which client and server are processes running on the same computer or workstation rather than on two or more physically separate computers. For example, consider a workstation user that has just received a large program from a mailing list and wants to run that program. The user is not completely sure he can trust this software; for example, the user is concerned that the software may be infected by a software virus, or that it may attempt to execute another program without the user's knowledge. However, the user knows which files the software should write and execute if it works correctly. According to the method of the present invention, the user creates an ACP and attaches it to an invocation of the program. In this aspect of the invention, the initiator is the user's command processor, the intermediary is the untrusted software, and the server is the local operating system. Because the ACPs can be managed securely by the operating system, digital signatures are not required.

Another example of the use of ACPs in a nondistributed system concerns setuid programs. Many operating systems have a facility that allows a user to delegate his rights to a program known as a setuid program. When the setuid program runs, it executes with the rights of the owner of the program file instead of the rights of the invoker. A typical Unix system, for example, has many of these programs that run as the so-called super-user, who has unlimited access rights. Bugs in these setuid programs are a major source of security weaknesses. A malicious user can exploit a bug in such a program to cause it to read, modify, or execute some file that the program author did not intend it to reference.

An ACP attached to a setuid program can limit the damage caused by a bug therein. In principle, the attachment of the ACP provides no additional protection since the system administrator is responsible for both the setuid program and the ACP. In practice, however, the ACP can be made much simpler than the setuid program. This simplicity can give the system administrator confidence that the combination of the setuid program and the ACP is less likely to have a damaging bug than the setuid program alone.

ACPs can be used to provide a limited form of setuid functionality in a distributed system. A game program running in a distributed system can have an embedded ACP that allows any user to modify the high score file. When the game wishes to modify the score file, it uses this ACP, running as whoever invoked the game. In principle, an intruder could look in the program, decode it, and extract the ACP. But if he did, all the intruder would get would be the ability to modify the high score file for this particular game. The alternative for a network setuid facility would be to encode something equivalent to the author's full rights, such as his password, in the program. Use of the ACP limits the damage if the program is decoded. For certain applications, this can provide adequate security.

6. Conclusion

Access control programs (ACPs) permit controlled delegation of access rights to untrusted computer hosts. If an initiator of an action does not fully trust an intermediary, then it can create an ACP and pass it to the intermediary. The ACP is executed at a server for each request made by the untrusted intermediary and decides whether or not to allow the request. An ACP cannot grant rights that its creator did not possess; it can only restrict these rights.

ACPs can be incorporated into current systems to augment such systems' existing access control facilities. Typically this incorporation requires only digital signatures, two-party authentication, and an interpreter for the ACP language. The exact implementation in each case depends on the specifics of the underlying system. One of the strengths of the ACP design is that it places no assumption on the type of access control provided by the system or on the authentication protocol employed. ACPs can be used with both public and private-key based security mechanisms.

All decisions about the rights delegated by an ACP are incorporated into the ACP itself, including who is allowed to use the ACP and for how long. Because ACPs bear the power of a full programming language, a wide range of access control policies can be implemented by clients without the involvement of servers. Because ACPs are fully contained and digitally signed, they can be freely passed around. Typically, a client will pass an ACP along with an operation request or with a connection setup request. However, ACPs can also be published, in which case, a request need only identify which ACP authorizes it.

The power of ACPs must be used carefully. In particular, servers must protect themselves from malicious or buggy ACPs. Creators of ACPs must take care to avoid inadvertently delegating excessive rights. Servers can protect themselves by using a carefully coded interpreter. The use of templates and ACP language defaults as described above can aid the construction of correct ACPs.

A general problem of restricted delegation is that the initiator must know enough about the implementation of the intermediary to delegate the appropriate set of access rights. Clients tend to think in terms of high-level operations, such as "print this file", while the accesses made by intermediaries to servers involve lower-level operations, such as "stat this directory then retrieve the file with this unique ID." ACP translation tools-that is, software tools that translate an ACP program expressed in a form convenient for the programmer into an ACP program expressed in a form usable by the server-can be written to provide help in coping with this problem.

Although the above is a complete description of certain embodiments and aspects of the invention, various alternatives, modifications, and equivalents can be used. Therefore, the above description should not be taken as limiting the scope of the invention. Rather, the scope of the invention is defined by the appended claims along with the full scope of equivalents to which these claims are entitled.

MAIL 14 JUN 1993 PAT. & TRADEMARK OFF.

XEROX

D/92140 nichols

Document name: Diffs
Printing date/time: June 2, 1993 11:45:57 am PDT
Host name: osprey This file, "Diffs," represents the differences in source code between release 3 of the Andrew File System (as it appeared on the August 19, 1990 Mt. Xinu release tape of the Mach operating system) and a modified version of release 3 of the Andrew File System, described elsewhere in this application, that embodies the method of the present invention.

The modifications made to Andrew File System release 3 (as it appeared on the August 19, 1990 Mt. Xinu release tape of the Mach operating system) in order to produce the embodiment of the present invention in a modified version of the Andrew File System as described elsewhere in this application represent original unpublished work of Xerox Corporation. This original unpublished work is Copyright ©1991 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

nichols

C05d: Mon May 24 12:24:03 PDT 1993 Job #588

93/06/02
11:36:56

Diffs

1

```
===================================================================
RCS file: auth/RCS/auth.p.h,v
retrieving revision 1.1
diff -c -r1.1 auth/auth.p.h
*** 1.1 1991/02/04 13:14:20
--- auth/auth.p.h       1991/02/04 21:15:28
***************
*** 13,19 ****
                /* no ticket good for longer than 30 days */
  #define MAXKTCTICKETLIFETIME (30*24*3600)
  #define MINKTCTICKETLEN         32
! #define       MAXKTCTICKETLEN   344
  #define       MAXKTCNAMELEN     64      /* name & inst should be 256 */
  #define MAXKTCREALMLEN          64      /* should be 256 */
  #define KTC_TIME_UNCERTAINTY (15*60)  /* max skew separating machines' clocks */
--- 13,19 ----
                /* no ticket good for longer than 30 days */
  #define MAXKTCTICKETLIFETIME (30*24*3600)
  #define MINKTCTICKETLEN         32
! #define       MAXKTCTICKETLEN   2000    /* was 344 -dn */
  #define       MAXKTCNAMELEN     64      /* name & inst should be 256 */
  #define MAXKTCREALMLEN          64      /* should be 256 */
  #define KTC_TIME_UNCERTAINTY (15*60)  /* max skew separating machines' clocks */
```

```
===================================================================
RCS file: kauth/RCS/Makefile,v
retrieving revision 1.1
diff -c -r1.1 kauth/Makefile
*** 1.1 1991/01/30 12:56:07
--- kauth/Makefile      1991/02/05 22:53:24
***************
*** 13,19 ****
  INSTALL=${SRCDIR}bin/install
  COMPILE_ET = ${SRCDIR}bin/compile_et

! CFLAGS = -g -I${SRCDIR}include ${AIXCOPTS}
  INCLS=${SRCDIR}include/ubik.h \
        ${SRCDIR}include/lwp.h \
        ${SRCDIR}include/lock.h  \
--- 13,19 ----
  INSTALL=${SRCDIR}bin/install
  COMPILE_ET = ${SRCDIR}bin/compile_et

! CFLAGS = -g -I${SRCDIR}include ${AIXCOPTS} -Bstatic
  INCLS=${SRCDIR}include/ubik.h \
        ${SRCDIR}include/lwp.h \
        ${SRCDIR}include/lock.h  \
***************
*** 98,104 ****
        cc -o kas kas.o admin_tools.o libkauth.a ${LIBS}

  klog: kauth.h kautils.h libkauth.a ${LIBS} krb_tf.o klog.o
!       cc -o klog klog.o krb_tf.o libkauth.a ${LIBS}

  klogin.o: klogin.c ${INCLS}
        cc ${CFLAGS} -c klogin.c -DKAUTH
--- 98,104 ----
        cc -o kas kas.o admin_tools.o libkauth.a ${LIBS}

  klog: kauth.h kautils.h libkauth.a ${LIBS} krb_tf.o klog.o
!       cc -o klog klog.o krb_tf.o libkauth.a ${LIBS} -Bstatic

  klogin.o: klogin.c ${INCLS}
        cc ${CFLAGS} -c klogin.c -DKAUTH
```

93/06/02
11:36:56

Diffs

2

```
=====================================================================
RCS file: kauth/RCS/authclient.c,v
retrieving revision 1.1
diff -c -r1.1 kauth/authclient.c
*** 1.1 1991/02/04 13:16:43
--- kauth/authclient.c  1991/02/05 01:23:40
***************
*** 539,544 ****
--- 539,560 ----
    struct ktc_token   *auth_token;
    char                    *auth_domain;
    struct ktc_token   *token;
+ {
+     return ka_GetTokenACP(name, instance, conn, start, end, NULL, 0,
+                           auth_token, auth_domain, token);
+ }
+
+ long ka_GetTokenACP (name, instance, conn, start, end, acp, acpLen,
+                    auth_token, auth_domain, token)
+   char                    *name;
+   char                    *instance;
+   struct ubik_client *conn;          /* Ubik conn to cell's AuthServer */
+   Date                     start, end;      /* desired ticket lifetime */
+   char                    *acp;             /* acp, if any */
+   long                     acpLen;
+   struct ktc_token   *auth_token;
+   char                    *auth_domain;
+   struct ktc_token   *token;
  {   struct ka_getTicketTimes times;
      struct ka_getTicketAnswer answer_old;
      struct ka_ticketAnswer answer;
***************
*** 545,550 ****
--- 561,567 ----
      long  code;
      ka_CBS aticket;
      ka_CBS atimes;
+     ka_CBS anAcp;
      ka_BBS oanswer;
      char *strings;
      int        len;
***************
*** 564,576 ****
      atimes.SeqLen = sizeof(times);
      atimes.SeqBody = (char *)&times;

      oanswer.SeqLen = 0;
      oanswer.MaxSeqLen = sizeof(answer);
      oanswer.SeqBody = (char *)&answer;

      version = 1;
!     code = ubik_Call (KAT_GetTicket, conn, 0, auth_token->kvno, auth_domain, &aticket,
!                     name, instance, &atimes, &oanswer);
      if (code == RXGEN_OPCODE) {
        extern int KAT_GetTicket_old ();
        oanswer.SeqLen = 0;           /* this may be set by first call */
--- 581,597 ----
      atimes.SeqLen = sizeof(times);
      atimes.SeqBody = (char *)&times;

+     anAcp.SeqLen = acpLen;
+     anAcp.SeqBody = acp;
+
      oanswer.SeqLen = 0;
      oanswer.MaxSeqLen = sizeof(answer);
      oanswer.SeqBody = (char *)&answer;

      version = 1;
!     code = ubik_Call (KAT_GetTicketACP, conn, 0, auth_token->kvno,
!                     auth_domain, &aticket, name, instance, &atimes,
!                     &anAcp, &oanswer);
      if (code == RXGEN_OPCODE) {
        extern int KAT_GetTicket_old ();
        oanswer.SeqLen = 0;           /* this may be set by first call */
```

93/06/02
11:36:56

Diffs

3

```
===================================================================
RCS file: kauth/RCS/kaprocs.c,v
retrieving revision 1.1
diff -c -r1.1 kauth/kaprocs.c
*** 1.1 1991/02/04 13:17:05
--- kauth/kaprocs.c     1991/02/04 22:59:33
***************
*** 1395,1401 ****
      return code;
  }

! static long GetTicket (version, call, kvno, authDomain, aticket, sname, sinstance, ati
mes, oanswer)
    int   version;
    struct rx_call      *call;
    long                      kvno;
--- 1395,1402 ----
      return code;
  }

! static long GetTicket (version, call, kvno, authDomain, aticket, sname,
!                        sinstance, atimes, acp, oanswer)
    int   version;
    struct rx_call      *call;
    long                      kvno;
***************
*** 1404,1409 ****
--- 1405,1411 ----
    char                      *sname;
    char                      *sinstance;
    ka_CBS            *atimes;          /* encrypted start & end time */
+   ka_CBS            *acp;
    ka_BBS            *oanswer;
  {   long              code;
      int                       import, export;
***************
*** 1507,1517 ****
                umin (times.start+ntohl(caller.max_ticket_lifetime),
                      times.start+ntohl(server.max_ticket_lifetime));

!     code = tkt_MakeTicket (ticket, &ticketLen, &server.key,
!                           caller.userID.name, caller.userID.instance, cell,
!                           times.start, end, &sessionKey,
!                           rx_HostOf(rx_PeerOf(rx_ConnectionOf(call))),
!                           server.userID.name, server.userID.instance);
      if (code) goto abort;

      switch (version) {
--- 1509,1521 ----
                umin (times.start+ntohl(caller.max_ticket_lifetime),
                      times.start+ntohl(server.max_ticket_lifetime));

!     code = tkt_MakeTicketACP(ticket, &ticketLen, &server.key,
!                           caller.userID.name, caller.userID.instance, cell,
!                           times.start, end, &sessionKey,
!                           rx_HostOf(rx_PeerOf(rx_ConnectionOf(call))),
!                           server.userID.name, server.userID.instance,
!                           acp == NULL ? NULL : acp->SeqBody,
!                           acp == NULL ? 0 : acp->SeqLen);
      if (code) goto abort;

      switch (version) {
***************
*** 1575,1581 ****
    ka_CBS            *atimes;          /* encrypted start & end time */
    ka_BBS            *oanswer;
  {
!     return GetTicket (0, call, kvno, authDomain, aticket, sname, sinstance, atimes, oan
swer);
  }

  long KAT_GetTicket (call, kvno, authDomain, aticket, sname, sinstance, atimes, oanswer)
--- 1579,1586 ----
    ka_CBS            *atimes;          /* encrypted start & end time */
    ka_BBS            *oanswer;
  {
!     return GetTicket (0, call, kvno, authDomain, aticket, sname, sinstance,
!                       atimes, NULL, oanswer);
  }

  long KAT_GetTicket (call, kvno, authDomain, aticket, sname, sinstance, atimes, oans
***************
*** 1588,1594 ****
    ka_CBS            *atimes;          /* encrypted start & end time */
    ka_BBS            *oanswer;
  {
!     return GetTicket (1, call, kvno, authDomain, aticket, sname, sinstance, atimes, oan
swer);
  }

  long KAM_GetStats (call, version, admin_accounts, statics, dynamics)
--- 1593,1616 ----
    ka_CBS            *atimes;          /* encrypted start & end time */
    ka_BBS            *oanswer;
  {
!     return GetTicket (1, call, kvno, authDomain, aticket, sname, sinstance,
!                       atimes, NULL, oanswer);
! }
!
! long KAT_GetTicketACP (call, kvno, authDomain, aticket, sname, sinstance,
!                        atimes, acp, oanswer)
!   struct rx_call      *call;
!   long                      kvno;
!   char                      *authDomain;
!   ka_CBS            *aticket;
!   char                      *sname;
!   char                      *sinstance;
!   ka_CBS            *atimes;          /* encrypted start & end time */
!   ka_CBS            *acp;
!   ka_BBS            *oanswer;
! {
!     return GetTicket (1, call, kvno, authDomain, aticket, sname, sinstance,
!                       atimes, acp, oanswer);
  }

  long KAM_GetStats (call, version, admin_accounts, statics, dynamics)
```

93/06/02
11:36:56

```
=====================================================================
RCS file: kauth/RCS/kauth.rg.v
retrieving revision 1.1
diff -c -r1.1 kauth/kauth.rg
*** 1.1 1991/02/04 13:16:59
--- kauth/kauth.rg      1991/02/04 21:20:15
***************
*** 323,328 ****
--- 323,333 ----
    (IN long kvno, IN kaname auth_domain, IN struct ka_CBS *aticket,
     IN kaname name, IN kaname instance, IN struct ka_CBS *atimes,
     INOUT struct ka_BBS *oanswer) = 23;
+ /* New -dn */
+ proc GetTicketACP
+   (IN long kvno, IN kaname auth_domain, IN struct ka_CBS *aticket,
+    IN kaname name, IN kaname instance, IN struct ka_CBS *atimes,
+    IN ka_CBS *acp, INOUT struct ka_BBS *oanswer) = 24;

  package KAM_
```

Diffs

4

```
=====================================================================
RCS file: kauth/RCS/klog.c,v
retrieving revision 1.1
diff -c -r1.1 kauth/klog.c
*** 1.1 1991/02/04 13:16:08
--- kauth/klog.c        1991/02/24 02:15:18
***************
*** 95,100 ****
--- 95,101 ----
      /* These two needed for rxgen output to work */
  #include <afs/param.h>
  #include <sys/types.h>
+ #include <sys/stat.h>
  #include <rx/xdr.h>

  #include <lock.h>
***************
*** 164,169 ****
--- 165,172 ----
  #define aCELL 4
  #define aSERVERS 5
  #define aPIPE 6
+ #define aACP 7
+ #define aACPFILE 8

      cmd_AddParm(ts, "-x", CMD_FLAG, CMD_OPTIONAL, "don't check /etc/passwd");
      cmd_AddParm(ts, "-principal", CMD_SINGLE, CMD_OPTIONAL, "user name");
***************
*** 172,177 ****
--- 175,184 ----
      cmd_AddParm(ts, "-cell", CMD_SINGLE, CMD_OPTIONAL, "cell name");
      cmd_AddParm(ts, "-servers", CMD_LIST, CMD_OPTIONAL, "explicit list of servers");
      cmd_AddParm(ts, "-pipe", CMD_FLAG, CMD_OPTIONAL, "silent operation");
+     cmd_AddParm(ts, "-acp", CMD_SINGLE, CMD_OPTIONAL,
+             "access control program");
+     cmd_AddParm(ts, "-acpfile", CMD_SINGLE, CMD_OPTIONAL,
+             "file containing access control program");

      code = cmd_Dispatch(argc, argv);
      exit(code != 0);
***************
*** 205,210 ****
--- 212,219 ----
      char  lrealm[MAXKTCREALMLEN];     /* uppercase copy of local cellname */
      int         code;
      int   i;
+     char *acp = NULL;
+     long  acpLen = 0;

      struct ktc_encryptionKey key;

***************
*** 333,338 ****
--- 342,366 ----
              strlen(as->parms[aPASSWORD].items->data));
      }

+     if (as->parms[aACP].items) {
+       /* Save away the ACP. */
+       acp = as->parms[aACP].items->data;
+       acpLen = strlen(acp);
+     }
+     if (as->parms[aACPFILE].items) {
+       /* Read file and save acp. */
```

Diffs

93/06/02 11:36:56

5

```
+       int f = open(as->parms[aACPFILE].items->data, 0);
+       struct stat s;
+       if (f < 0 || fstat(f, &s) < 0) {
+           perror("open or stat");
+           exit(1);
+       }
+       acpLen = s.st_size;
+       acp = malloc(acpLen + 1);
+       acp[acpLen] = 0;
+       read(f, acp, acpLen);
+     }
+
      if (!foundExplicitCell) strcpy (realm, lcell);
      if (code = ka_CellToRealm (realm, realm, &local)) {
        if (!Pipe) com_err (rn, code, "Can't convert cell to realm");
***************
*** 370,377 ****

      if (explicit) ka_ExplicitCell (realm, serverList);

!     code = ka_UserAuthenticate (pw->pw_name, instance, realm,
!                                 passwd, /*sepag*/0, &reason);
      bzero (passwd, sizeof(passwd));
      if (code) {
        if (!Pipe)
--- 398,409 ----

      if (explicit) ka_ExplicitCell (realm, serverList);

!     if (acpLen > 0)
!       code = ka_UserAuthenticateACP(pw->pw_name, instance, realm, acp,
!                                     acpLen, passwd, /*sepag*/0, &reason);
!     else
!       code = ka_UserAuthenticate(pw->pw_name, instance, realm,
!                                  passwd, /*sepag*/0, &reason);
      bzero (passwd, sizeof(passwd));
      if (code) {
        if (!Pipe)
```

```
===================================================================
RCS file: kauth/RCS/token.c,v
retrieving revision 1.1
diff -c -r1.1 kauth/token.c
*** 1.1 1991/02/04 13:16:37
--- kauth/token.c       1991/02/05 01:26:10
***************
*** 132,137 ****
--- 132,152 ----
    Date  lifetime;
    struct ktc_token *token;
    int   new;
+ {
+     return ka_GetServerTokenACP(name, instance, cell, lifetime, NULL, 0,
+                                 token, new);
+ }
+
+ long ka_GetServerTokenACP(name, instance, cell, lifetime, acp, acpLen,
+                           token, new)
+   char *name;
+   char *instance;
+   char *cell;
+   Date  lifetime;
+   char *acp;
+   long acpLen;
+   struct ktc_token *token;
+   int   new;
  {   long               code;
      struct ubik_client *conn;
      long               now = time(0);
***************
*** 200,207 ****

      if (code = ka_AuthServerConn (cell, KA_TICKET_GRANTING_SERVICE, 0, &conn))
        return code;
!     if (code = ka_GetToken (name, instance, conn, now, now+lifetime,
!                             &auth_token, authDomain, token))
        return code;

      if (code = ktc_SetToken (&server, token, &client))
--- 215,222 ----

      if (code = ka_AuthServerConn (cell, KA_TICKET_GRANTING_SERVICE, 0, &conn))
        return code;
!     if (code = ka_GetTokenACP(name, instance, conn, now, now+lifetime,
!                               acp, acpLen, &auth_token, authDomain, token))
        return code;

      if (code = ktc_SetToken (&server, token, &client))
```

93/06/02
11:36:56

Diffs

6

```
========================================================================
RCS file: kauth/RCS/user.c,v
retrieving revision 1.1
diff -c -r1.1 kauth/user.c
*** 1.1 1991/02/04 13:16:32
--- kauth/user.c        1991/02/05 22:40:41
***************
*** 17,26 ****
  #include "kauth.h"
  #include "kautils.h"

! static long GetTickets (name, instance, realm, keyP)
    char *name;
    char *instance;
    char *realm;
    struct ktc_encryptionKey *keyP;
  {
      long code;
--- 17,28 ----
  #include "kauth.h"
  #include "kautils.h"

! static long GetTickets (name, instance, realm, acp, acpLen, keyP)
    char *name;
    char *instance;
    char *realm;
+   char *acp;
+   long acpLen;
    struct ktc_encryptionKey *keyP;
  {
      long code;
***************
*** 30,36 ****
      code = ka_GetAuthToken (name, instance, realm, keyP, 25*3600);
      bzero (keyP, sizeof(*keyP));
      if (code) return code;
!     code = ka_GetServerToken ("afs", "", realm, 25*3600, &token, /*new*/1);
      if (code) return code;
      if (ktc_OldPioctl()) {
        int local;
--- 32,39 ----
      code = ka_GetAuthToken (name, instance, realm, keyP, 25*3600);
      bzero (keyP, sizeof(*keyP));
      if (code) return code;
!     code = ka_GetServerTokenACP("afs", "", realm, 25*3600, acp, acpLen,
!                                 &token, /*new*/1);
      if (code) return code;
      if (ktc_OldPioctl()) {
        int local;
***************
*** 84,89 ****
--- 87,107 ----
    int   doSetPAG;
    char **reasonP;
  {
+     return ka_UserAuthenticateACP(name, instance, realm, NULL, 0,
+                                   password, doSetPAG, reasonP);
+ }
+
+ long ka_UserAuthenticateACP(name, instance, realm, acp, acpLen,
+                             password, doSetPAG, reasonP)
+   char *name;
+   char *instance;
+   char *realm;
+   char *acp;
+   long acpLen;
+   char *password;
+   int   doSetPAG;
+   char **reasonP;
+ {
      int remainingTime = 0;
      struct ktc_encryptionKey key;
      long code;
***************
*** 111,117 ****

      if (doSetPAG) setpag();
      if (instance == 0) instance = "";
!     code = GetTickets (name, instance, realm, &key);
      if ((code == KABADREQUEST) && (strlen (password) > 8)) {
        /* try with only the first 8 characters incase they set their password
           * with an old style passwd program. */
--- 129,135 ----

      if (doSetPAG) setpag();
      if (instance == 0) instance = "";
!     code = GetTickets (name, instance, realm, acp, acpLen, &key);
      if ((code == KABADREQUEST) && (strlen (password) > 8)) {
        /* try with only the first 8 characters incase they set their password
           * with an old style passwd program. */
***************
*** 120,126 ****
        pass8[8] = 0;
        ka_StringToKey (pass8, realm, &key);
        bzero (pass8, sizeof(pass8));
!       code = GetTickets (name, instance, realm, &key);
        if (code == 0) {
            fprintf (stderr, "Warning: you have typed a password longer than 8 characters
, but only the\n");
            fprintf (stderr, "first 8 characters were actually significant.  If you chang
e your password\n");
--- 138,144 ----
        pass8[8] = 0;
        ka_StringToKey (pass8, realm, &key);
        bzero (pass8, sizeof(pass8));
!       code = GetTickets (name, instance, realm, acp, acpLen, &key);
        if (code == 0) {
            fprintf (stderr, "Warning: you have typed a password longer than 8 characters
, but only the\n");
            fprintf (stderr, "first 8 characters were actually significant.  If you chang
e your password\n");
```

93/06/02
11:36:56

Diffs

7

```
===================================================================
RCS file: rxkad/RCS/Makefile,v
retrieving revision 1.1
diff -c -r1.1 rxkad/Makefile
*** 1.1 1991/02/06 12:06:23
--- rxkad/Makefile      1991/02/06 20:06:56
***************
*** 14,20 ****
  INSTALL=${SRCDIR}bin/install
  COMPILE_ET = ${SRCDIR}bin/compile_et

! CFLAGS = -g -I${SRCDIR}include
  INCLS= ${SRCDIR}include/rx/rx.h \
         ${SRCDIR}include/rx/xdr.h \
         fcrypt.h rxkad.h
--- 14,20 ----
  INSTALL=${SRCDIR}bin/install
  COMPILE_ET = ${SRCDIR}bin/compile_et

! CFLAGS = -g -I${SRCDIR}include -DMYDEBUG
  INCLS= ${SRCDIR}include/rx/rx.h \
         ${SRCDIR}include/rx/xdr.h \
         fcrypt.h rxkad.h
```

```
===================================================================
RCS file: rxkad/RCS/rxkad_server.c,v
retrieving revision 1.1
diff -c -r1.1 rxkad/rxkad_server.c
*** 1.1 1991/02/05 13:01:33
--- rxkad/rxkad_server.c        1991/02/12 07:05:06
***************
*** 171,176 ****
--- 171,178 ----
      unsigned long start;
      unsigned long end;
      struct rxkad_serverinfo *rock;
+     char acp[2000];
+     long acpLen = sizeof(acp);

      sconn = (struct rxkad_sconn *) aconn->securityData;
      tsp = (struct rxkad_sprivate *) aobj->privateData;
***************
*** 192,213 ****
      bcopy(tp, tix, tlen);             /* get ticket */

      code = (*tsp->get_key)(tsp->get_key_rock, kvno, &serverKey); /* get ticket's key */
!     if (code) return RXKADUNKNOWNKEY; /* invalid kvno */
!     code = tkt_DecodeTicket (tix, tlen, &serverKey, client.name, client.instance, clien
t.cell,
!                             &sessionkey, &host, &start, &end);
!     if (code) return RXKADBADTICKET;
      code = tkt_CheckTimes (start, end, time(0));
!     if (code == -1) return RXKADEXPIRED;
!     else if (code <= 0) return RXKADNOAUTH;

      code = fc_keysched (&sessionkey, sconn->keysched);
!     if (code) return RXKADBADKEY;
      bcopy (&sessionkey, sconn->ivec, sizeof(sconn->ivec));

      fc_ecb_encrypt(a, a, sconn->keysched, DECRYPT);
!     if (ntohl(a[0]) != sconn->challengeID+1) return RXKADOUTOFSEQUENCE; /* replay attem
pt */
      a[1] = ntohl(a[1]);                       /* remember client's packet sequence numb
er */
!     if ((a[1] < sconn->level) || (a[1] > rxkad_crypt)) return RXKADLEVELFAIL;
      sconn->level = a[1];
      rxkad_SetLevel (aconn, sconn->level);

--- 194,252 ----
      bcopy(tp, tix, tlen);             /* get ticket */

      code = (*tsp->get_key)(tsp->get_key_rock, kvno, &serverKey); /* get ticket's key */
!     if (code) {
! #ifdef MYDEBUG
!         printf("Tickets bad: unknown key\n");
! #endif
!         return RXKADUNKNOWNKEY; /* invalid kvno */
!     }
!     code = tkt_DecodeTicketACP(tix, tlen, &serverKey, client.name,
!                               client.instance, client.cell,
!                               &sessionkey, &host, &start, &end,
!                               acp, &acpLen);
!     if (code) {
! #ifdef MYDEBUG
!         printf("Tickets can't decode, err %d.\n", code);
! #endif
!         return RXKADBADTICKET;
!     }
```

93/06/02
11:36:56

Diffs

8

```
      code = tkt_CheckTimes (start, end, time(0));
!     if (code == -1) {
! #ifdef MYDEBUG
!         printf("Tickets have expired.\n");
! #endif
!         return RXKADEXPIRED;
!     }
!     else if (code <= 0) {
! #ifdef MYDEBUG
!         printf("Tickets bad: no auth(?)\n");
! #endif
!         return RXKADNOAUTH;
!     }

      code = fc_keysched (&sessionkey, sconn->keysched);
!     if (code) {
! #ifdef MYDEBUG
!         printf("Tickets bad: bad key.\n");
! #endif
!         return RXKADBADKEY;
!     }
      bcopy (&sessionkey, sconn->ivec, sizeof(sconn->ivec));

      fc_ecb_encrypt(a, a, sconn->keysched, DECRYPT);
!     if (ntohl(a[0]) != sconn->challengeID+1) {
! #ifdef MYDEBUG
!         printf("Bad challenge: replay attempt.\n");
! #endif
!         return RXKADOUTOFSEQUENCE; /* replay attempt */
!     }
      a[1] = ntohl(a[1]);                       /* remember client's packet sequence num
ber */
!     if ((a[1] < sconn->level) || (a[1] > rxkad_crypt)) {
! #ifdef MYDEBUG
!         printf("Bad challenge: auth level wrong.\n");
! #endif
!         return RXKADLEVELFAIL;
!     }
      sconn->level = a[1];
      rxkad_SetLevel (aconn, sconn->level);

***************
*** 217,234 ****

      if (tsp->user_ok) {
        code = tsp->user_ok (client.name, client.instance, client.cell, kvno);
!       if (code) return RXKADNOAUTH;
      }
      else {                              /* save the info for later retreival */
!       rock = (struct rxkad_serverinfo *)osi_Alloc(sizeof(struct rxkad_serverinfo));
        if (rock) {
            rock->type = kvno;
            bcopy (&client, &rock->client, sizeof(rock->client));
            sconn->rock = rock;
        }
      }
      return 0;
  }

  /* return useful authentication info about a server-side connection */

--- 256,302 ----

      if (tsp->user_ok) {
        code = tsp->user_ok (client.name, client.instance, client.cell, kvno);
!       if (code) {
! #ifdef MYDEBUG
!           printf("Bad auth: server code nixed it.\n");
! #endif
!           return RXKADNOAUTH;
!       }
      }
      else {                              /* save the info for later retreival */
!       rock = (struct rxkad_serverinfo *)
!           osi_Alloc(sizeof(struct rxkad_serverinfo) + acpLen + 1);
        if (rock) {
            rock->type = kvno;
            bcopy (&client, &rock->client, sizeof(rock->client));
            sconn->rock = rock;
+           rock->acpLen = acpLen;
+           if (acpLen > 0) {
+               bcopy(acp, rock->acp, acpLen);
+               /* Null terminate it, too. */
+               rock->acp[acpLen] = 0;
+           }
+           else
+               rock->acp[0] = 0;
        }
      }
      return 0;
  }
+
+ /* Return the saved ACP from a connection. */
+ char *rxkad_GetACP(aconn, len)
+     struct rx_connection *aconn;
+     long *len;
+ {
+     struct rxkad_sconn *sconn;
+
+     sconn = (struct rxkad_sconn *) aconn->securityData;
+     if (sconn->rock->acpLen == 0)
+       return NULL;
+     *len = sconn->rock->acpLen;
+     return sconn->rock->acp;
+ }
+

  /* return useful authentication info about a server-side connection */
```

93/06/02 11:36:56

Diffs

9

```
==========================================================================
RCS file: rxkad/RCS/ticket.c,v
retrieving revision 1.1
diff -c -r1.1 rxkad/ticket.c
*** 1.1 1991/02/04 13:26:17
--- rxkad/ticket.c      1991/02/07 04:47:02
***************
*** 77,82 ****
--- 77,83 ----
  extern unsigned char time_to_life();

  #define ANDREWFLAGSVALUE (0x80)
+ #define ATHENAACPFLAGSVALUE (0x40)
  #define TICKET_LABEL "TicketEnd"

  /* This is called to interpret a ticket.  It is assumed that the necessary keys
***************
*** 98,103 ****
--- 99,124 ----
    long                *host;
    long                *start;
    long                *end;
+ {
+     return tkt_DecodeTicketACP(asecret, ticketLen, key, name, inst, cell,
+                                sessionKey, host, start, end, NULL, NULL);
+ }
+
+ /* Version that returns an ACP if its in there.. */
+ int tkt_DecodeTicketACP (asecret, ticketLen, key, name, inst, cell,
+                          sessionKey, host, start, end, acp, acpLen)
+   char                *asecret;
+   long                 ticketLen;
+   struct ktc_encryptionKey *key;
+   char                *name;
+   char                *inst;
+   char                *cell;
+   char                *sessionKey;
+   long                *host;
+   long                *start;
+   long                *end;
+   char                *acp;          /* where to put acp */
+   long                *acpLen;       /* in/out: max length/actual length */
  {   char         clear_ticket[MAXKTCTICKETLEN];
      char        *ticket;
      Key_schedule   schedule;
***************
*** 119,137 ****
        code = decode_andrew_ticket
            (ticket, ticketLen, name, inst, cell, host, sessionKey, start, end);
        if (code) {
!           code = decode_athena_ticket
!               (ticket, ticketLen, name, inst, cell, host, sessionKey, start, end);
            flags = 0;
        }
      }
      else {
!       code = decode_athena_ticket
!           (ticket, ticketLen, name, inst, cell, host, sessionKey, start, end);
        if (code) {
            code = decode_andrew_ticket
                (ticket, ticketLen, name, inst, cell, host, sessionKey, start, end);
            flags = ANDREWFLAGSVALUE;
        }
      }
      if (code) return RXKADBADTICKET;
      if (tkt_CheckTimes (*start, *end, time(0)) < -1) return RXKADBADTICKET;
--- 140,166 ----
        code = decode_andrew_ticket
            (ticket, ticketLen, name, inst, cell, host, sessionKey, start, end);
        if (code) {
!           code = decode_athena_ticket(ticket, ticketLen, name, inst,
!                                       cell, host, sessionKey, start, end,
!                                       acp, acpLen);
            flags = 0;
        }
+       else {
+           if (acpLen != 0)
+               *acpLen = 0;            /* none present by default */
+       }
      }
      else {
!       code = decode_athena_ticket(ticket, ticketLen, name, inst, cell,
!                                   host, sessionKey, start, end,
!                                   acp, acpLen);
        if (code) {
            code = decode_andrew_ticket
                (ticket, ticketLen, name, inst, cell, host, sessionKey, start, end);
            flags = ANDREWFLAGSVALUE;
        }
+       else
+           flags = 0;          /* even if ACP present */
      }
      if (code) return RXKADBADTICKET;
      if (tkt_CheckTimes (*start, *end, time(0)) < -1) return RXKADBADTICKET;
***************
*** 154,185 ****
    unsigned long        host;                  /* caller's host address */
    char                *sname;                 /* server */
    char                *sinst;
! {   int                code;
      Key_schedule schedule;

!     *ticketLen = 0;                   /* in case we return early */
  #ifdef notdef
!     if ((strncmp (sname, "afs", 4) == 0) && (time(0) & 3 != 0))
        code = assemble_andrew_ticket
!           (ticket, ticketLen, name, inst, cell, host, sessionKey, start, end);
! #else notdef
      if (0) {
        /* never assemble andrew tickets for now */
      }
! #endif notdef
!     else {                            /* make athena style ticket if we can't be sure *
/
!       code = assemble_athena_ticket
!           (ticket, ticketLen, name, inst, cell, host, sessionKey, start, end, sname, si
nst);
!       *ticketLen = round_up_to_ebs(*ticketLen); /* round up */
      }
!     if (code) return -1;

      /* encrypt ticket */
!     if (code = key_sched (key, schedule)) {
!       printf ("In tkt_MakeTicket: key_sched returned %d\n", code);
        return RXKADBADKEY;
      }
!     pcbc_encrypt (ticket, ticket, *ticketLen, schedule, key, ENCRYPT);
      return 0;
```

93/06/02
11:36:56

Diffs

10

```
  }

--- 183,239 ----
    unsigned long        host;                   /* caller's host address */
    char                 *sname;                 /* server */
    char                 *sinst;
! {
!     return tkt_MakeTicketACP(ticket, ticketLen, key, name, inst, cell,
!                              start, end, sessionKey, host, sname, sinst,
!                              NULL, 0);
! }
!
! int tkt_MakeTicketACP (ticket, ticketLen, key, name, inst, cell, start,
!                        end, sessionKey, host, sname, sinst, acp, acpLen)
!   char                 *ticket;        /* ticket is constructed here */
!   int         *ticketLen;      /* returned length of finished ticket */
!   struct ktc_encryptionKey *key; /* the key the ticket should be sealed with */
!   char                 *name;          /* user of this ticket */
!   char                 *inst;
!   char                 *cell;          /* cell of authentication */
!   unsigned long        start,end;      /* life of ticket */
!   struct ktc_encryptionKey *sessionKey;       /* session key invented for this ticket
*/
!   unsigned long        host;           /* caller's host address */
!   char                 *sname;         /* server */
!   char                 *sinst;
!   char                 *acp;           /* access control program */
!   long                 acpLen;         /* its length */
! {
!     int code;
      Key_schedule schedule;

!     *ticketLen = 0;            /* in case we return early */
 #ifdef notdef
      if ((strncmp(sname, "afs", 4) == 0) && (time(0) & 3 != 0))
        code = assemble_andrew_ticket
!         (ticket, ticketLen, name, inst, cell, host, sessionKey, start, end);
! #else /* notdef */
      if (0) {
        /* never assemble andrew tickets for now */
      }
! #endif        /* notdef */
!     else {                   /* make athena style ticket if we can't be
!                                 sure */
!       code = assemble_athena_ticket(ticket, ticketLen, name, inst, cell,
!                                     host, sessionKey, start, end, sname,
!                                     sinst, acp, acpLen);
!       *ticketLen = round_up_to_ebs(*ticketLen);       /* round up */
      }
!     if (code)
!       return -1;

      /* encrypt ticket */
!     if (code = key_sched(key, schedule)) {
!       printf("In tkt_MakeTicket: key_sched returned %d\n", code);
        return RXKADBADKEY;
      }
!     pcbc_encrypt(ticket, ticket, *ticketLen, schedule, key, ENCRYPT);
      return 0;
  }

***************
*** 230,237 ****
      return 0;
```

```
  }

! static int decode_athena_ticket (ticket, ticketLen, name, inst, realm, host, sessionKey
,
!                                  start, end)
    char *ticket;
    int   ticketLen;
    char *name;
--- 284,291 ----
      return 0;
  }

! static int decode_athena_ticket (ticket, ticketLen, name, inst, realm,
!                                  host, sessionKey, start, end, acp, acpLen)
    char *ticket;
    int   ticketLen;
    char *name;
***************
*** 241,246 ****
--- 295,302 ----
    struct ktc_encryptionKey *sessionKey;
    unsigned long *start;
    unsigned long *end;
+   char *acp;
+   long *acpLen;
  {   char *ticketBeg = ticket;
      char  flags;
      int         slen;
***************
*** 248,253 ****
--- 304,310 ----
      unsigned char  lifetime;
      char  sname[MAXKTCNAMELEN];              /* these aren't used, */
      char  sinst[MAXKTCNAMELEN];              /* but are in the ticket */
+     long  alen;

      flags = *ticket++;
      getstr (name, 1);
***************
*** 269,274 ****
--- 326,349 ----

      getstr (sname, 1);
      getstr (sinst, 0);
+
+     if (flags & ATHENAACPFLAGSVALUE) {
+       bcopy(ticket, &alen, sizeof(alen));
+       ticket += sizeof(alen);
+       alen = ntohl(alen);
+       /* Give it to the user if it fits */
+       if (acp != NULL && acpLen != NULL && alen <= *acpLen) {
+           *acpLen = alen;
+           bcopy(ticket, acp, alen);
+       }
+       else
+           *acpLen = 0;
+       ticket += alen;
+     }
+     else {
+       if (acpLen != NULL)
+           *acpLen = 0;
+     }

      tlen = ticket - ticketBeg;
```

93/06/02
11:36:56

Diffs

11

```
      if ((round_up_to_ebs(tlen) != ticketLen) && (ticketLen != 56)) return -1;
***************
*** 318,324 ****
      return 0;
  }

! static int assemble_athena_ticket (ticket, ticketLen, name, inst, realm, host, session
Key, start, end, sname, sinst)
    char *ticket;
    int  *ticketLen;
    char *name;
--- 393,401 ----
      return 0;
  }

! static int assemble_athena_ticket (ticket, ticketLen, name, inst, realm,
!                                    host, sessionKey, start, end, sname,
!                                    sinst, acp, acpLen)
    char *ticket;
    int  *ticketLen;
    char *name;
***************
*** 330,340 ****
    unsigned long end;
    char *sname;
    char *sinst;
  {   char *ticketBeg = ticket;
      int          slen;
      unsigned char  life;

!     *ticket++ = 0;                    /* flags, always send network-byte-order */
      putstr (name, 1);
      putstr (inst, 0);
      putstr (realm, 0);
--- 407,421 ----
    unsigned long end;
    char *sname;
    char *sinst;
+   char *acp;
+   long acpLen;
  {   char *ticketBeg = ticket;
      int          slen;
      unsigned char  life;

!     /* flags, always send network-byte-order */
!     *ticket++ = acpLen == 0 ? 0 : ATHENAACPFLAGSVALUE;
!
      putstr (name, 1);
      putstr (inst, 0);
      putstr (realm, 0);
***************
*** 350,355 ****
--- 431,443 ----
      putint (start);
      putstr (sname, 1);
      putstr (sinst, 0);
+     /* Add access control program if we have one. */
+     if (acpLen != 0) {
+       long x = acpLen;
+       putint (x);
+       bcopy(acp, ticket, acpLen);
+       ticket += acpLen;
+     }
```

```
*ticketLen = ticket - ticketBeg;
return 0;
```

93/06/02
11:36:56

Diffs

12

```
===================================================================
RCS file: viced/RCS/Makefile,v
retrieving revision 1.1
diff -c -r1.1 viced/Makefile
*** 1.1 1991/02/13 11:10:31
--- viced/Makefile      1991/02/13 19:11:46
***************
*** 21,52 ****
        ${SRCDIR}lib/afs/libprot.a      \
        ${SRCDIR}lib/afs/libauth.a      \
        ${SRCDIR}lib/libubik.a          \
!       ${SRCDIR}lib/afs/vlib.a \
        ${SRCDIR}lib/afs/libdir.a       \
!       ${UTILLIB} \
        ${SRCDIR}lib/afs/libsys.a       \
!       ${SRCDIR}lib/afs/libafsint.a \
!       ${SRCDIR}lib/librx.a \
!       ${SRCDIR}lib/libr.a \
!       ${SRCDIR}lib/libscrypt.a \
!       ${SRCDIR}lib/librxkad.a \
!       ${SRCDIR}lib/libdes.a \
!       ${SRCDIR}lib/afs/libcom_err.a \
!       ${SRCDIR}lib/afs/util.a \
!       ${SRCDIR}lib/liblwp.a

  headers=${SRCDIR}include/lwp.h                \
!       ${SRCDIR}include/afs/acl.h              \
        ${SRCDIR}include/afs/errors.h   \
!       ${SRCDIR}include/afs/ptclient.h         \
        ${SRCDIR}include/lock.h         \
        ${SRCDIR}include/afs/volume.h   \
        ${SRCDIR}include/afs/vnode.h    \
!       ${SRCDIR}include/rx/rx.h                \
        ${SRCDIR}include/r/r.h          \
!       ${SRCDIR}include/rx/xdr.h               \
!       ${SRCDIR}include/afs/auth.h             \
!       ${SRCDIR}include/afs/afsint.h           \
        viced.h                         \
        host.h

--- 21,54 ----
        ${SRCDIR}lib/afs/libprot.a      \
        ${SRCDIR}lib/afs/libauth.a      \
        ${SRCDIR}lib/libubik.a          \
!       ${SRCDIR}lib/afs/vlib.a         \
        ${SRCDIR}lib/afs/libdir.a       \
!       ${UTILLIB}                      \
        ${SRCDIR}lib/afs/libsys.a       \
!       ${SRCDIR}lib/afs/libafsint.a    \
!       ${SRCDIR}lib/librx.a            \
!       ${SRCDIR}lib/libr.a             \
!       ${SRCDIR}lib/libscrypt.a        \
!       ${SRCDIR}lib/librxkad.a         \
!       ${SRCDIR}lib/libdes.a           \
!       ${SRCDIR}lib/afs/libcom_err.a   \
!       ${SRCDIR}lib/afs/util.a         \
!       ${SRCDIR}lib/liblwp.a           \
!       ${SRCDIR}lib/tcl.a

  headers=${SRCDIR}include/lwp.h                \
!       ${SRCDIR}include/afs/acl.h      \
        ${SRCDIR}include/afs/errors.h   \
!       ${SRCDIR}include/afs/ptclient.h \
        ${SRCDIR}include/lock.h         \
        ${SRCDIR}include/afs/volume.h   \
        ${SRCDIR}include/afs/vnode.h    \
!       ${SRCDIR}include/rx/rx.h        \
        ${SRCDIR}include/r/r.h          \
!       ${SRCDIR}include/rx/xdr.h       \
!       ${SRCDIR}include/afs/auth.h     \
!       ${SRCDIR}include/afs/afsint.h   \
!       ${SRCDIR}include/tcl.h          \
        viced.h                         \
        host.h
```

93/06/02
11:36:56

Diffs

13

```
==================================================================
RCS file: viced/RCS/afsfileprocs.c,v
retrieving revision 1.1
diff -c -r1.1 viced/afsfileprocs.c
*** 1.1 1991/02/11 22:47:41
--- viced/afsfileprocs.c        1991/02/24 00:28:34
***************
*** 66,72 ****
--- 66,76 ----
  #else AFS_VFSINCL_ENV
  #include <sys/inode.h>
  #endif AFS_VFSINCL_ENV
+ #include <tcl.h>
+ #include <ctype.h>

+ static Tcl_Interp *TclGet();
+
  /* Useful local defines used by this module */

  #define       DONTCHECK       0
***************
*** 245,251 ****
      AFSCallStats.FetchData++, AFSCallStats.TotalCalls++;

      /* Get volume/vnode for the fetched file; caller's access rights to it are also re
turned */
!     if (errorCode = GetVolumePackage(tcon, Fid, &volptr, &targetptr, DONTCHECK, &paren
twhentargetnotdir, &client, READ_LOCK, &rights, &anyrights))
        goto Bad_FetchData;

      /* Check whether the caller has permission access to fetch the data */
--- 249,258 ----
      AFSCallStats.FetchData++, AFSCallStats.TotalCalls++;

      /* Get volume/vnode for the fetched file; caller's access rights to it are also re
turned */
!     if (errorCode = GetVolumePackage(tcon, Fid, &volptr, &targetptr,
!                                       DONTCHECK, &parentwhentargetnotdir,
!                                       &client, READ_LOCK, &rights,
!                                       &anyrights, NULL))
        goto Bad_FetchData;

      /* Check whether the caller has permission access to fetch the data */
***************
*** 278,300 ****
  struct AFSCallBack    * CallBack;          /* If r/w return CB for Fid */
  struct AFSVolSync     * Sync;              /* synchronization info */
  {
!     Vnode * targetptr =       0;                /* pointer to vnode to fetch */
!     Vnode * parentwhentargetnotdir = 0;         /* parent vnode if vptr is a file */
!     int           errorCode = 0;                /* return code to caller */
!     Volume * volptr = 0;                 /* pointer to the volume */
!     struct client *client;               /* pointer to the client data */
!     struct rx_call *tcall;               /* the call we're a part of */
!     long rights, anyrights;              /* rights for this and any user */


!     ViceLog(1,"AFS_FetchData, Fid = %u.%d.%d\n", Fid->Volume, Fid->Vnode, Fid->Unique)
;

      AFSCallStats.FetchData++, AFSCallStats.TotalCalls++;

!     tcall = (struct rx_call *) tcon;  /* CallPreamble changes tcon from a call to a co
nn */
!     if (errorCode = CallPreamble((struct rx_call **) &tcon, ACTIVECALL))
        goto Bad_FetchData;
!     /* Get volume/vnode for the fetched file; caller's access rights to it are also ret
urned */
!     if (errorCode = GetVolumePackage(tcon, Fid, &volptr, &targetptr, DONTCHECK, &parent
whentargetnotdir, &client, READ_LOCK, &rights, &anyrights))
        goto Bad_FetchData;

      SetVolumeSync(Sync, volptr);
--- 285,316 ----
  struct AFSCallBack    * CallBack;          /* If r/w return CB for Fid */
  struct AFSVolSync     * Sync;              /* synchronization info */
  {
!     Vnode *targetptr = 0;     /* pointer to vnode to fetch */
!     Vnode *parentwhentargetnotdir = 0;         /* parent vnode if vptr is a file */
!     int errorCode = 0;                 /* return code to caller */
!     Volume *volptr = 0;                /* pointer to the volume */
!     struct client *client;     /* pointer to the client data */
!     struct rx_call *tcall;     /* the call we're a part of */
!     long rights, anyrights;    /* rights for this and any user */
!     Tcl_Interp *tcl;           /* ACP interpreter. */
!     char *acp;                         /* access control program text */


!     ViceLog(1, "AFS_FetchData, Fid = %u.%d.%d\n", Fid->Volume, Fid->Vnode, Fid->Unique)
;

      AFSCallStats.FetchData++, AFSCallStats.TotalCalls++;

!     tcall = (struct rx_call *) tcon;  /* CallPreamble changes tcon from
!                                          a call to a conn */
!     if (errorCode = CallPreamble((struct rx_call **) & tcon, ACTIVECALL))
        goto Bad_FetchData;
!     /* Get an interpreter if we need one. */
!     tcl = TclGet(tcon, &acp);
!     /* Get volume/vnode for the fetched file; caller's access rights to it
!        are also returned */
!     if (errorCode = GetVolumePackage(tcon, Fid, &volptr, &targetptr,
!                                      DONTCHECK, &parentwhentargetnotdir,
!                                      &client, READ_LOCK, &rights,
!                                      &anyrights, tcl))
        goto Bad_FetchData;

      SetVolumeSync(Sync, volptr);
***************
*** 303,308 ****
--- 319,334 ----
      if (errorCode = Check_PermissionRights(targetptr, client, rights, CHK_FETCHDATA, 0)
)
        goto Bad_FetchData;

+     /* Check whater ACP is ok, too. */
+     if (tcl != NULL) {
+       TclDefInt(tcl, "pos", Pos);
+       TclDefInt(tcl, "len", Len);
+       if (!ACPOk(tcl, acp, "fetchdata", "fetch", "data")) {
+           errorCode = EACCES;
+           goto Bad_FetchData;
+       }
+     }
+
      /* actual do the data transfer */
      if (errorCode = FetchData_RXStyle(volptr, targetptr, tcall, Pos, Len))
        goto Bad_FetchData;
***************
*** 314,325 ****
```

93/06/02
11:36:56

Diffs

14

```
      if (VolumeWriteable(volptr))
        SetCallBackStruct(AddCallBack(client->host, Fid), CallBack);

! Bad_FetchData:
      /* Update and store volume/vnode and parent vnodes back */
!     PutVolumePackage(parentwhentargetnotdir, targetptr, (Vnode *)0, volptr);
!     ViceLog(2, "AFS_FetchData returns %d\n", errorCode);
      CallPostamble(tcon);
!     return(errorCode);
  }

  RXAFS_FetchACL (tcon, Fid, AccessList, OutStatus, Sync)
--- 340,352 ----
      if (VolumeWriteable(volptr))
        SetCallBackStruct(AddCallBack(client->host, Fid), CallBack);

! Bad_FetchData:
      /* Update and store volume/vnode and parent vnodes back */
!     PutVolumePackage(parentwhentargetnotdir, targetptr, (Vnode *) 0, volptr);
!     ViceLog(2, "AFS_FetchData returns %d\n", errorCode);
      CallPostamble(tcon);
!     TclRelease(tcl);
!     return (errorCode);
  }

  RXAFS_FetchACL (tcon, Fid, AccessList, OutStatus, Sync)
***************
*** 335,340 ****
--- 362,369 ----
      Volume * volptr = 0;              /* pointer to the volume */
      struct client *client;            /* pointer to the client data */
      long rights, anyrights;           /* rights for this and any user */
+     Tcl_Interp *tcl;          /* ACP interpreter. */
+     char *acp;                        /* access control program text */

      ViceLog(1, "AFS_FetchACL, Fid = %u.%d.%d\n", Fid >Volume, Fid->Vnode, Fid->Unique)
;
      AFSCallStats.FetchACL++, AFSCallStats.TotalCalls++;
***************
*** 342,352 ****
      if (errorCode = CallPreamble((struct rx_call **) &tcon, ACTIVECALL))
        goto Bad_FetchACL;

      AccessList->AFSOpaque_len = 0;
      AccessList->AFSOpaque_val = malloc(AFSOPAQUEMAX);

      /* Get volume/vnode for the fetched file; caller's access rights to it are also re
turned */
!     if (errorCode = GetVolumePackage(tcon, Fid, &volptr, &targetptr, DONTCHECK, &paren
twhentargetnotdir, &client, READ_LOCK, &rights, &anyrights))
        goto Bad_FetchACL;

      SetVolumeSync(Sync, volptr);
--- 371,387 ----
      if (errorCode = CallPreamble((struct rx_call **) &tcon, ACTIVECALL))
        goto Bad_FetchACL;

+     /* Get an interpreter if we need one. */
+     tcl = TclGet(tcon, &acp);
+
      AccessList->AFSOpaque_len = 0;
      AccessList->AFSOpaque_val = malloc(AFSOPAQUEMAX);

      /* Get volume/vnode for the fetched file; caller's access rights to it are also re
turned */
!     if (errorCode = GetVolumePackage(tcon, Fid, &volptr, &targetptr,
!                                      DONTCHECK, &parentwhentargetnotdir,
!                                      &client, READ_LOCK, &rights,
!                                      &anyrights, tcl))
        goto Bad_FetchACL;

      SetVolumeSync(Sync, volptr);
***************
*** 355,360 ****
--- 390,401 ----
      if (errorCode = Check_PermissionRights(targetptr, client, rights, CHK_FETCHACL, 0))
        goto Bad_FetchACL;

+     /* Check wheter ACP is ok, too. */
+     if (tcl != NULL && !ACPOK(tcl, acp, "fetchacl", "fetch", "acl")) {
+       errorCode = EACCES;
+       goto Bad_FetchACL;
+     }
+
      /* Get the Access List from the dir's vnode */
      if (errorCode = RXFetch_AccessList(targetptr, parentwhentargetnotdir, AccessList))
        goto Bad_FetchACL;
***************
*** 367,372 ****
--- 408,414 ----
      PutVolumePackage(parentwhentargetnotdir, targetptr, (Vnode *)0, volptr);
      ViceLog(2, "AFS_FetchACL returns %d (ACL=%s)\n", errorCode, AccessList->AFSOpaque_v
al);
      CallPostamble(tcon);
+     TclRelease(tcl);
      return errorCode;
  }

***************
*** 387,393 ****
      AFSCallStats.FetchACL++, AFSCallStats.TotalCalls++;

      /* Get volume/vnode for the fetched file; caller's access rights to it are also ret
urned */
!     if (errorCode = GetVolumePackage(tcon, Fid, &volptr, &targetptr, DONTCHECK, &parent
whentargetnotdir, &client, READ_LOCK, &rights, &anyrights))
        goto Bad_FetchACL;

      /* Check whether we have permission to fetch the ACL */
--- 429,438 ----
      AFSCallStats.FetchACL++, AFSCallStats.TotalCalls++;

      /* Get volume/vnode for the fetched file; caller's access rights to it are also ret
urned */
!     if (errorCode = GetVolumePackage(tcon, Fid, &volptr, &targetptr,
!                                      DONTCHECK, &parentwhentargetnotdir,
!                                      &client, READ_LOCK, &rights,
!                                      &anyrights, NULL))
        goto Bad_FetchACL;

      /* Check whether we have permission to fetch the ACL */
***************
*** 430,441 ****
      Volume * volptr = 0;              /* pointer to the volume */
      struct client *client;            /* pointer to the client data */
      long rights, anyrights;           /* rights for this and any user */

      ViceLog(1, "AFS_FetchStatus,  Fid = %u.%d.%d\n", Fid->Volume, Fid->Vnode, Fid->Uniq
```

93/06/02
11:36:56

Diffs

15

```
ue);
      AFSCallStats.FetchStatus++, AFSCallStats.TotalCalls++;

      /* Get volume/vnode for the fetched file; caller's rights to it are also returned *
/
!     if (errorCode = GetVolumePackage(tcon, Fid, &volptr, &targetptr, DONTCHECK, &paren
twhentargetnotdir, &client, READ_LOCK, &rights, &anyrights))
        goto Bad_FetchStatus;

      /* set volume synchronization information */
--- 475,493 ----
      Volume * volptr = 0;              /* pointer to the volume */
      struct client *client;            /* pointer to the client data */
      long rights, anyrights;           /* rights for this and any user */
+     Tcl_Interp *tcl;          /* ACP interpreter. */
+     char *acp;                        /* access control program text */

      ViceLog(1, "AFS_FetchStatus,  Fid = %u.%d.%d\n", Fid->Volume, Fid->Vnode, Fid->Uni
que);
      AFSCallStats.FetchStatus++, AFSCallStats.TotalCalls++;

+     /* Get an interpreter if we need one. */
+     tcl = TclGet(tcon, &acp);
      /* Get volume/vnode for the fetched file; caller's rights to it are also returned *
/
!     if (errorCode = GetVolumePackage(tcon, Fid, &volptr, &targetptr,
!                               DONTCHECK, &parentwhentargetnotdir,
!                               &client, READ_LOCK, &rights,
!                               &anyrights, tcl))
        goto Bad_FetchStatus;

      /* set volume synchronization information */
***************
*** 445,450 ****
--- 497,508 ----
      if (errorCode = Check_PermissionRights(targetptr, client, rights, CHK_FETCHSTATUS,
 0))
        goto Bad_FetchStatus;

+     /* Check wheter ACP is ok, too. */
+     if (tcl != NULL && !ACPOk(tcl, acp, "fetchstatus", "fetch", "status")) {
+       errorCode = EACCES;
+       goto Bad_FetchStatus;
+     }
+
      /* set OutStatus From the Fid  */
      GetStatus(targetptr, OutStatus, rights, anyrights, parentwhentargetnotdir);

***************
*** 455,461 ****
  Bad_FetchStatus:
      /* Update and store volume/vnode and parent vnodes back */
      PutVolumePackage(parentwhentargetnotdir, targetptr, (Vnode *)0, volptr);
!     ViceLog(2, "AFS_FetchStatus        returns %d\n", errorCode);
      return errorCode;
  }

--- 513,523 ----
  Bad_FetchStatus:
      /* Update and store volume/vnode and parent vnodes back */
      PutVolumePackage(parentwhentargetnotdir, targetptr, (Vnode *)0, volptr);
!     ViceLog(2,
!       "AFS_FetchStatus returns %d (ViceID %d, rights %x, anyrights %x)\n",
!           errorCode, client == NULL ? -1 : client->ViceId,
```

```
!           rights, anyrights);
!     TclRelease(tcl);
      return errorCode;
  }

***************
*** 475,481 ****
      long rights, anyrights;           /* rights for this and any user */
      register struct AFSFid *tfid;     /* file id we're dealing with now */

!     ViceLog(1, "AFS_BulkStatus\n");
      AFSCallStats.TotalCalls++;

      nfiles = Fids->AFSCBFids_len;     /* # of files in here */
--- 537,543 ----
      long rights, anyrights;           /* rights for this and any user */
      register struct AFSFid *tfid;     /* file id we're dealing with now */

!     ViceLog(0, "AFS_BulkStatus\n"); /* was level 1 -DN */
      AFSCallStats.TotalCalls++;

      nfiles = Fids->AFSCBFids_len;     /* # of files in here */
***************
*** 502,508 ****
        if (errorCode =
            GetVolumePackage(tcon, tfid, &volptr, &targetptr,
                          DONTCHECK, &parentwhentargetnotdir, &client, READ_LOCK,
!                         &rights, &anyrights))
            goto Bad_BulkStatus;

        /* set volume synchronization information, but only once per call */
--- 564,570 ----
        if (errorCode =
            GetVolumePackage(tcon, tfid, &volptr, &targetptr,
                          DONTCHECK, &parentwhentargetnotdir, &client, READ_LOCK,
!                         &rights, &anyrights, NULL))
            goto Bad_BulkStatus;

        /* set volume synchronization information, but only once per call */
***************
*** 577,583 ****
      AFSCallStats.StoreData++, AFSCallStats.TotalCalls++;

      /* Get associated volume/vnode for the stored file; caller's rights are also return
ed */
!     if (errorCode = GetVolumePackage(tcon, Fid, &volptr, &targetptr, MustNOTBeDIR, &par
entwhentargetnotdir, &client, WRITE_LOCK, &rights, &anyrights))
        goto Bad_StoreData;

      if ((targetptr->disk.type == vSymlink)) {
--- 639,648 ----
      AFSCallStats.StoreData++, AFSCallStats.TotalCalls++;

      /* Get associated volume/vnode for the stored file; caller's rights are also return
ed */
!     if (errorCode = GetVolumePackage(tcon, Fid, &volptr, &targetptr,
!                               MustNOTBeDIR, &parentwhentargetnotdir,
!                               &client, WRITE_LOCK, &rights,
!                               &anyrights, NULL))
        goto Bad_StoreData;

      if ((targetptr->disk.type == vSymlink)) {
***************
*** 626,631 ****
```

```
--- 691,698 ----
      struct rx_call *tcall;            /* remember the call structure for ftp */
      long rights, anyrights;           /* rights for this and any user */
      int       newinode = 0;                   /* Inode of newly created version */
+     Tcl_Interp *tcl;          /* ACP interpreter. */
+     char *acp;                        /* access control program text */


      ViceLog(1, "AFS_StoreData,  Fid = %u.%d.%d\n", Fid->Volume, Fid->Vnode, Fid->Uniqu
e);
***************
*** 635,642 ****
      if (errorCode = CallPreamble((struct rx_call **) &tcon, ACTIVECALL))
        goto Bad_StoreData;

      /* Get associated volume/vnode for the stored file; caller's rights are also retur
ned */
!     if (errorCode = GetVolumePackage(tcon, Fid, &volptr, &targetptr, MustNOTBeDIR, &pa
rentwhentargetnotdir, &client, WRITE_LOCK, &rights, &anyrights))
        goto Bad_StoreData;

      /* set volume synchronization information */
--- 702,715 ----
      if (errorCode = CallPreamble((struct rx_call **) &tcon, ACTIVECALL))
        goto Bad_StoreData;

+     /* Get an interpreter if we need one. */
+     tcl = TclGet(tcon, &acp);
+
      /* Get associated volume/vnode for the stored file; caller's rights are also retur
ned */
!     if (errorCode = GetVolumePackage(tcon, Fid, &volptr, &targetptr,
!                                      MustNOTBeDIR, &parentwhentargetnotdir,
!                                      &client, WRITE_LOCK, &rights,
!                                      &anyrights, tcl))
        goto Bad_StoreData;

      /* set volume synchronization information */
***************
*** 651,656 ****
--- 724,741 ----
      if (errorCode = Check_PermissionRights(targetptr, client, rights, CHK_STOREDATA, I
nStatus))
        goto Bad_StoreData;

+     if (tcl != NULL) {
+       /* Def values. */
+       TclDefInt(tcl, "pos", Pos);
+       TclDefInt(tcl, "len", Length);
+       TclDefInt(tcl, "filelen", FileLength);
+       TclDefStoreStatus(tcl, "instatus", InStatus);
+       if (!ACPOk(tcl, acp, "storedata", "store", "data")) {
+           errorCode = EACCES;
+           goto Bad_StoreData;
+       }
+     }
+
      /* this bit means that the locks are set and protections are OK */
      rx_SetLocalStatus(tcall, 1);

***************
*** 672,678 ****
      ViceLog(2, "AFS_StoreData returns %d\n", errorCode);
      CallPostamble(tcon);
!
      return(errorCode);
  }

--- 757,763 ----
      ViceLog(2, "AFS_StoreData returns %d\n", errorCode);

      CallPostamble(tcon);
!     TclRelease(tcl);
      return(errorCode);
  }

***************
*** 696,702 ****
      AFSCallStats.StoreACL++, AFSCallStats.TotalCalls++;

      /* Get associated volume/vnode for the target dir; caller's rights are also retu .
d */
!     if (errorCode = GetVolumePackage(tcon, Fid, &volptr, &targetptr, MustBeDIR, &parent
whentargetnotdir, &client, WRITE_LOCK, &rights, &anyrights))
        goto Bad_StoreACL;

      /* Check if we have permission to change the dir's ACL */
--- 781,790 ----
      AFSCallStats.StoreACL++, AFSCallStats.TotalCalls++;

      /* Get associated volume/vnode for the target dir; caller's rights are also returne
d */
!     if (errorCode = GetVolumePackage(tcon, Fid, &volptr, &targetptr,
!                                      MustBeDIR, &parentwhentargetnotdir,
!                                      &client, WRITE_LOCK, &rights,
!                                      &anyrights, NULL))
        goto Bad_StoreACL;

      /* Check if we have permission to change the dir's ACL */
***************
*** 734,743 ****
--- 822,836 ----
      Volume * volptr = 0;              /* pointer to the volume header */
      struct client * client;           /* pointer to client structure */
      long rights, anyrights;           /* rights for this and any user */
+     Tcl_Interp *tcl;          /* ACP interpreter. */
+     char *acp;                        /* access control program text */

      if (errorCode = CallPreamble((struct rx_call **) &tcon, ACTIVECALL))
        goto Bad_StoreACL;

+     /* Get an interpreter if we need one. */
+     tcl = TclGet(tcon, &acp);
+
      ViceLog(1, "AFS_StoreACL, Fid = %u.%d.%d, ACL=%s\n", Fid->Volume, Fid->Vnode, Fid->
Unique, AccessList->AFSOpaque_val);
      AFSCallStats.StoreACL++, AFSCallStats.TotalCalls++;

***************
*** 744,750 ****
      InStatus.Mask = 0;                /* not storing any status */

      /* Get associated volume/vnode for the target dir; caller's rights are also returne
d */
!     if (errorCode = GetVolumePackage(tcon, Fid, &volptr, &targetptr, MustBeDIR, &parent
whentargetnotdir, &client, WRITE_LOCK, &rights, &anyrights))
        goto Bad_StoreACL;
```

```
03/06/02
11:30:56                                      Diffs

                                                            /* Get an interpreter if we need one. */
                                                            tcl = TclGet(tcon, &acp);

/* set volume synchronization information */                ViceLog(1, "AFS_StoreStatus, Fid = %u.%d.%d\n", Fid->Volume, Fid->Vnode, Fid->Uniq
--- 837,846 ----                                            ue);
    InStatus.Mask = 0;       /* not storing any status */   AFSCallStats.StoreStatus++, AFSCallStats.TotalCalls++;

/* Get associated volume/vnode for the target dir; caller's rights are also return   /* Get volume/vnode for the target file; caller's rights to it are also returned */
ed */                                                       if (errorCode = GetVolumePackage(tcon, Fid, &volptr, &targetptr,
    if (errorCode = GetVolumePackage(tcon, Fid, &volptr, &targetptr,                                DONTCHECK, &parentwhentargetnotdir,
                MustBeDIR, &parentwhentargetnotdir,                                                 &client, WRITE_LOCK, &rights,
                &client, WRITE_LOCK, &rights,                                                       &anyrights, tcl))  {
                &anyrights, tcl))
                                                                goto Bad_StoreStatus;
        goto Bad_StoreACL;
                                                            /* set volume synchronization information */
    /* set volume synchronization information */            *** 809,814 ****
*************                                               --- 921,935 ----
*** 754,759 ****                                                if (errorCode = Check_PermissionRights(targetptr, client, rights, CHK_STORESTATUS,
--- 850,861 ----                                            InStatus))
    if (errorCode = Check_PermissionRights(targetptr, client, rights, CHK_STOREACL, &i
nStatus))                                                       goto Bad_StoreStatus;
        goto Bad_StoreACL.                                  *************
                                                            *** 809,814 ****
    /* check whether ACP is ok, too. */                     --- 921,935 ----
    if (tcl != NULL && !ACFOK(tcl, acp, "storeacl", "acl"))  {    /* check ACP */
        errorCode = EACCES;                                     if (tcl != NULL)  {
        goto Bad_StoreACL;                                          TclDefStoreStatus(tcl, "InStatus", InStatus);
    }                                                               if (!ACFOK(tcl, acp, "storeStatus", "store", "status"))  {
                                                                        errorCode = EACCES;
    /* Build and store the new Access List for the dir */               goto Bad_StoreStatus;
    if (errorCode = RXStore_AccessList(targetptr, AccessList))          }
        goto Bad_StoreACL;                                  }

*************                                               /* check for a symbolic link; we can't chmod these (otherwise could change a symlin
*** 769,774 ****                                            k to a mt pt or vice versa) */
--- 871,877 ----                                                if (targetptr->disk.type == vSymlink)  {
    ViceLog(2, "AFS StoreACL returns %d\n", errorcode);         errorCode = EINVAL;
    CallPostamble(tcon);                                    *************
    TclRelease(tcl);                                        *** 828,833 ****
    return errorcode;                                       --- 949,955 ----
                                                            /* Update and store volume/vnode and parent vnodes back */
*************                                               PutVolumePackage(parentwhentargetnotdir, targetptr, (Vnode *)0, volptr);
*** 794,805 ****                                                ViceLog(2, "AFS_StoreStatus returns %d\n", errorcode);
    Volume * volptr = 0;     /* pointer to the volume header */   TclRelease(tcl);
    struct client * client;  /* pointer to client structure */    return errorcode;
    long rights, anyrights;  /* rights for this and any user */   }

    ViceLog(1, "AFS_StoreACL, Fid = %u.%d.%d\n", Fid->Vnode, Fid->Uni     *************
que);                                                       *** 874,885 ****
    AFSCallStats.StoreStatus++, AFSCallStats.TotalCalls++;      DirHandle dir;       /* Handle for dir package I/O */
                                                                struct client * client;  /* pointer to client structure */
/* Get volume/vnode for the target file; caller's rights to it are also returned *    long rights, anyrights;  /* rights for this and any user */
/                                                               ViceLog(1, "AFS_RemoveFile %s, Did = %u.%d.%d\n", Name, DirFid->Volume, DirFid->Vn
    if (errorCode = GetVolumePackage(tcon, Fid, &volptr, &targetptr, DONTCHECK, &paren  ode, DirFid->Unique);
twhentargetnotdir, &client, WRITE_LOCK, &rights, &anyrights))     AFSCallStats.RemoveFile++, AFSCallStats.TotalCalls++;
        goto Bad_StoreStatus;
                                                            /* Get volume/vnode for the parent dir; caller's access rights are also returned */
    /* set volume synchronization information */                if (errorCode = GetVolumePackage(tcon, DirFid, &volptr, &parentptr, MustBeDIR, &par
*** 897,917 ****                                            entwhentargetnotdir, &client, WRITE_LOCK, &rights, &anyrights))
    Volume * volptr = 0;     /* pointer to the volume header */   goto Bad_RemoveFile;
    struct client * client;  /* pointer to client structure */
    long rights, anyrights;  /* rights for this and any user */   /* set volume synchronization information */
    /* THISONE */                                           --- 936,1015 ----
    Tcl_Interp *tcl;                                                DirHandle dir;
    char *acp;               /* access control program text */
```

93/06/02
11:36:56

Diffs

18

```
      struct client * client;          /* pointer to client structure */
      long rights, anyrights;          /* rights for this and any user */
+     Tcl_Interp *tcl;                 /* ACP interpreter. */
+     char *acp;                               /* access control program text */

+     /* Get an interpreter if we need one. */
+     tcl = TclGet(tcon, &acp);
+
      ViceLog(1, "AFS_RemoveFile %s,  Did = %u.%d.%d\n", Name, DirFid->Volume, DirFid->V
node, DirFid->Unique);
      AFSCallStats.RemoveFile++, AFSCallStats.TotalCalls++;

      /* Get volume/vnode for the parent dir; caller's access rights are also returned *
/
!     if (errorCode = GetVolumePackage(tcon, DirFid, &volptr, &parentptr,
!                                     MustBeDIR, &parentwhentargetnotdir,
!                                     &client, WRITE_LOCK, &rights,
!                                     &anyrights, tcl))
        goto Bad_RemoveFile;

      /* set volume synchronization information */
***************
*** 889,894 ****
--- 1019,1034 ----
      if (errorCode = CheckWriteMode(parentptr, rights, PRSFS_DELETE))
        goto Bad_RemoveFile;

+     /* Check whether ACP is ok, too. */
+     if (tcl != NULL) {
+       Tcl_SetVar(tcl, "name", Name);
+       if (!ACPOk(tcl, acp, "removefile", "dir", "delete")) {
+           errorCode = EACCES;
+           goto Bad_RemoveFile;
+       }
+     }
+
+
      /* Actually delete the desired file */
      if (errorCode = DeleteTarget(parentptr, volptr, &targetptr, &dir, &fileFid, Name,
MustNOTBeDIR))
        goto Bad_RemoveFile;
***************
*** 912,917 ****
--- 1052,1058 ----
      /* Update and store volume/vnode and parent vnodes back */
      PutVolumePackage(parentwhentargetnotdir, targetptr, parentptr, volptr);
      ViceLog(2, "AFS_RemoveFile returns %d\n", errorCode);
+     TclRelease(tcl);
      return errorCode;
  }

***************
*** 968,974 ****
--- 1109,1120 ----
      DirHandle dir;                   /* Handle for dir package I/O */
      struct client * client;          /* pointer to client structure */
      long rights, anyrights;          /* rights for this and any user */
+     Tcl_Interp *tcl;                 /* ACP interpreter. */
+     char *acp;                               /* access control program text */

+     /* Get an interpreter if we need one. */
+     tcl = TclGet(tcon, &acp);
+
      ViceLog(1, "AFS_CreateFile %s,  Did = %u.%d.%d\n", Name, DirFid->Volume, DirFid->V
node, DirFid->Unique);
      AFSCallStats.CreateFile++, AFSCallStats.TotalCalls++;
      if (!FileNameOK(Name)) {
***************
*** 977,983 ****
      }

      /* Get associated volume/vnode for the parent dir; caller long are also returned */
!     if (errorCode = GetVolumePackage(tcon, DirFid, &volptr, &parentptr, MustBeDIR, &par
entwhentargetnotdir, &client, WRITE_LOCK, &rights, &anyrights))
        goto Bad_CreateFile;

      /* set volume synchronization information */
--- 1123,1132 ----
      }

      /* Get associated volume/vnode for the parent dir; caller long are also returned */
!     if (errorCode = GetVolumePackage(tcon, DirFid, &volptr, &parentptr,
!                                     MustBeDIR, &parentwhentargetnotdir,
!                                     &client, WRITE_LOCK, &rights,
!                                     &anyrights, tcl))
        goto Bad_CreateFile;

      /* set volume synchronization information */
***************
*** 987,992 ****
--- 1136,1151 ----
      if (errorCode = CheckWriteMode(parentptr, rights, PRSFS_INSERT))
        goto Bad_CreateFile;

+     /* Check ACP, too. */
+     if (tcl != NULL) {
+       Tcl_SetVar(tcl, "name", Name);
+       TclDefStoreStatus(tcl, "instatus", InStatus);
+       if (!ACPOk(tcl, acp, "createfile", "dir", "insert")) {
+           errorCode = EACCES;
+           goto Bad_CreateFile;
+       }
+     }
+
      /* get a new vnode for the file to be created and set it up */
      if (errorCode = Alloc_NewVnode(parentptr, &dir, volptr, &targetptr, Name, OutFid
File, nBlocks(0)))
        goto Bad_CreateFile;
***************
*** 1011,1016 ****
--- 1170,1176 ----
      /* Update and store volume/vnode and parent vnodes back */
      PutVolumePackage(parentwhentargetnotdir, targetptr, parentptr, volptr);
      ViceLog(2, "AFS_CreateFile returns %d\n", errorCode);
+     TclRelease(tcl);
      return errorCode;
  }

***************
*** 1083,1089 ****
--- 1243,1253 ----
      long newrights;                  /* rights for this user */
      long newanyrights;               /* rights for any user */
      int      doDelete;                       /* deleted the rename target (ref count now 0) */
+     Tcl_Interp *tcl;                 /* ACP interpreter. */
+     char *acp;                               /* access control program text */

+     /* Get an interpreter if we need one. */
```

93/06/02
11:36:56

Diffs

19

```
+       tcl = TclGet(tcon, &acp);
        ViceLog(1, "AFS_Rename %s to %s,  Fid = %u.%d.%d to %u.%d.%d\n", OldName, NewName,
 OldDirFid->Volume, OldDirFid->Vnode, OldDirFid->Unique, NewDirFid->Volume, NewDirFid->V
node, NewDirFid->Unique);
        AFSCallStats.Rename++, AFSCallStats.TotalCalls++;
        if (!FileNameOK(NewName)) {
***************
*** 1102,1119 ****
        }

        if (OldDirFid->Vnode <= NewDirFid->Vnode) {
!           if  (errorCode = GetVolumePackage(tcon, OldDirFid, &volptr, &oldvptr, MustBeDIR,
 &parent, &client, WRITE_LOCK, &rights, &anyrights))
                goto Bad_Rename;
            if (OldDirFid->Vnode == NewDirFid->Vnode) {
                newvptr = oldvptr;
                newrights = rights, newanyrights = anyrights;
            }
!           else if (errorCode = GetVolumePackage(tcon, NewDirFid, &volptr, &newvptr, MustBe
DIR, &parent, &client, WRITE_LOCK, &newrights, &newanyrights))
                goto Bad_Rename;
        } else {
!           if (errorCode = GetVolumePackage(tcon, NewDirFid, &volptr, &newvptr, MustBeDIR,
&parent, &client, WRITE_LOCK, &newrights, &newanyrights))
                goto Bad_Rename;
!           if  (errorCode = GetVolumePackage(tcon, OldDirFid, &volptr, &oldvptr, MustBeDIR,
 &parent, &client, WRITE_LOCK, &rights, &anyrights))
                goto Bad_Rename;
        }

--- 1266,1296 ----
        }

        if (OldDirFid->Vnode <= NewDirFid->Vnode) {
!           if  (errorCode = GetVolumePackage(tcon, OldDirFid, &volptr,
!                                             &oldvptr, MustBeDIR, &parent,
!                                             &client, WRITE_LOCK, &rights,
!                                             &anyrights, tcl))
                goto Bad_Rename;
            if (OldDirFid->Vnode == NewDirFid->Vnode) {
                newvptr = oldvptr;
                newrights = rights, newanyrights = anyrights;
            }
!           else if (errorCode = GetVolumePackage(tcon, NewDirFid, &volptr,
!                                                 &newvptr, MustBeDIR, &parent,
!                                                 &client, WRITE_LOCK,
!                                                 &newrights, &newanyrights,
!                                                 NULL))
                goto Bad_Rename;
        } else {
!           if (errorCode = GetVolumePackage(tcon, NewDirFid, &volptr,
!                                            &newvptr, MustBeDIR, &parent,
!                                            &client, WRITE_LOCK, &newrights,
!                                            &newanyrights, NULL))
                goto Bad_Rename;
!           if  (errorCode = GetVolumePackage(tcon, OldDirFid, &volptr,
!                                             &oldvptr, MustBeDIR, &parent,
!                                             &client, WRITE_LOCK, &rights,
!                                             &anyrights, tcl))
                goto Bad_Rename;
        }

***************
*** 1125,1130 ****
--- 1302,1318 ----
        if (errorCode = CheckWriteMode(newvptr, newrights, PRSFS_INSERT))
          goto Bad_Rename;

+       /* Check ACP, too. */
+       if (tcl != NULL) {
+         Tcl_SetVar(tcl, "name", OldName);
+         Tcl_SetVar(tcl, "newname", NewName);
+         TclDefFid(tcl, "newdirfid", NewDirFid);
+         if (!ACPOk(tcl, acp, "rename", "dir", "rename")) {
+             errorCode = EACCES;
+             goto Bad_Rename;
+         }
+       }
+
        if (oldvptr->disk.cloned) CopyOnWrite(oldvptr, volptr);
        SetDirHandle(&olddir, oldvptr);
        if (newvptr->disk.cloned) CopyOnWrite(newvptr, volptr);
***************
*** 1285,1290 ****
--- 1473,1479 ----
        }
        PutVolumePackage(fileptr, (newvptr && newvptr != oldvptr? newvptr : 0), oldvptr, vo
lptr);
        ViceLog(2, "AFS_Rename returns %d\n", errorCode);
+       TclRelease(tcl);
        return errorCode;
  }

***************
*** 1345,1351 ****
--- 1534,1545 ----
        Volume * volptr = 0;            /* pointer to the volume header */
        struct client * client;         /* pointer to client structure */
        long rights, anyrights;         /* rights for this and any user */
+       Tcl_Interp *tcl;                /* ACP interpreter. */
+       char *acp;                              /* access control program text */

+       /* Get an interpreter if we need one. */
+       tcl = TclGet(tcon, &acp);
+                                                                           content
        ViceLog(1, "AFS_Symlink %s to %s,  Did = %u.%d.%d to %u.%d.%d\n", Name, LinkCon
s, DirFid->Volume, DirFid->Vnode, DirFid->Unique);
        AFSCallStats.Symlink++, AFSCallStats.TotalCalls++;
        if (!FileNameOK(Name)) {
***************
*** 1354,1360 ****
        }

       ./* Get the vnode and volume for the parent dir along with the caller's rights to it
 */
!       if (errorCode = GetVolumePackage(tcon, DirFid, &volptr, &parentptr, MustBeDIR, &par
entwhentargetnotdir, &client, WRITE_LOCK, &rights, &anyrights))
          goto Bad_SymLink;

        /* set volume synchronization information */
--- 1548,1557 ----
        }

        /* Get the vnode and volume for the parent dir along with the caller's rights to it
 */
!       if (errorCode = GetVolumePackage(tcon, DirFid, &volptr, &parentptr,
!                                        MustBeDIR, &parentwhentargetnotdir,
!                                        &client, WRITE_LOCK, &rights,
```

```
!                                     &anyrights, tcl))
        goto Bad_SymLink;

      /* set volume synchronization information */
***************
*** 1364,1369 ****
--- 1561,1577 ----
      if (errorCode = CheckWriteMode(parentptr, rights, PRSFS_INSERT))
        goto Bad_SymLink;

+     /* Check ACP, too. */
+     if (tcl != NULL) {
+       Tcl_SetVar(tcl, "name", Name);
+       Tcl_SetVar(tcl, "contents", LinkContents);
+       TclDefStoreStatus(tcl, "instatus", InStatus);
+       if (!ACPOk(tcl, acp, "symlink", "dir", "insert")) {
+           errorCode = EACCES;
+           goto Bad_SymLink;
+       }
+     }
+
      /* If we're creating a mount point (owner mode bits sans x bit), we must have
         administer access to the directory, too.  Always allow sysadmins to do this. */
      if ((InStatus->Mask & AFS_SETMODE) && !(InStatus->UnixModeBits & 0100)) {
***************
*** 1401,1406 ****
--- 1609,1615 ----
      /* Write the all modified vnodes (parent, new files) and volume back */
      PutVolumePackage(parentwhentargetnotdir, targetptr, parentptr, volptr);
      ViceLog(2, "AFS_Symlink returns %d\n", errorCode);
+     TclRelease(tcl);
      return errorCode;
  }

***************
*** 1456,1462 ****
--- 1665,1676 ----
      DirHandle dir;                  /* Handle for dir package I/O */
      struct client * client;         /* pointer to client structure */
      long rights, anyrights;         /* rights for this and any user */
+     Tcl_Interp *tcl;                /* ACP interpreter. */
+     char *acp;                              /* access control program text */

+     /* Get an interpreter if we need one. */
+     tcl = TclGet(tcon, &acp);
+
      ViceLog(1, "AFS_Link %s,  Did = %u.%d.%d, Fid = %u.%d.%d\n", Name, DirFid->Volume,
 DirFid->Vnode, DirFid->Unique, ExistingFid->Volume, ExistingFid->Vnode, ExistingFid->Un
ique);
     AFSCallStats.Link++, AFSCallStats.TotalCalls++;
     if (DirFid->Volume != ExistingFid->Volume) {
***************
*** 1469,1475 ****
      }

      /* Get the vnode and volume for the parent dir along with the caller's rights to i
t */
!     if (errorCode = GetVolumePackage(tcon, DirFid, &volptr, &parentptr, MustBeDIR, &pa
rentwhentargetnotdir, &client, WRITE_LOCK, &rights, &anyrights))
        goto Bad_Link;

      /* set volume synchronization information */
--- 1683,1692 ----
      }
```

```
      /* Get the vnode and volume for the parent dir along with the caller's rights to it
 */
!     if (errorCode = GetVolumePackage(tcon, DirFid, &volptr, &parentptr,
!                                    MustBeDIR, &parentwhentargetnotdir,
!                                    &client, WRITE_LOCK, &rights,
!                                    &anyrights, tcl))
        goto Bad_Link;

      /* set volume synchronization information */
***************
*** 1479,1484 ****
--- 1696,1711 ----
      if (errorCode = CheckWriteMode(parentptr, rights, PRSFS_INSERT))
        goto Bad_Link;

+     /* Check the ACP. */
+     if (tcl != NULL) {
+       Tcl_SetVar(tcl, "name", Name);
+       TclDefFid(tcl, "existingfid", ExistingFid);
+       if (!ACPOk(tcl, acp, "link", "dir", "insert")) {
+           errorCode = EACCES;
+           goto Bad_Link;
+       }
+     }
+
      /* get the file vnode  */
      if (errorCode = CheckVnode(ExistingFid, &volptr, &targetptr, WRITE_LOCK))
         goto Bad_Link;
***************
*** 1516,1521 ****
--- 1743,1749 ----
      /* Write the all modified vnodes (parent, new files) and volume back */
      PutVolumePackage(parentwhentargetnotdir, targetptr, parentptr, volptr);
      ViceLog(2, "AFS_Link returns %d\n", errorCode);
+     TclRelease(tcl);
      return errorCode;
  }

***************
*** 1578,1583 ****
--- 1806,1816 ----
      DirHandle parentdir;            /* Handle for dir package I/O */
      struct client * client;         /* pointer to client structure */
      long rights, anyrights;         /* rights for this and any user */
+     Tcl_Interp *tcl;                /* ACP interpreter. */
+     char *acp;                              /* access control program text */
+
+     /* Get an interpreter if we need one. */
+     tcl = TclGet(tcon, &acp);

      ViceLog(1, "AFS_MakeDir %s,  Did = %u.%d.%d\n", Name, DirFid->Volume, DirFid->Vnode
, DirFid->Unique);
     AFSCallStats.MakeDir++, AFSCallStats.TotalCalls++;
***************
*** 1587,1593 ****
      }

      /* Get the vnode and volume for the parent dir along with the caller's rights to it
 */
!     if (errorCode = GetVolumePackage(tcon, DirFid, &volptr, &parentptr, MustBeDIR, &par
entwhentargetnotdir, &client, WRITE_LOCK, &rights, &anyrights))
        goto Bad_MakeDir;
```

93/06/02
11:36:56

Diffs

21

```
      /* set volume synchronization information */
--- 1820,1829 ----
      }

      /* Get the vnode and volume for the parent dir along with the caller's rights to i
t */
!     if (errorCode = GetVolumePackage(tcon, DirFid, &volptr, &parentptr,
!                                      MustBeDIR, &parentwhentargetnotdir,
!                                      &client, WRITE_LOCK, &rights,
!                                      &anyrights, tcl))
        goto Bad_MakeDir;

      /* set volume synchronization information */
***************
*** 1597,1602 ****
--- 1833,1848 ----
      if (errorCode = CheckWriteModo(parentptr, rights, PRSFS_INSERT))
        goto Bad_MakeDir;

+     /* Check ACP. */
+     if (tcl != NULL) {
+       Tcl_SetVar(tcl, "name", Name);
+       TclDefStoreStatus(tcl, "instatus", InStatus);
+       if (!ACPOk(tcl, acp, "makedir", "dir", "insert")) {
+           errorCode = EACCES;
+           goto Bad_MakeDir;
+       }
+     }
+
  #define EMPTYDIRBLOCKS 2
      /* get a new vnode and set it up */
      if (errorCode = Alloc_NewVnode(parentptr, &parentdir, volptr, &targetptr, Name, Ou
tFid, vDirectory, EMPTYDIRBLOCKS))
***************
*** 1633,1638 ****
--- 1879,1885 ----
      /* Write the all modified vnodes (parent, new files) and volume back */
      PutVolumePackage(parentwhentargetnotdir, targetptr, parentptr, volptr);
      ViceLog(2, "AFS_MakeDir returns %d\n", errorCode);
+     TclRelease(tcl);
      return errorCode;
  }

***************
*** 1685,1696 ****
      Volume * volptr = 0;             /* pointer to the volume header */
      struct client * client;          /* pointer to client structure */
      long rights, anyrights;          /* rights for this and any user */

      ViceLog(1, "AFS_RemoveDir %s,  Did = %u.%d.%d\n", Name, DirFid->Volume, DirFid->Vn
ode, DirFid->Unique);
      AFSCallStats.RemoveDir++, AFSCallStats.TotalCalls++;

      /* Get the vnode and volume for the parent dir along with the caller's rights to i
t */
!     if (errorCode = GetVolumePackage(tcon, DirFid, &volptr, &parentptr, MustBeDIR, &pa
rentwhentargetnotdir, &client, WRITE_LOCK, &rights, &anyrights))
        goto Bad_RemoveDir;

      /* set volume synchronization information */
--- 1932,1951 ----
      Volume * volptr = 0;             /* pointer to the volume header */
      struct client * client;          /* pointer to client structure */
      long rights, anyrights;          /* rights for this and any user */
+     Tcl_Interp *tcl;                   /* ACP interpreter. */
+     char *acp;                                 /* access control program text */

+     /* Get an interpreter if we need one. */
+     tcl = TclGet(tcon, &acp);
+
      ViceLog(1, "AFS_RemoveDir %s,  Did = %u.%d.%d\n", Name, DirFid->Volume, DirFid->Vno
de, DirFid->Unique);
      AFSCallStats.RemoveDir++, AFSCallStats.TotalCalls++;

      /* Get the vnode and volume for the parent dir along with the caller's rights to it
 */
!     if (errorCode = GetVolumePackage(tcon, DirFid, &volptr, &parentptr,
!                                      MustBeDIR, &parentwhentargetnotdir,
!                                      &client, WRITE_LOCK, &rights,
!                                      &anyrights, tcl))
        goto Bad_RemoveDir;

      /* set volume synchronization information */
***************
*** 1700,1705 ****
--- 1955,1969 ----
      if (errorCode = CheckWriteMode(parentptr, rights, PRSFS_DELETE))
        goto Bad_RemoveDir;

+     /* Check ACP. */
+     if (tcl != NULL) {
+       Tcl_SetVar(tcl, "name", Name);
+       if (!ACPOk(tcl, acp, "removedir", "dir", "delete")) {
+           errorCode = EACCES;
+           goto Bad_RemoveDir;
+       }
+     }
+
      /* Do the actual delete of the desired (empty) directory, Name */
      if (errorCode = DeleteTarget(parentptr, volptr, &targetptr, &dir, &fileFid, Name, M
ustBeDIR))
        goto Bad_RemoveDir;
***************
*** 1719,1724 ****
--- 1983,1989 ----
      /* Write the all modified vnodes (parent, new files) and volume back */
      PutVolumePackage(parentwhentargetnotdir, targetptr, parentptr, volptr);
      ViceLog(2, "AFS_RemoveDir returns %d\n", errorCode);
+     TclRelease(tcl);
      return errorCode;

  }
***************
*** 1762,1767 ****
--- 2027,2034 ----
      struct client * client;          /* pointer to client structure */
      long rights, anyrights;          /* rights for this and any user */
      static char       * locktype[2] = {"LockRead","LockWrite"};
+     Tcl_Interp *tcl;                 /* ACP interpreter. */
+     char *acp;                               /* access control program text */

      if (type != LockRead && type != LockWrite) {
          errorCode = EINVAL;
***************
*** 1771,1778 ****
            locktype[(int)type], Fid->Volume, Fid->Vnode, Fid->Unique);
      AFSCallStats.SetLock++, AFSCallStats.TotalCalls++;
```

93/06/02
11:36:56

Diffs

22

```
      /* Get the vnode and volume for the desired file along with the caller's rights to
 it */
!     if (errorCode = GetVolumePackage(tcon, Fid, &volptr, &targetptr, DONTCHECK, &paren
twhentargetnotdir, &client, WRITE_LOCK, &rights, &anyrights))
        goto Bad_SetLock;

      /* set volume synchronization information */
--- 2038,2051 ----
              locktype[(int)type], Fid->Volume, Fid->Vnode, Fid->Unique);
      AFSCallStats.SetLock++, AFSCallStats.TotalCalls++;

+     /* Get an interpreter if we need one. */
+     tcl = TclGet(tcon, &acp);
+
      /* Get the vnode and volume for the desired file along with the caller's rights to
 it */
!     if (errorCode = GetVolumePackage(tcon, Fid, &volptr, &targetptr,
!                                      DONTCHECK, &parentwhentargetnotdir,
!                                      &client, WRITE_LOCK, &rights,
!                                      &anyrights, tcl))
        goto Bad_SetLock;

      /* set volume synchronization information */
***************
*** 1779,1790 ****
      SetVolumeSync(Sync, volptr);

      /* Handle the particular type of set locking, type */
!     errorCode = HandleLocking(targetptr, rights, type);

  Bad_SetLock:
      /* Write the all modified vnodes (parent, new files) and volume back */
      PutVolumePackage(parentwhentargetnotdir, targetptr, (Vnode *)0, volptr);
      ViceLog(2,"AFS_SetLock returns %d\n", errorCode);
      return(errorCode);
  }

--- 2052,2064 ----
      SetVolumeSync(Sync, volptr);

      /* Handle the particular type of set locking, type */
!     errorCode = HandleLocking(targetptr, rights, type, tcl, acp);

  Bad_SetLock:
      /* Write the all modified vnodes (parent, new files) and volume back */
      PutVolumePackage(parentwhentargetnotdir, targetptr, (Vnode *)0, volptr);
      ViceLog(2,"AFS_SetLock returns %d\n", errorCode);
+     TclRelease(tcl);
      return(errorCode);
  }

***************
*** 1832,1843 ****
      Volume * volptr = 0;             /* pointer to the volume header */
      struct client * client;          /* pointer to client structure */
      long rights, anyrights;          /* rights for this and any user */

      ViceLog(1,"AFS_ExtendLock Fid = %u.%d.%d\n", Fid->Volume, Fid->Vnode, Fid->Unique)
;
      AFSCallStats.ExtendLock++, AFSCallStats.TotalCalls++;

      /* Get the vnode and volume for the desired file along with the caller's rights to
 it */
!     if (errorCode = GetVolumePackage(tcon, Fid, &volptr, &targetptr, DONTCHECK, &paren
twhentargetnotdir, &client, WRITE_LOCK, &rights, &anyrights))
        goto Bad_ExtendLock;

      /* set volume synchronization information */
--- 2106,2125 ----
      Volume * volptr = 0;             /* pointer to the volume header */
      struct client * client;          /* pointer to client structure */
      long rights, anyrights;          /* rights for this and any user */
+     Tcl_Interp *tcl;                 /* ACP interpreter. */
+     char *acp;                               /* access control program text */

      ViceLog(1,"AFS_ExtendLock Fid = %u.%d.%d\n", Fid->Volume, Fid->Vnode, Fid->Unique);
      AFSCallStats.ExtendLock++, AFSCallStats.TotalCalls++;

+     /* Get an interpreter if we need one. */
+     tcl = TclGet(tcon, &acp);
+
      /* Get the vnode and volume for the desired file along with the caller's rights
it */
!     if (errorCode = GetVolumePackage(tcon, Fid, &volptr, &targetptr,
!                                      DONTCHECK, &parentwhentargetnotdir,
!                                      &client, WRITE_LOCK, &rights,
!                                      &anyrights, tcl))
        goto Bad_ExtendLock;

      /* set volume synchronization information */
***************
*** 1844,1855 ****
      SetVolumeSync(Sync, volptr);

      /* Handle the actual lock extension */
!     errorCode = HandleLocking(targetptr, rights, LockExtend);

  Bad_ExtendLock:
      /* Put back file's vnode and volume */
      PutVolumePackage(parentwhentargetnotdir, targetptr, (Vnode *)0, volptr);
      ViceLog(2,"AFS_ExtendLock returns %d\n", errorCode);
      return(errorCode);
  }

--- 2126,2138 ----
      SetVolumeSync(Sync, volptr);

      /* Handle the actual lock extension */
!     errorCode = HandleLocking(targetptr, rights, LockExtend, tcl, acp);

  Bad_ExtendLock:
      /* Put back file's vnode and volume */
      PutVolumePackage(parentwhentargetnotdir, targetptr, (Vnode *)0, volptr);
      ViceLog(2,"AFS_ExtendLock returns %d\n", errorCode);
+     TclRelease(tcl);
      return(errorCode);
  }

***************
*** 1895,1906 ****
      Volume * volptr = 0;             /* pointer to the volume header */
      struct client * client;          /* pointer to client structure */
      long rights, anyrights;          /* rights for this and any user */

      ViceLog(1,"AFS_ReleaseLock Fid = %u.%d.%d\n", Fid->Volume, Fid->Vnode, Fid->Unique)
;
      AFSCallStats.ReleaseLock++, AFSCallStats.TotalCalls++;
```

```
      /* Get the vnode and volume for the desired file along with the caller's rights to
 it */
!     if (errorCode = GetVolumePackage(tcon, Fid, &volptr, &targetptr, DONTCHECK, &paren
twhentargetnotdir, &client, WRITE_LOCK, &rights, &anyrights))
        goto Bad_ReleaseLock;

      /* set volume synchronization information */
--- 2178,2197 ----
      Volume * volptr = 0;             /* pointer to the volume header */
      struct client * client;          /* pointer to client structure */
      long rights, anyrights;          /* rights for this and any user */
+     Tcl_Interp *tcl;                 /* ACP interpreter. */
+     char *acp;                               /* access control program text */

      ViceLog(1,"AFS_ReleaseLock Fid = %u.%d.%d\n", Fid->Volume, Fid->Vnode, Fid->Unique
);
      AFSCallStats.ReleaseLock++, AFSCallStats.TotalCalls++;

+     /* Get an interpreter if we need one. */
+     tcl = TclGet(tcon, &acp);
+
      /* Get the vnode and volume for the desired file along with the caller's rights to
 it */
!     if (errorCode = GetVolumePackage(tcon, Fid, &volptr, &targetptr,
!                                      DONTCHECK, &parentwhentargetnotdir,
!                                      &client, WRITE_LOCK, &rights,
!                                      &anyrights, tcl))
        goto Bad_ReleaseLock;

      /* set volume synchronization information */
***************
*** 1907,1913 ****
      SetVolumeSync(Sync, volptr);

      /* Handle the actual lock release */
!     if (errorCode = HandleLocking(targetptr, rights, LockRelease))
        goto Bad_ReleaseLock;

      /* if no more locks left, a callback would be triggered here */
--- 2198,2204 ----
      SetVolumeSync(Sync, volptr);

      /* Handle the actual lock release */
!     if (errorCode = HandleLocking(targetptr, rights, LockRelease, tcl, acp))
        goto Bad_ReleaseLock;

      /* if no more locks left, a callback would be triggered here */
***************
*** 1918,1923 ****
--- 2209,2215 ----
      /* Put back file's vnode and volume */
      PutVolumePackage(parentwhentargetnotdir, targetptr, (Vnode *)0, volptr);
      ViceLog(2,"AFS_ReleaseLock returns %d\n", errorCode);
+     TclRelease(tcl);
      return(errorCode);
  }

***************
*** 2264,2270 ****
      }
      dummyFid.Volume = avolid, dummyFid.Vnode = (long)ROOTVNODE, dummyFid.Unique = 1;

!     if (errorCode = GetVolumePackage(tcon, &dummyFid, &volptr, &targetptr, MustBeDIR,
&parentwhentargetnotdir, &client, READ_LOCK, &rights, &anyrights))
        goto Bad_GetVolumeStatus;

      if ((VanillaUser(client)) && (!(rights & PRSFS_READ))) {
--- 2556,2565 ----
      }
      dummyFid.Volume = avolid, dummyFid.Vnode = (long)ROOTVNODE, dummyFid.Unique = 1;

!     if (errorCode = GetVolumePackage(tcon, &dummyFid, &volptr, &targetptr,
!                                      MustBeDIR, &parentwhentargetnotdir,
!                                      &client, READ_LOCK, &rights,
!                                      &anyrights, NULL))
        goto Bad_GetVolumeStatus;

      if ((VanillaUser(client)) && (!(rights & PRSFS_READ))) {
***************
*** 2299,2304 ****
--- 2594,2601 ----
      struct client * client;          /* pointer to client entry */
      long rights, anyrights;          /* rights for this and any user */
      AFSFid  dummyFid;
+     Tcl_Interp *tcl;                 /* ACP interpreter. */
+     char *acp;                               /* access control program text */

      ViceLog(1,"AFS_GetVolumeStatus for volume %u\n", avolid);

***************
*** 2305,2310 ****
--- 2602,2610 ----
      if (errorCode = CallPreamble((struct rx_call **) &tcon, ACTIVECALL))
        goto Bad_GetVolumeStatus;

+     /* Get an interpreter if we need one. */
+     tcl = TclGet(tcon, &acp);
+
      AFSCallStats.GetVolumeStatus++, AFSCallStats.TotalCalls++;

      if (avolid == 0) {
***************
*** 2313,2319 ****
      }
      dummyFid.Volume = avolid, dummyFid.Vnode = (long)ROOTVNODE, dummyFid.Unique = 1;

!     if (errorCode = GetVolumePackage(tcon, &dummyFid, &volptr, &targetptr, MustBeDIR, &
parentwhentargetnotdir, &client, READ_LOCK, &rights, &anyrights))
        goto Bad_GetVolumeStatus;

      if ((VanillaUser(client)) && (!(rights & PRSFS_READ))) {
--- 2613,2622 ----
      }
      dummyFid.Volume = avolid, dummyFid.Vnode = (long)ROOTVNODE, dummyFid.Unique = 1;

!     if (errorCode = GetVolumePackage(tcon, &dummyFid, &volptr, &targetptr,
!                                      MustBeDIR, &parentwhentargetnotdir,
!                                      &client, READ_LOCK, &rights,
!                                      &anyrights, tcl))
        goto Bad_GetVolumeStatus;

      if ((VanillaUser(client)) && (!(rights & PRSFS_READ))) {
***************
*** 2320,2325 ****
--- 2623,2637 ----
        errorCode = EACCES;
        goto Bad_GetVolumeStatus;
      }
```

93/06/02
11:36:56

Diffs

```
+       /* Check ACP. */
+       if (tcl != NULL) {
+         TclDefInt(tcl, "volume", avolid);
+         if (!ACPOk(tcl, acp, "getvolumestatus", "fetch", "volstatus")) {
+             errorCode = EACCES;
+             goto Bad_GetVolumeStatus;
+         }
+       }
+
        RXGetVolumeStatus(FetchVolStatus, Name, OfflineMsg, Motd, volptr);

    Bad_GetVolumeStatus:
***************
*** 2330,2335 ****
--- 2642,2648 ----
        if (*Motd == 0) {*Motd = (char *) malloc(1); **Motd = 0;}
        if (*OfflineMsg == 0) {*OfflineMsg = (char *) malloc(1); **OfflineMsg = 0;}
        CallPostamble(tcon);
+       TclRelease(tcl);
        return(errorCode);
    }

***************
*** 2386,2392 ****
        }
        dummyFid.Volume = avolid, dummyFid.Vnode = (long)ROOTVNODE, dummyFid.Unique = 1;

!       if (errorCode = GetVolumePackage(tcon, &dummyFid, &volptr, &targetptr, MustBeDIR,
&parentwhentargetnotdir, &client, READ_LOCK, &rights, &anyrights))
         goto Bad_SetVolumeStatus;

        if (VanillaUser(client)) {
--- 2699,2708 ----
        }
        dummyFid.Volume = avolid, dummyFid.Vnode = (long)ROOTVNODE, dummyFid.Unique = 1;

!       if (errorCode = GetVolumePackage(tcon, &dummyFid, &volptr, &targetptr,
!                                        MustBeDIR, &parentwhentargetnotdir,
!                                        &client, READ_LOCK, &rights,
!                                        &anyrights, NULL))
         goto Bad_SetVolumeStatus;

        if (VanillaUser(client)) {
***************
*** 2445,2451 ****
        }
        dummyFid.Volume = avolid, dummyFid.Vnode = (long)ROOTVNODE, dummyFid.Unique = 1;

!       if (errorCode = GetVolumePackage(tcon, &dummyFid, &volptr, &targetptr, MustBeDIR,
&parentwhentargetnotdir, &client, READ_LOCK, &rights, &anyrights))
         goto Bad_SetVolumeStatus;

        if (VanillaUser(client)) {
--- 2761,2770 ----
        }
        dummyFid.Volume = avolid, dummyFid.Vnode = (long)ROOTVNODE, dummyFid.Unique = 1;

!       if (errorCode = GetVolumePackage(tcon, &dummyFid, &volptr, &targetptr,
!                                        MustBeDIR, &parentwhentargetnotdir,
!                                        &client, READ_LOCK, &rights,
!                                        &anyrights, NULL))
         goto Bad_SetVolumeStatus;

        if (VanillaUser(client)) {
***************
*** 2628,2634 ****

  /* This unusual long-parameter routine encapsulates all volume package related operatio
ns together in a single module; it's called by almost all afs interface calls */

! GetVolumePackage(tcon, Fid, volptr, targetptr, chkforDir, parent, client, locktype, rig
hts, anyrights)
  struct r_connection *tcon;        /* R-connection */
  AFSFid                    *Fid;         /* Fid that we are dealing with */
  Volume                    **volptr;     /* Returns pointer to volume associated with
Fid */
--- 2947,2954 ----

  /* This unusual long-parameter routine encapsulates all volume package related operatio
ns together in a single module; it's called by almost all afs interface calls */

! GetVolumePackage(tcon, Fid, volptr, targetptr, chkforDir, parent, client,
!                  locktype, rights, anyrights, tcl)
  struct r_connection *tcon;        /* R-connection */
  AFSFid                    *Fid;         /* Fid that we are dealing with */
  Volume                    **volptr;     /* Returns pointer to volume associated with
Fid */
***************
*** 2637,2643 ****
  Vnode            **parent;      /* If Fid not a dir, this points to the parent dir */
  struct client    **client;      /* Returns the client associated with the conn */
  int              locktype;      /* locktype (READ or WRITE) for the Fid vnode */
! long             *rights, *anyrights;    /* Returns user's & any acl rights */
  {
      struct acl_accessList * aCL;    /* Internal access List */
      int        aCLSize;             /* size of the access list */
--- 2957,2965 ----
  Vnode            **parent;      /* If Fid not a dir, this points to the parent dir */
  struct client    **client;      /* Returns the client associated with the conn */
  int              locktype;      /* locktype (READ or WRITE) for the Fid vnode */
! long             *rights, *anyrights;    /* Returns user's & any acl
!                                              rights */
! Tcl_Interp       *tcl;          /* if non-NULL, set some variables here */
  {
      struct acl_accessList * aCL;    /* Internal access List */
      int        aCLSize;             /* size of the access list */
***************
*** 2667,2672 ****
--- 2989,3008 ----
        else
            (*rights) &= ~PRSFS_ADMINISTER;
      }
+     /* Assign any Tcl variables we need. */
+.    if (tcl != NULL) {
+       TclDefFid(tcl, "fid", Fid);
+       Tcl_SetVar(tcl, "filetype",
+                  (*targetptr)->disk.type == vFile ? "file" :
+                  (*targetptr)->disk.type == vDirectory ? "dir" :
+                  (*targetptr)->disk.type == vSymlink ? "symlink" : "null");
+       if (parent != NULL && *parent != NULL) {
+           TclDefEFid(tcl, "parentfid", Fid->Volume,
+                  (*parent)->vnodeNumber, (*parent)->disk.uniquifier);
+       }
+       else
+           TclDefEFid(tcl, "parentfid", 0, 0, 0);
+     }
      return errorCode;
  }
```

93/06/02
11:36:56

Diffs

25

```
***************
*** 3562,3571 ****

  /* Handle all the lock-related code (AFS_SetLock, AFS_ExtendLock and AFS_ReleaseLock)
*/

! HandleLocking(targetptr, rights, LockingType)
  Vnode         * targetptr;
  long          rights;
  ViceLockType  LockingType;
  {
      int       Time;           /* Used for time */

--- 3898,3911 ----

  /* Handle all the lock-related code (AFS_SetLock, AFS_ExtendLock and AFS_ReleaseLock)
*/

! static char *lockTypes[] = { "read", "write", "extend", "release" };
!
! HandleLocking(targetptr, rights, LockingType, tcl, acp)
  Vnode         * targetptr;
  long          rights;
  ViceLockType  LockingType;
+ Tcl_Interp    *tcl;
+ char          *acp;
  {
      int       Time;           /* Used for time */

***************
*** 3572,3577 ****
--- 3912,3927 ----
      /* Does the caller has Lock priviledges; root extends locks, however */
      if (LockingType != LockExtend && !(rights & PRSFS_LOCK))
        return(EACCES);
+     /* Check ACP. */
+     if (tcl != NULL) {
+       char *lt;
+       if (LockingType >= LockRead && LockingType <= LockRelease)
+           lt = lockTypes[LockingType];
+       else
+           lt = "unknown";
+       if (!ACPOk(tcl, acp, "lock", "lock", lt))
+           return(EACCES);
+     }
      Time = FT_ApproxTime();
      switch (LockingType) {
        case LockRead:
***************
*** 4129,4132 ****
--- 4479,4617 ----
      ViceLog(5,"MinQuota = %d, MaxQuota = %d\n", status->MinQuota, status->MaxQuota);
      ViceLog(5,"Type = %d, BlocksInUse = %d, PartBlocksAvail = %d, PartMaxBlocks = %d\n
",
            status->Type, status->BlocksInUse, status->PartBlocksAvail, status->PartMaxB
locks);
+ }
+
+
+ /*
+  * ACP support
+  */
+
+ #define TCLMAXCOMMANDS        100
+ #define TCLMAXBYTES   5000
+ #define TCLMAXNESTING 10
+
+ #define MAXFREEINTERPS        8
+ static Tcl_Interp *freeInterps[MAXFREEINTERPS];
+ static int nFreeInterps = 0;
+
+ static Tcl_Interp *TclGet(conn, pACP)
+     struct rx_connection *conn;
+     char **pACP;
+ {
+     long len;
+     Tcl_Interp *tcl;
+
+     *pACP = h_GetACP(conn, &len);
+     if (*pACP == NULL)
+       return NULL;
+     if (nFreeInterps > 0) {
+       --nFreeInterps;
+       tcl = freeInterps[nFreeInterps];
+       Tcl_ResetInterp(tcl);
+     }
+     else
+       tcl = Tcl_CreateInterp();
+     Tcl_Limits(tcl, TCLMAXCOMMANDS, TCLMAXBYTES, TCLMAXNESTING);
+     /* Init it here: set max bytes, max ops, add any functions. */
+     return tcl;
+ }
+
+ static TclRelease(tcl)
+     Tcl_Interp *tcl;
+ {
+     if (tcl == NULL)
+       return;
+     if (nFreeInterps < MAXFREEINTERPS)
+       freeInterps[nFreeInterps++] = tcl;
+     else
+       Tcl_DeleteInterp(tcl);
+ }
+
+ static int ACPOk(tcl, acp, opcode, opClass, subClass)
+     Tcl_Interp *tcl;
+     char *acp;
+     char *opcode;
+     char *opClass;
+     char *subClass;
+ {
+     char buf[20];
+     struct timeval now;
+     int result;
+
+     if (tcl == NULL)
+       return TRUE;
+     /* Add some more generic values. */
+     Tcl_SetVar(tcl, "opcode", opcode);
+     Tcl_SetVar(tcl, "opclass", opClass);
+     Tcl_SetVar(tcl, "subclass", subClass);
+     TM_GetTimeOfDay(&now, 0);
+     sprintf(buf, "%ld", now.tv_sec);
+     Tcl_SetVar(tcl, "now", buf);
+     result = TclResultOk(tcl, Tcl_Eval(tcl, acp, 0, NULL));
+     return result;
+ }
```

93/06/02
11:36:56

Diffs

26

```
+
+ /* Do a setvar with an integer value. */
+ static TclDefInt(tcl, var, value)
+     Tcl_Interp *tcl;
+     char *var;
+     long value;
+ {
+     char buf[20];
+
+     sprintf(buf, "%ld", value);
+     Tcl_SetVar(tcl, var, buf);
+ }
+
+ static TclDefStoreStatus(tcl, var, s)
+     Tcl_Interp *tcl;
+     char *var;
+     struct AFSStoreStatus *s;
+ {
+     char buf[120];
+
+     sprintf(buf, "%ld %ld %ld %ld %ld %ld", s->Mask, s->ClientModTime,
+           s->Owner, s->Group, s->UnixModeBits, s->SegSize);
+     Tcl_SetVar(tcl, var, buf);
+ }
+
+ static TclDefFid(tcl, var, fid)
+     Tcl_Interp *tcl;
+     char *var;
+     struct AFSFid *fid;
+ {
+     TclDefEFid(tcl, var, fid->Volume, fid->Vnode, fid->Unique);
+ }
+
+ static TclDefEFid(tcl, var, vol, vnode, unique)
+     Tcl_Interp *tcl;
+     char *var;
+     long vol, vnode, unique;
+ {
+     char buf[120];
+
+     sprintf(buf, "%08x %08x %08x", vol, vnode, unique);
+     Tcl_SetVar(tcl, var, buf);
+ }
+
+ static TclResultOk(tcl, result)
+     Tcl_Interp *tcl;
+     int result;
+ {
+     char *p;
+     int ok = FALSE;
+
+     if (result != TCL_OK)
+       return FALSE;
+     /* Answer must be all numeric, and not zero. */
+     p = tcl->result;
+     if (*p == '-')
+       ++p;
+     for (; *p != NULL; ++p) {
+       if (!isdigit(*p))
+           return FALSE;
+       if (*p != '0')
+           ok = TRUE;
+     }
+     return ok;
```

```
}
```

```
===================================================================
RCS file: viced/RCS/host.c,v
retrieving revision 1.1
diff -c -r1.1 viced/host.c
*** 1.1 1991/02/05 12:56:30
--- viced/host.c        1991/02/24 00:00:21
***************
*** 492,497 ****
--- 492,514 ----
      return 0;
  }

+ /* Find ACP, if any, for connection.  Returns NULL if none, else stuffs the
+    length into *len. */
+ char *h_GetACP(tcon, len)
+     struct r_connection *tcon;
+     long *len;
+ {
+     struct rx_connection *rxcon;
+     extern char *rxkad_GetACP();
+
+     if (r_IsConn(tcon))
+       return NULL;            /* not using rx */
+     rxcon = (struct rx_connection *) tcon;
+     if (rx_SecurityClassOf(rxcon) != 2)
+       return NULL;            /* not using kerberos */
+     return rxkad_GetACP(tcon, len);
+ }
+
  /* Called by the server main loop.  Returns a h_Held client, which must be
     released later the main loop.  Allocates a client if the matching one
     isn't around */
***************
*** 595,600 ****
--- 612,635 ----
          /* Turn off System:Administrator for safety
          if (AL_IsAMember(SystemId, client->CPS) == 0)
            assert(AL_DisableGroup(SystemId, client->CPS) == 0); */
+       /* ACP DEBUG */
+       {
+           char buf[500];
+           char *p;
+           long len;
+           p = h_GetACP(tcon, &len);
+           if (p == NULL)
+               ViceLog(1, "No ACP for [%s, %d]\n", client->host,
+                       client->ViceId);
+           else {
+               if (len >= sizeof(buf))
+                   len = sizeof(buf)-1;
+               strncpy(buf, p, len);
+               buf[len] = 0;
+               ViceLog(1, "ACP for [%s, %d] = '%s'\n", client->host,
+                       client->ViceId, buf);
+           }
+       }

      }
      client->tcon = tcon;
```

```
===================================================================
RCS file: viced/RCS/host.h,v
retrieving revision 1.1
diff -c -r1.1 viced/host.h
*** 1.1 1991/02/05 12:56:19
--- viced/host.h        1991/02/05 20:57:24
***************
*** 84,89 ****
--- 84,90 ----
  extern int h_FreeConnection();
  extern int h_Enumerate();
  extern struct host *h_GetHost();
+ extern char *h_GetACP();
  extern struct client *h_FindClient();
  extern int GetClient();
  extern h_FreeConnection();
```

93/06/02
11:36:56

Diffs

28

```
=========================================================================
RCS file: viced/RCS/viced.c,v
retrieving revision 1.1
diff -c -r1.1 viced/viced.c
*** 1.1 1991/02/11 22:49:04
--- viced/viced.c       1991/02/12 06:50:53
***************
*** 356,362 ****
      rx_extraPackets = rxpackets;
      rx_extraQuota = 4;        /* for outgoing prserver calls from R threads */
  #if    defined(AFS_HPUX_ENV) || defined(AFS_VFS40)
!     rx_SetStackSize(1, 24000);        /* The Sparcs use quite big stack space! */
  #endif
      rx_Init(htons(7000));
      rx_SetRxDeadTime(50);
--- 356,363 ----
      rx_extraPackets = rxpackets;
      rx_extraQuota = 4;        /* for outgoing prserver calls from R threads */
  #if    defined(AFS_HPUX_ENV) || defined(AFS_VFS40)
!     /* Even bigger (24k -> 50k) for TCL version.  -DN */
!     rx_SetStackSize(1, 50000);        /* The Sparcs use quite big stack space! */
  #endif
      rx_Init(htons(7000));
      rx_SetRxDeadTime(50);
```

XEROX nichols

Document name: TCLDiffs
Printing date/time: June 2, 1993 11:46:57 am PDT
Host name: osprey This file, "TCLDiffs," represents the differences in source code between release 3.3 of Tool Command Language and a version of Tool Command Language modified from release 3.3 to support the embodiment of the present invention in a modified version of the Andrew File System as described elsewhere in this application.

The modifications made to release 3.3 of Tool Command Language in order to produce the embodiment of the present invention in a modified version of the Andrew File System as described elsewhere in this application represent original unpublished work of Xerox Corporation. This original unpublished work is Copyright ©1991 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

nichols

C05d: Mon May 24 12:24:03 PDT 1993 Job #589

93/06/02
11:40:58

TCLDiffs

1

```
diff -c tcl.old/Makefile tcl/Makefile
*** tcl.old/Makefile    Fri Feb  8 23:14:19 1991
--- tcl/Makefile        Wed Feb 27 12:40:18 1991
***************
*** 3,13 ****
  # It is simplified so that it doesn't include any Sprite-specific stuff.
  # For HP-UX systems, use the second, commented-out, form of LIBS below.
  #

  LIBS =
  #LIBS = -lBSD

! CFLAGS = -g -I. -DTCL_VERSION=\"3.3\"

  OBJS = tclAssem.o tclBasic.o tclCmdAH.o tclCmdIZ.o tclExpr.o \
        tclGlob.o tclHistory.o tclProc.o tclUtil.o
--- 3,20 ----
  # It is simplified so that it doesn't include any Sprite-specific stuff.
  # For HP-UX systems, use the second, commented-out, form of LIBS below.
  #
+ # Modified for AFS integration by Nichols.
+ #

+ DESTDIR=/usr/andy/
+ SRCDIR=/usr/andy/
+ INSTALL=${SRCDIR}bin/install
+
  LIBS =
  #LIBS = -lBSD

! CFLAGS = -g -I. -DTCL_VERSION=\"3.3\" -DAFS
! #CFLAGS = -g -I. -DTCL_VERSION=\"3.3\"

  OBJS = tclAssem.o tclBasic.o tclCmdAH.o tclCmdIZ.o tclExpr.o \
        tclGlob.o tclHistory.o tclProc.o tclUtil.o
***************
*** 18,23 ****
--- 25,41 ----
  CSRCS = tclAssem.c tclBasic.c tclCmdAH.c tclCmdIZ.c tclExpr.c \
        tclGlob.c tclHistory.c tclProc.c tclUtil.c

+ all: tcl.a
+
+ clean:
+       rm -f *.o tclTest core
+
+ system: install
+
+ install: all
+       $(INSTALL) tcl.a ${DESTDIR}lib/tcl.a
+       $(INSTALL) tcl.h ${DESTDIR}include
+
  tcl.a: ${OBJS} ${LIBOBJS}
        rm -f tcl.a
        ar cr tcl.a ${OBJS} ${LIBOBJS}
```

93/06/02
11:40:58

TCLDiffs

2

```
diff -c tcl.old/Notes tcl/Notes
*** tcl.old/Notes       Sun Feb 10 23:07:38 1991
--- tcl/Notes   Thu Feb 14 18:18:01 1991
***************
*** 1,32 ****
  -- Limit # of commands invoked.
  -- Limit # of bytes allocated for each interpreter.
  -- Cut max nesting level to, say 10 or so.
! -- Increase LWP stack size (viced.c: rx_stacksize or something like that).

  Vice ops:
! FetchData
! FetchACL
! FetchStatus
! StoreData
! StoreACL
! StoreStatus
! RemoveFile
! CreateFile
! Rename
! Symlink
! Link
! MakeDir
! RemoveDir
! OldSetLock
! OldExtendLock
! OldReleaseLock
! GetVolumeStatus
! SetVolumeStatus
! BulkStatus
! SetLock
! ExtendLock
! ReleaseLock

  GetStatistics -- no checks.
  GiveUpCallBacks -- no checks.
  GetVolumeInfo -- no checks.
--- 1,33 ----
  -- Limit # of commands invoked.
  -- Limit # of bytes allocated for each interpreter.
  -- Cut max nesting level to, say 10 or so.
! ++ Increase LWP stack size (viced.c: rx_stacksize or something like that).
! -- Fix GetVolumePackage to set some vars.  Deal with rename, which calls it
!    more than once.
! -- Fix all commands to set vars, and to have code like RXAFS_FetchData.
! -- Recompile RXKAD.

  Vice ops:
! +FetchData (pos, len)
! +FetchACL ()
! +FetchStatus ()
! +StoreData (instatus, pos, len, filelen)
! +StoreACL ([acl])
! +StoreStatus (instatus)
! +RemoveFile (name)
! +CreateFile (name, instatus)
! +Rename (name, newname, newdirfid)
! +Symlink (name, contents, instatus)
! +Link (name, exisitingfid)
! +MakeDir (name, instatus)
! +RemoveDir (name)
! +OldSetLock --> SetLock (locktype)
! +OldExtendLock --> ExtendLock ()
! +OldReleaseLock --> ReleaseLock ()
! +GetVolumeStatus (volume)

+ BulkStatus -- not used
+ SetVolumeStatus (volume, volstatus) -- only system administrators
  GetStatistics -- no checks.
  GiveUpCallBacks -- no checks.
  GetVolumeInfo -- no checks.
```

93/06/02
11:40:58

TCLDiffs

3

```
diff -c tcl.old/tcl.h tcl/tcl.h
*** tcl.old/tcl.h       Wed Apr 18 16:06:24 1990
--- tcl/tcl.h   Thu Feb 21 12:06:29 1991
***************
*** 104,110 ****
  extern Tcl_Interp *   Tcl_CreateInterp();
  extern Tcl_Trace      Tcl_CreateTrace();
  extern void           Tcl_DeleteCmdBuf();
! extern void           Tcl_DeleteCommand();
  extern void           Tcl_DeleteInterp();
  extern void           Tcl_DeleteTrace();
  extern int            Tcl_Eval();
--- 104,110 ----
  extern Tcl_Interp *   Tcl_CreateInterp();
  extern Tcl_Trace      Tcl_CreateTrace();
  extern void           Tcl_DeleteCmdBuf();
! extern int            Tcl_DeleteCommand();
  extern void           Tcl_DeleteInterp();
  extern void           Tcl_DeleteTrace();
  extern int            Tcl_Eval();
***************
*** 120,125 ****
--- 120,132 ----
  extern char *         Tcl_TildeSubst();
  extern void           Tcl_WatchInterp();

+ /*
+  * More exported Tcl procedures for use by ACPs:
+  */
+
+ extern void           Tcl_Limits();
+ extern void           Tcl_ResetInterp();
+
  /*
   * Built-in Tcl command procedures:
   */
```

```
diff -c tcl.old/tclBasic.c tcl/tclBasic.c
*** tcl.old/tclBasic.c  Fri Feb  8 22:56:57 1991
--- tcl/tclBasic.c      Wed Feb 27 12:46:52 1991
***************
*** 25,30 ****
--- 25,32 ----
  #include <string.h>
  #include "tclInt.h"

+ extern int InterpProc();
+
  /*
   * Built-in commands, and the procedures associated with them:
   */
***************
*** 73,79 ****
        "source",
  #endif
        "string",
! #ifndef AFS
        "time",
  #endif
        "uplevel",
--- 75,81 ----
        "source",
  #endif
        "string",
! #ifndef AFSX
        "time",
  #endif
        "uplevel",
***************
*** 124,130 ****
        Tcl_SourceCmd,
  #endif
        Tcl_StringCmd,
! #ifndef AFS
        Tcl_TimeCmd,
  #endif
        Tcl_UplevelCmd,
--- 126,132 ----
        Tcl_SourceCmd,
  #endif
        Tcl_StringCmd,
! #ifndef AFSX
        Tcl_TimeCmd,
  #endif
        Tcl_UplevelCmd,
***************
*** 158,164 ****
      register int (**procPtr)();
      register Command *cmdPtr;

!     iPtr = (Interp *) malloc(sizeof(Interp));
      iPtr->result = iPtr->resultSpace;
      iPtr->dynamic = 0;
      iPtr->errorLine = 0;
--- 160,166 ----
      register int (**procPtr)();
      register Command *cmdPtr;

!     iPtr = (Interp *) TclMalloc(NULL, sizeof(Interp));
      iPtr->result = iPtr->resultSpace;
      iPtr->dynamic = 0;
```

93/06/02
11:40:58

TCLDiffs

```
      iPtr->errorLine = 0;
***************
*** 175,180 ****
--- 177,186 ----
      iPtr->historyFirst = NULL;
      iPtr->evalFirst = iPtr->evalLast = NULL;
      iPtr->cmdCount = 0;
+     iPtr->cmdLimit = -1;
+     iPtr->allocCount = 0;
+     iPtr->allocLimit = -1;
+     iPtr->nestingLimit = MAX_NESTING_DEPTH;
      iPtr->noEval = 0;
      iPtr->flags = 0;
      iPtr->tracePtr = NULL;
***************
*** 189,195 ****

      for (namePtr = builtInCmds, procPtr = builtInProcs;
              *namePtr != NULL; namePtr++, procPtr++) {
!         cmdPtr = (Command *) malloc(CMD_SIZE(strlen(*namePtr)));
          cmdPtr->proc = *procPtr;
          cmdPtr->clientData = (ClientData) NULL;
          cmdPtr->deleteProc = NULL;
--- 195,201 ----

      for (namePtr = builtInCmds, procPtr = builtInProcs;
              *namePtr != NULL; namePtr++, procPtr++) {
!         cmdPtr = (Command *) TclMalloc(iPtr, CMD_SIZE(strlen(*namePtr)));
          cmdPtr->proc = *procPtr;
          cmdPtr->clientData = (ClientData) NULL;
          cmdPtr->deleteProc = NULL;
***************
*** 230,236 ****
      register InterpCallback *icPtr;
      Interp *iPtr = (Interp *) interp;

!     icPtr = (InterpCallback *) malloc(sizeof(InterpCallback));
      icPtr->proc = proc;
      icPtr->clientData = clientData;
      icPtr->nextPtr = iPtr->callbackPtr;
--- 236,242 ----
      register InterpCallback *icPtr;
      Interp *iPtr = (Interp *) interp;

!     icPtr = (InterpCallback *) TclMalloc(iPtr, sizeof(InterpCallback));
      icPtr->proc = proc;
      icPtr->clientData = clientData;
      icPtr->nextPtr = iPtr->callbackPtr;
***************
*** 282,288 ****
      for (icPtr = iPtr->callbackPtr; icPtr != NULL;
              icPtr = icPtr->nextPtr) {
          (*icPtr->proc)(icPtr->clientData, interp);
!         free((char *) icPtr);
      }

      /*
--- 288,294 ----
      for (icPtr = iPtr->callbackPtr; icPtr != NULL;
              icPtr = icPtr->nextPtr) {
          (*icPtr->proc)(icPtr->clientData, interp);
!         TclFree(iPtr, (char *) icPtr);
      }

      /*
***************
*** 295,316 ****
          if (cmdPtr->deleteProc != NULL) {
              (*cmdPtr->deleteProc)(cmdPtr->clientData);
          }
!         free((char *) cmdPtr);
      }
      iPtr->commandPtr = NULL;
      TclDeleteVars(iPtr);
      if (iPtr->events != NULL) {
!         free((char *) iPtr->events);
      }
      while (iPtr->revPtr != NULL) {
!         free((char *) iPtr->revPtr);
          iPtr->revPtr = iPtr->revPtr->nextPtr;
      }
      for (tracePtr = iPtr->tracePtr; tracePtr != NULL;
              tracePtr = tracePtr->nextPtr) {
!         free((char *) tracePtr);
      }
!     free((char *) iPtr);
  }
```

```
 /*
--- 301,322 ----
      if (cmdPtr->deleteProc != NULL) {
          (*cmdPtr->deleteProc)(cmdPtr->clientData);
      }
!     TclFree(iPtr, (char *) cmdPtr);
    }
    iPtr->commandPtr = NULL;
    TclDeleteVars(iPtr);
    if (iPtr->events != NULL) {
!     TclFree(iPtr, (char *) iPtr->events);
    }
    while (iPtr->revPtr != NULL) {
!     TclFree(iPtr, (char *) iPtr->revPtr);
      iPtr->revPtr = iPtr->revPtr->nextPtr;
    }
    for (tracePtr = iPtr->tracePtr; tracePtr != NULL;
          tracePtr = tracePtr->nextPtr) {
!     TclFree(iPtr, (char *) tracePtr);
    }
!   TclFree(iPtr, (char *) iPtr);
 }
```

```
  /*
***************
*** 375,381 ****
      register Command *cmdPtr;

      Tcl_DeleteCommand(interp, cmdName);
!     cmdPtr = (Command *) malloc(CMD_SIZE(strlen(cmdName)));
      cmdPtr->proc = proc;
      cmdPtr->clientData = clientData;
      cmdPtr->deleteProc = deleteProc;
--- 381,391 ----
      register Command *cmdPtr;

      Tcl_DeleteCommand(interp, cmdName);
!     cmdPtr = (Command *) TclMalloc(iPtr, CMD_SIZE(strlen(cmdName)));
!     if (cmdPtr == NULL) {
!         iPtr->result = "Exceeded allocation limit.";
!         return;
!     }
      cmdPtr->proc = proc;
      cmdPtr->clientData = clientData;
      cmdPtr->deleteProc = deleteProc;
***************
*** 401,407 ****
   *----------------------------------------------------------------------
   */

! void
  Tcl_DeleteCommand(interp, cmdName)
      Tcl_Interp *interp;          /* Token for command interpreter (returned
                                    * by a previous call to Tcl_CreateInterp). */
--- 411,417 ----
   *----------------------------------------------------------------------
   */

! int
  Tcl_DeleteCommand(interp, cmdName)
      Tcl_Interp *interp;          /* Token for command interpreter (returned
                                    * by a previous call to Tcl_CreateInterp). */
***************
*** 412,423 ****

      cmdPtr = TclFindCmd(iPtr, cmdName, 0);
      if (cmdPtr != NULL) {
        if (cmdPtr->deleteProc != NULL) {
            (*cmdPtr->deleteProc)(cmdPtr->clientData);
        }
        iPtr->commandPtr = cmdPtr->nextPtr;
!       free((char *) cmdPtr);
      }
  }
```

93/06/02
11:40:58

TCLDiffs

6

```
  /*
--- 422,441 ----

      cmdPtr = TclFindCmd(iPtr, cmdName, 0);
      if (cmdPtr != NULL) {
+ #ifdef APS
+       if (cmdPtr->proc != InterpProc) {
+           sprintf(interp->result, "Can't delete built-in function %s",
+                   cmdName);
+           return TCL_ERROR;
+       }
+ #endif
        if (cmdPtr->deleteProc != NULL) {
            (*cmdPtr->deleteProc)(cmdPtr->clientData);
        }
        iPtr->commandPtr = cmdPtr->nextPtr;
!       TclFree(iPtr, (char *) cmdPtr);
      }
+     return TCL_OK;
  }
```

```
  /*
***************
*** 523,529 ****
       */

      if (iPtr->dynamic) {
!       free((char *) iPtr->result);
        iPtr->dynamic = 0;
      }
      iPtr->result = iPtr->resultSpace;
--- 541,547 ----
       */

      if (iPtr->dynamic) {
!       TclFree(iPtr, (char *) iPtr->result);
        iPtr->dynamic = 0;
      }
      iPtr->result = iPtr->resultSpace;
***************
*** 536,542 ****
       */

      iPtr->numLevels++;
!     if (iPtr->numLevels > MAX_NESTING_DEPTH) {
        iPtr->result =  "too many nested calls to Tcl_Eval (infinite loop?)";
        return TCL_ERROR;
      }
--- 554,560 ----
       */

      iPtr->numLevels++;
!     if ((iPtr->numLevels > iPtr->nestingLimit) || (iPtr->numLevels > MAX_NESTING_DEPTH)
) {
        iPtr->result =  "too many nested calls to Tcl_Eval (infinite loop?)";
        return TCL_ERROR;
      }
***************
*** 691,697 ****
                              int delta;

                              copySize = length + 10 + dst - copy;
!                             newCopy = (char *) malloc((unsigned) copySize);
                              bcopy(copy, newCopy, (dst-copy));
                              delta = newCopy - copy;
                              dst += delta;
--- 709,720 ----
                              int delta;

                              copySize = length + 10 + dst - copy;
!                             newCopy = (char *) TclMalloc(iPtr, (unsigned) copySize);
!                             if (newCopy == NULL) {
!                                 iPtr->result = "Exceeded allocation limit.";
!                                 result = TCL_ERROR;
!                                 goto done;
!                             }
                              bcopy(copy, newCopy, (dst-copy));
                              delta = newCopy - copy;
                              dst += delta;
***************
*** 699,705 ****

                                  argv[i] += delta;
                              }
                              if (copy != copyStorage) {
```

93/06/02
11:40:58

TCLDiffs

7

```
!                           free((char *) copy);
                        }
                        copy = newCopy;
                        limit = newCopy + copySize - BUFFER;
--- 722,728 ----
                            argv[i] += delta;
                        }
!                       if (copy != copyStorage) {
                            TclFree(iPtr, (char *) copy);
                        }
                        copy = newCopy;
                        limit = newCopy + copySize - BUFFER;
***************
*** 726,732 ****
                    goto done;
                }
!           if (iPtr->dynamic) {
                free((char *) iPtr->result);
                iPtr->dynamic = 0;
            }
            iPtr->result = value;
--- 749,755 ----
                    goto done;
                }
!           if (iPtr->dynamic) {
                TclFree(iPtr, (char *) iPtr->result);
                iPtr->dynamic = 0;
            }
            iPtr->result = value;
***************
*** 804,815 ****
                argSize *= 2;
                newArgs = (char **)
!                       malloc((unsigned) argSize * sizeof(char *));
!               for (i = 0; i < argc; i++) {
                    newArgs[i] = argv[i];
                }
!               if (argv != argStorage) {
                    free((char *) argv);
                }
                argv = newArgs;
            }
--- 827,843 ----
                argSize *= 2;
                newArgs = (char **)
!                       TclMalloc(iPtr, (unsigned) argSize * sizeof(char *))
;
!               if (newArgs == NULL) {
!                   iPtr->result = "Exceeded allocation limit.";
!                   result = TCL_ERROR;
!                   goto done;
!               }
!               for (i = 0; i < argc; i++) {
                    newArgs[i] = argv[i];
                }
!               if (argv != argStorage) {
                    TclFree(iPtr, (char *) argv);
                }
                argv = newArgs;
            }
***************
*** 904,918 ****
```

```
                    int delta;

                    copySize *= 2;
!                   newCopy = (char *) malloc((unsigned) copySize);
!                   bcopy(copy, newCopy, (dst-copy));
                    delta = newCopy - copy;
                    dst += delta;
                    for (i = 0; i <= argc; i++) {
                        argv[i] += delta;
                    }
                    if (copy != copyStorage) {
!                       free((char *) copy);
                    }
                    copy = newCopy;
                    limit = newCopy + copySize - BUFFER;
--- 932,951 ----
                    int delta;

                    copySize *= 2;
!                   newCopy = (char *) TclMalloc(iPtr, (unsigned) copySize);
!                   if (newCopy == NULL) {
!                   iPtr->result = "Exceeded allocation limit.";
!                   result = TCL_ERROR;
!                   goto done;
!               }
!               bcopy(copy, newCopy, (dst-copy));
                    delta = newCopy - copy;
                    dst += delta;
                    for (i = 0; i <= argc; i++) {
                        argv[i] += delta;
                    }
                    if (copy != copyStorage) {
!                       TclFree(iPtr, (char *) copy);
                    }
                    copy = newCopy;
                    limit = newCopy + copySize - BUFFER;
***************
*** 991,999 ****
           */

          iPtr->cmdCount++;
!         iPtr->flags &= ~ERR_IN_PROGRESS;
          if (iPtr->dynamic) {
!             free((char *) iPtr->result);
              iPtr->dynamic = 0;
          }
          iPtr->result = iPtr->resultSpace;
--- 1024,1037 ----
           */

          iPtr->cmdCount++;
!         if ((iPtr->cmdLimit > -1) && (iPtr->cmdCount > iPtr->cmdLimit)) {
!         iPtr->result =  "too many commands executed, program aborted";
!         result = TCL_ERROR;
!         goto done;
!       }
!       iPtr->flags &= ~ERR_IN_PROGRESS;
          if (iPtr->dynamic) {
!             TclFree(iPtr, (char *) iPtr->result);
              iPtr->dynamic = 0;
          }
          iPtr->result = iPtr->resultSpace;
***************
*** 1010,1019 ****
```

93/06/02
11:40:58

TCLDiffs

8

```
        done:
        if (copy != copyStorage) {
!           free((char *) copy);
        }
        if (argv != argStorage) {
!           free((char *) argv);
        }
        iPtr->numLevels--;
        if (iPtr->numLevels == 0) {
--- 1048,1057 ----

        done:
        if (copy != copyStorage) {
!           TclFree(iPtr, (char *) copy);
        }
        if (argv != argStorage) {
!           TclFree(iPtr, (char *) argv);
        }
        iPtr->numLevels--;
        if (iPtr->numLevels == 0) {
***************
*** 1200,1206 ****
        register Trace *tracePtr;
        register Interp *iPtr = (Interp *) interp;

!       tracePtr = (Trace *) malloc(sizeof(Trace));
        tracePtr->level = level;
        tracePtr->proc = proc;
        tracePtr->clientData = clientData;
--- 1238,1244 ----
        register Trace *tracePtr;
        register Interp *iPtr = (Interp *) interp;

!       tracePtr = (Trace *) TclMalloc(iPtr, sizeof(Trace));
        tracePtr->level = level;
        tracePtr->proc = proc;
        tracePtr->clientData = clientData;
***************
*** 1239,1251 ****

        if (iPtr->tracePtr == tracePtr) {
          iPtr->tracePtr = tracePtr->nextPtr;
!         free((char *) tracePtr);
        } else {
          for (tracePtr2 = iPtr->tracePtr; tracePtr2 != NULL;
                  tracePtr2 = tracePtr2->nextPtr) {
              if (tracePtr2->nextPtr == tracePtr) {
                  tracePtr2->nextPtr = tracePtr->nextPtr;
!                 free((char *) tracePtr);
                  return;
              }
          }
--- 1277,1289 ----

        if (iPtr->tracePtr == tracePtr) {
          iPtr->tracePtr = tracePtr->nextPtr;
!         TclFree(iPtr, (char *) tracePtr);
        } else {
          for (tracePtr2 = iPtr->tracePtr; tracePtr2 != NULL;
                  tracePtr2 = tracePtr2->nextPtr) {
              if (tracePtr2->nextPtr == tracePtr) {
                  tracePtr2->nextPtr = tracePtr->nextPtr;
!                 TclFree(iPtr, (char *) tracePtr);
                        return;
                    }
                }
***************
*** 1288,1294 ****
                oldVar = "";
            }
            length = strlen(oldVar);
!           buffer = malloc((unsigned) (length + strlen(message) + 1));
            strcpy(buffer, oldVar);
            strcpy(buffer+length, message);
            Tcl_SetVar(interp, "errorInfo", buffer, 1);
--- 1326,1336 ----
                oldVar = "";
            }
            length = strlen(oldVar);
!           buffer = TclMalloc(iPtr, (unsigned) (length + strlen(message) + 1));
!           if (buffer == NULL) {
!               iPtr->result = "Exceeded allocation limit.";
!               return;
!           }
            strcpy(buffer, oldVar);
            strcpy(buffer+length, message);
            Tcl_SetVar(interp, "errorInfo", buffer, 1);
***************
*** 1386,1388 ****
--- 1428,1548 ----
      }
      return match;
  }
+
```

93/06/02
11:40:58

TCLDiffs

9

```
+ /*
+  *----------------------------------------------------------------------
+  *
+  * Tcl_ResetInterp --
+  *
+  *      Reset an interpreter to the state it had just after being created.
+  *      This is sort of like calling Tcl_DeleteInterp followed by
+  *      Tcl_CreateInterp, only more efficient.  It does no callbacks.
+  *
+  * Results:
+  *      None.
+  *
+  * Side effects:
+  *      The command interpreter is reinitialized with an empty variable
+  *      table and the built in commands.
+  *
+  *----------------------------------------------------------------------
+  */
+
+ void
+ Tcl_ResetInterp(interp)
+     Tcl_Interp *interp;              /* Token for command interpreter (returned
+                                       * by a previous call to Tcl_CreateInterp). */
+ {
+     register Interp *iPtr = (Interp *) interp;
+     register Trace *tracePtr;
+     Trace *nextTracePtr;
+     Command *cmd, **pp;
+
+     TclDeleteVars(iPtr);
+     if (iPtr->events != NULL) {
+       TclFree(iPtr, (char *) iPtr->events);
+       iPtr->events = NULL;
+     }
+     while (iPtr->revPtr != NULL) {
+       struct HistoryRev *temp = iPtr->revPtr->nextPtr;
+       TclFree(iPtr, (char *) iPtr->revPtr);
+       iPtr->revPtr = temp;
+     }
+     for (tracePtr = iPtr->tracePtr; tracePtr != NULL;
+        tracePtr = nextTracePtr) {
+       nextTracePtr = tracePtr->nextPtr;
+       TclFree(iPtr, (char *) tracePtr);
+     }
+
+     /* Delete non-built-in procs. */
+     for (pp = &iPtr->commandPtr; *pp != NULL;) {
+       cmd = *pp;
+       if (cmd->proc == InterpProc) {
+           /* Delete user-defined procs. */
+           if (cmd->deleteProc != NULL)
+               (*cmd->deleteProc)(cmd->clientData);
+           *pp = cmd->nextPtr;
+           TclFree(iPtr, (char *) cmd);
+           /* pp now points to the next guy. */
+       }
+       else
+           pp = &cmd->nextPtr;
+     }
+
+     iPtr->result = iPtr->resultSpace;
+     iPtr->dynamic = 0;
+     iPtr->errorLine = 0;
+     iPtr->globalPtr = NULL;
+     iPtr->numLevels = 0;
+     iPtr->framePtr = NULL;
+     iPtr->varFramePtr = NULL;
+     iPtr->numEvents = 0;
+     iPtr->curEvent = 0;
+     iPtr->curEventNum = 0;
+     iPtr->revPtr = NULL;
+     iPtr->historyFirst = NULL;
+     iPtr->evalFirst = iPtr->evalLast = NULL;
+     iPtr->cmdCount = 0;
+     iPtr->cmdLimit = -1;
+     iPtr->allocCount = 0;
+     iPtr->allocLimit = -1;
+     iPtr->nestingLimit = MAX_NESTING_DEPTH;
+     iPtr->noEval = 0;
+     iPtr->flags = 0;
+     iPtr->tracePtr = NULL;
+     iPtr->resultSpace[0] = 0;
+ }
+
```

93/06/02
11:40:58

TCLDiffs

10

```
+ /*
+  *----------------------------------------------------------------------
+  *
+  * Tcl_Limits --
+  *
+  *     Sets limits on the number of commands that can be executed by
+  *     the interpreter, the number of bytes that can be allocated, and the
+  *     number of levels of nesting permitted in Tcl commands.  Each of
+  *     these limits is on a per-interpreter basis.
+  *
+  * Results:
+  *     None.
+  *
+  * Side effects:
+  *     The new limits apply to any future actions taken by the interpreter.
+  *
+  *----------------------------------------------------------------------
+  */
+
+ void
+ Tcl_Limits(interp, cmds, bytes, nesting)
+     Tcl_Interp *interp;            /* Token for command interpreter (returned
+                                 * by a previous call to Tcl_CreateInterp). */
+       int cmds;
+       int bytes;
+       int nesting;
+ {
+     Interp *iPtr = (Interp *) interp;
+
+     iPtr->cmdLimit = cmds;
+     iPtr->allocLimit = bytes;
+     iPtr->nestingLimit = nesting;
+ }
```

```
diff -c tcl.old/tclCmdAH.c tcl/tclCmdAH.c
*** tcl.old/tclCmdAH.c  Fri Feb  8 18:16:26 1991
--- tcl/tclCmdAH.c      Thu Feb 21 11:39:15 1991
***************
*** 158,164 ****
                  break;
              }
          }
!         free((char *) patArgv);
          if (j < patArgc) {
              break;
          }
--- 158,164 ----
                  break;
              }
          }
!         TclFree(interp, (char *) patArgv);
          if (j < patArgc) {
              break;
          }
***************
*** 256,262 ****
        return TCL_ERROR;
      }

!     interp->result = Tcl_Concat(argc-1, argv+1);
      interp->dynamic = 1;
      return TCL_OK;
  }
--- 256,266 ----
        return TCL_ERROR;
      }

!     interp->result = TclConcat(interp, argc-1, argv+1);
!     if (interp->result == NULL) {
!       interp->result = "Exceeded allocation limit.";
!           return TCL_ERROR;
!     }
      interp->dynamic = 1;
      return TCL_OK;
  }
***************
*** 376,384 ****
         * between, then evaluate the result.
         */

!       cmd = Tcl_Concat(argc-1, argv+1);
        result = Tcl_Eval(interp, cmd, 0, (char **) NULL);
!       free(cmd);
      }
      if (result == TCL_ERROR) {
        char msg[60];
--- 380,392 ----
         * between, then evaluate the result.
         */

!       cmd = TclConcat(interp, argc-1, argv+1);
!       if (cmd == NULL) {
!           interp->result = "Exceeded allocation limit.";
!               return TCL_ERROR;
!       }
        result = Tcl_Eval(interp, cmd, 0, (char **) NULL);
!       TclFree(interp, cmd);
      }
```

93/06/02
11:40:58

TCLDiffs

11

```
      if (result == TCL_ERROR) {
          char msg[60];
***************
*** 582,591 ****
            } else {
                outputSpace = 2*outputSpace;
            }
!           newOutput = (char *) malloc((unsigned) outputSpace);
            if (output != 0) {
                bcopy(output, newOutput, outputSize);
!               free(output);
            }
            output = newOutput;
        }
--- 590,604 ----
            } else {
                outputSpace = 2*outputSpace;
            }
!           newOutput = (char *) TclMalloc(interp, (unsigned) outputSpace);
!           if (newOutput == NULL) {
!               interp->result = "Exceeded allocation limit.";
!               result = TCL_ERROR;
!               goto cleanup;
!           }
            if (output != 0) {
                bcopy(output, newOutput, outputSize);
!               TclFree(interp, output);
            }
            output = newOutput;
        }
***************
*** 1000,1006 ****
            }
        }
    }
!   free((char *) listArgv);
    if (result == TCL_OK) {
      Tcl_Return(interp, (char *) NULL, TCL_STATIC);
    }
--- 1013,1019 ----
            }
        }
    }
!   TclFree(interp, (char *) listArgv);
    if (result == TCL_OK) {
      Tcl_Return(interp, (char *) NULL, TCL_STATIC);
    }
***************
*** 1277,1288 ****
            int newSpace;

            newSpace = 2*(dstSize + size);
!           newDst = (char *) malloc((unsigned) newSpace+1);
            if (dstSize != 0) {
                bcopy(dst, newDst, dstSize);
            }
            if (dstSpace != TCL_RESULT_SIZE) {
!               free(dst);
            }
            dst = newDst;
            dstSpace = newSpace;
--- 1290,1305 ----
            int newSpace;

            newSpace = 2*(dstSize + size);
!           newDst = (char *) TclMalloc(interp, (unsigned) newSpace+1);
!           if (newDst == NULL) {
!               interp->result = "Exceeded allocation limit.";
!               goto fmtError;
!           }
            if (dstSize != 0) {
                bcopy(dst, newDst, dstSize);
            }
            if (dstSpace != TCL_RESULT_SIZE) {
!               TclFree(interp, dst);
            }
            dst = newDst;
            dstSpace = newSpace;
***************
*** 1310,1316 ****
            "invoked \"%.50s\" without enough arguments", argv[0]);
    fmtError:
    if (dstSpace != TCL_RESULT_SIZE) {
!     free(dst);
    }
    return TCL_ERROR;
  }
--- 1327,1333 ----
            "invoked \"%.50s\" without enough arguments", argv[0]);
    fmtError:
    if (dstSpace != TCL_RESULT_SIZE) {
!     TclFree(interp, dst);
    }
    return TCL_ERROR;
  }
```

93/06/02
11:40:58

TCLDiffs

12

```
diff -c tcl.old/tclCmdIZ.c tcl/tclCmdIZ.c
*** tcl.old/tclCmdIZ.c  Fri Feb  8 22:57:20 1991
--- tcl/tclCmdIZ.c      Wed Feb 27 12:40:03 1991
***************
*** 158,164 ****
            }
        }
        if (size >= TCL_RESULT_SIZE) {
!           interp->result = (char *) malloc((unsigned) size+1);
            interp->dynamic = 1;
        }
        if (parenthesized) {
--- 158,168 ----
            }
        }
        if (size >= TCL_RESULT_SIZE) {
!           interp->result = (char *) TclMalloc(interp, (unsigned) size+1);
!           if (interp->result == NULL) {
!               interp->result = "Exceeded allocation limit.";
!               return TCL_ERROR;
!           }
            interp->dynamic = 1;
        }
        if (parenthesized) {
***************
*** 398,404 ****
            if (framePtr == NULL) {
                goto levelError;
            }
!           iPtr->result = Tcl_Merge(framePtr->argc, framePtr->argv);
            iPtr->dynamic = 1;
            return TCL_OK;
        }
--- 402,412 ----
            if (framePtr == NULL) {
                goto levelError;
            }
!           iPtr->result = TclMerge(iPtr, framePtr->argc, framePtr->argv);
!           if (iPtr->result == NULL) {
!               iPtr->result = "Exceeded allocation limit.";
!               return TCL_ERROR;
!           }
            iPtr->dynamic = 1;
            return TCL_OK;
        }
***************
*** 466,475 ****
            char **newArgs;

            argSize *= 2;
!           newArgs = (char **) malloc((unsigned) argSize*sizeof(char *));
!           bcopy((char *) argv, (char *) newArgs, argc*sizeof(char *));
            if (argv != argSpace) {
!               free((char *) argv);
            }
            argv = newArgs;
        }
--- 474,486 ----
            char **newArgs;

            argSize *= 2;
!           newArgs = (char **) TclMalloc(iPtr, (unsigned) argSize*sizeof(char *));
!           if (newArgs == NULL) {
!               iPtr->result = "Exceeded allocation limit.";
!               return TCL_ERROR;
!           }
!           bcopy((char *) argv, (char *) newArgs, argc*sizeof(char *));
            if (argv != argSpace) {
!               TclFree(iPtr, (char *) argv);
            }
            argv = newArgs;
        }
***************
*** 506,515 ****
            }
        }

!       iPtr->result = Tcl_Merge(argc, argv);
!       iPtr->dynamic = 1;
        if (argv != argSpace) {
!           free((char *) argv);
        }
        return TCL_OK;
    }
--- 517,530 ----
            }
        }

!       iPtr->result = TclMerge(iPtr, argc, argv);
!       if (iPtr->result == NULL) {
!           iPtr->result = "Exceeded allocation limit.";
!           return TCL_ERROR;
!       }
!       iPtr->dynamic = 1;
        if (argv != argSpace) {
!           TclFree(iPtr, (char *) argv);
        }
        return TCL_OK;
    }
***************
*** 605,612 ****
                    argv[0]);
            return TCL_ERROR;
        }
!       interp->result = Tcl_Merge(argc-1, argv+1);
!       interp->dynamic = 1;
        return TCL_OK;
    }
```

93/06/02
11:40:58

TCLDiffs

13

```
--- 620,631 ----
                argv[0]);
        return TCL_ERROR;
    }
!   interp->result = TclMerge(interp, argc-1, argv+1);
!   if (interp->result == NULL) {
!         interp->result = "Exceeded allocation limit.";
!         return TCL_ERROR;
!     }
!     interp->dynamic = 1;
    return TCL_OK;
}
```

```
***************
*** 841,848 ****
            return TCL_ERROR;
        }
        if (argv[2][0] == '\0') {
!           Tcl_DeleteCommand(interp, argv[1]);
!           return TCL_OK;
        }
        newPtr = TclFindCmd(iPtr, argv[2], 0);
        if (newPtr != NULL) {
--- 860,866 ----
            return TCL_ERROR;
        }
        if (argv[2][0] == '\0') {
!           return Tcl_DeleteCommand(interp, argv[1]);
        }
        newPtr = TclFindCmd(iPtr, argv[2], 0);
        if (newPtr != NULL) {
***************
*** 858,871 ****
            return TCL_ERROR;
        }
        iPtr->commandPtr = oldPtr->nextPtr;
!       newPtr = (Command *) malloc(CMD_SIZE(strlen(argv[2])));
!       newPtr->proc = oldPtr->proc;
        newPtr->clientData = oldPtr->clientData;
        newPtr->deleteProc = oldPtr->deleteProc;
        newPtr->nextPtr = iPtr->commandPtr;
        iPtr->commandPtr = newPtr;
        strcpy(newPtr->name, argv[2]);
!       free((char *) oldPtr);
        return TCL_OK;
    }
  #endif
--- 876,893 ----
            return TCL_ERROR;
        }
        iPtr->commandPtr = oldPtr->nextPtr;
!       newPtr = (Command *) TclMalloc(iPtr, CMD_SIZE(strlen(argv[2])));
!       if (newPtr == NULL) {
!               iPtr->result = "Exceeded allocation limit.";
!               return TCL_ERROR;
!         }
!         newPtr->proc = oldPtr->proc;
        newPtr->clientData = oldPtr->clientData;
        newPtr->deleteProc = oldPtr->deleteProc;
        newPtr->nextPtr = iPtr->commandPtr;
        iPtr->commandPtr = newPtr;
        strcpy(newPtr->name, argv[2]);
!       TclFree(iPtr, (char *) oldPtr);
        return TCL_OK;
    }
  #endif
***************
*** 1056,1063 ****
         * Step 2:
         */

!       results = (char *) malloc((unsigned) totalSize);
!       for (i = 0, totalSize = 0, curField = fields;
                i < numFields; i++, curField++) {
            curField->location = results + totalSize;
            totalSize += curField->size;
```

93/06/02
11:40:58

TCLDiffs

14

```
- - - 1078,1089 ----
        * Step 2:
        */

!       results = (char *) TclMalloc(interp, (unsigned) totalSize);
!       if (results == NULL) {
!           interp->result = "Exceeded allocation limit.";
!           return TCL_ERROR;
!       }
!       for (i = 0, totalSize = 0, curField = fields;
            i < numFields; i++, curField++) {
        curField->location = results + totalSize;
        totalSize += curField->size;
***************
*** 1107,1113 ****
                break;
        }
      }
!     free(results);
      sprintf(interp->result, "%d", numScanned);
      return TCL_OK;
  }
--- 1133,1139 ----
                break;
        }
      }
!     TclFree(interp, results);
      sprintf(interp->result, "%d", numScanned);
      return TCL_OK;
  }
***************
*** 1162,1169 ****
        close(fileId);
        return TCL_ERROR;
      }
!     cmdBuffer = (char *) malloc((unsigned) statBuf.st_size+1);
!     if (read(fileId, cmdBuffer, (int) statBuf.st_size) != statBuf.st_size) {
        sprintf(interp->result, "error in reading file \"%.50s\"", argv[1]);
        close(fileId);
        return TCL_ERROR;
--- 1188,1199 ----
        close(fileId);
        return TCL_ERROR;
      }
!     cmdBuffer = (char *) TclMalloc(interp, (unsigned) statBuf.st_size+1);
!     if (cmdBuffer == NULL) {
!         interp->result = "Exceeded allocation limit.";
!         return TCL_ERROR;
!     }
!     if (read(fileId, cmdBuffer, (int) statBuf.st_size) != statBuf.st_size) {
        sprintf(interp->result, "error in reading file \"%.50s\"", argv[1]);
        close(fileId);
        return TCL_ERROR;
***************
*** 1184,1190 ****
        sprintf(msg, " (file \"%.50s\" line %d)", argv[1], interp->errorLine);
        Tcl_AddErrorInfo(interp, msg);
      }
!     free(cmdBuffer);
      return result;
  }
  #endif
--- 1214,1220 ----
        sprintf(msg, " (file \"%.50s\" line %d)", argv[1], interp->errorLine);
        Tcl_AddErrorInfo(interp, msg);
      }
!     TclFree(interp, cmdBuffer);
      return result;
  }
  #endif
***************
*** 1272,1278 ****
      return TCL_OK;
  }
```

93/06/02
11:40:58

TCLDiffs

15

```
! #ifndef AFS
  /*
   *----------------------------------------------------------------------
   *
--- 1302,1308 ----
      return TCL_OK;
  }
```

```
! #ifndef AFSX
  /*
   *----------------------------------------------------------------------
   *
```

93/06/02
11:40:58

TCLDiffs

16

```
diff -c tcl.old/tclInt.h tcl/tclInt.h
*** tcl.old/tclInt.h     Thu Mar 29 10:55:16 1990
--- tcl/tclInt.h         Thu Feb 21 11:43:33 1991
***************
*** 291,296 ****
--- 291,308 ----
                              * interpreter is deleted. */
      char resultSpace[TCL_RESULT_SIZE];
                              /* Static space for storing small results. */
+
+     /*
+      * Information added for ACPs:
+      */
+
+     int cmdLimit;           /* Max number of commands that can be
+                                executed */
+     int allocCount;         /* Total number of bytes allocated */
+     int allocLimit;         /* Max number of bytes that can be allocated */
+     int nestingLimit;       /* Maximum number of levels of nesting
+                                permitted */
+
  } Interp;

  /*
***************
*** 344,347 ****
--- 356,369 ----
  extern Proc *          TclIsProc();
  extern char *          TclWordEnd();

+ /*
+  * Procedures shared among Tcl modules and added for ACPs:
+  */
+
+ extern char *          TclMerge();
+ extern char *          TclConcat();
+
+ extern char * TclMalloc();
+ extern int             TclFree();
+
  #endif _TCLINT
```

```
diff -c tcl.old/tclProc.c tcl/tclProc.c
*** tcl.old/tclProc.c    Thu Mar 29 10:55:20 1990
--- tcl/tclProc.c        Fri Feb 22 18:53:04 1991
***************
*** 70,78 ****
        return TCL_ERROR;
      }

!     procPtr = (Proc *) malloc(sizeof(Proc));
      procPtr->iPtr = iPtr;
!     procPtr->command = (char *) malloc((unsigned) strlen(argv[3]) + 1);
      strcpy(procPtr->command, argv[3]);
      procPtr->argPtr = NULL;
      Tcl_CreateCommand(interp, argv[1], InterpProc,
--- 70,86 ----
       return TCL_ERROR;
     }

!    procPtr = (Proc *) TclMalloc(iPtr, sizeof(Proc));
!    if (procPtr == NULL) {
!      iPtr->result = "Exceeded allocation limit.";
!      return TCL_ERROR;
!    }
     procPtr->iPtr = iPtr;
!    procPtr->command = (char *) TclMalloc(iPtr, (unsigned) strlen(argv[3]) + 1);
!    if (procPtr->command == NULL) {
!      iPtr->result = "Exceeded allocation limit.";
!      return TCL_ERROR;
!    }
     strcpy(procPtr->command, argv[3]);
     procPtr->argPtr = NULL;
     Tcl_CreateCommand(interp, argv[1], InterpProc,
***************
*** 108,119 ****
           result = TCL_ERROR;
           goto procError;
       }
-      if ((fieldCount == 0) || (*fieldValues[0] == 0)) {
-          sprintf(iPtr->result,
-                  "procedure \"%.50s\" has argument with no name", argv[1]);
-          result = TCL_ERROR;
-          goto procError;
-      }
       nameLength = strlen(fieldValues[0]);
       if (fieldCount == 2) {
           valueLength = strlen(fieldValues[1]);
--- 116,121 ----
***************
*** 121,131 ****
           valueLength = 0;
       }
       if (procPtr->argPtr == NULL) {
!          argPtr = (Var *) malloc(VAR_SIZE(nameLength, valueLength));
!          procPtr->argPtr = argPtr;
       } else {
!          argPtr->nextPtr = (Var *) malloc(VAR_SIZE(nameLength, valueLength));
!          argPtr = argPtr->nextPtr;
       }
       strcpy(argPtr->name, fieldValues[0]);
       if (fieldCount == 2) {
--- 123,143 ----
           valueLength = 0;
       }
       if (procPtr->argPtr == NULL) {
```

93/06/02
11:40:58

TCLDiffs

17

```
!           argPtr = (Var *) TclMalloc(iPtr, VAR_SIZE(nameLength, valueLength));
!           if (argPtr == NULL) {
!               iPtr->result = "Exceeded allocation limit.";
!               result = TCL_ERROR;
!               goto procError;
!               }
!               procPtr->argPtr = argPtr;
        } else {
!           argPtr->nextPtr = (Var *) TclMalloc(iPtr, VAR_SIZE(nameLength, valueLength))
!
!           if (argPtr->nextPtr == NULL) {
!               iPtr->result = "Exceeded allocation limit.";
!               result = TCL_ERROR;
!               goto procError;
!               }
!               argPtr = argPtr->nextPtr;
        }
        strcpy(argPtr->name, fieldValues[0]);
        if (fieldCount == 2) {
***************
*** 137,150 ****
        argPtr->valueLength = valueLength;
        argPtr->flags = 0;
        argPtr->nextPtr = NULL;
!       free((char *) fieldValues);
      }

!     free((char *) argArray);
      return TCL_OK;

      procError:
!     free((char *) argArray);
      return result;
  }
```

```
--- 149,162 ----
            argPtr->valueLength = valueLength;
            argPtr->flags = 0;
            argPtr->nextPtr = NULL;
!           TclFree(iPtr, (char *) fieldValues);
        }

!       TclFree(iPtr, (char *) argArray);
        return TCL_OK;

        procError:
!       TclFree(iPtr, (char *) argArray);
        return result;
  }
```

93/06/02
11:40:58

TCLDiffs

18

```
***************
*** 233,239 ****
        }
        varPtr = FindVar(varListPtr, varName);
        if (varPtr == NULL) {
!         varPtr = NewVar(varName, newValue);
          varPtr->nextPtr = *varListPtr;
          *varListPtr = varPtr;
        } else {
--- 245,255 ----
        }
        varPtr = FindVar(varListPtr, varName);
        if (varPtr == NULL) {
!         varPtr = NewVar(iPtr, varName, newValue);
!         if (varPtr == NULL) {
!             interp->result = "Exceeded allocation limit.";
!             return;
!         }
          varPtr->nextPtr = *varListPtr;
          *varListPtr = varPtr;
        } else {
***************
*** 243,251 ****
          valueLength = strlen(newValue);
          if (valueLength > varPtr->valueLength) {
              if (varPtr->flags & VAR_DYNAMIC) {
!                 free(varPtr->value);
              }
!             varPtr->value = (char *) malloc((unsigned) valueLength + 1);
              varPtr->flags |= VAR_DYNAMIC;
              varPtr->valueLength = valueLength;
          }
--- 259,274 ----
          valueLength = strlen(newValue);
          if (valueLength > varPtr->valueLength) {
              if (varPtr->flags & VAR_DYNAMIC) {
!                 TclFree(iPtr, varPtr->value);
              }
!             varPtr->value = (char *) TclMalloc(iPtr, (unsigned) valueLength + 1);
!             if (varPtr->value == NULL) {
!                 interp->result = "Exceeded allocation limit.";
!                 /* Clean up the variable. */
!                 varPtr->flags &= ~VAR_DYNAMIC;
!                 varPtr->valueLength = 0;
!                 return;
!             }
              varPtr->flags |= VAR_DYNAMIC;
              varPtr->valueLength = valueLength;
          }
***************
*** 427,438 ****
      for (argc--, argv++; argc > 0; argc--, argv++) {
        gVarPtr = FindVar(&iPtr->globalPtr, *argv);
        if (gVarPtr == NULL) {
!           gVarPtr = NewVar(*argv, "");
            gVarPtr->nextPtr = iPtr->globalPtr;
            iPtr->globalPtr = gVarPtr;
            gVarPtr->flags |= VAR_DOESNT_EXIST;
        }
!       varPtr = NewVar(*argv, "");
        varPtr->flags |= VAR_GLOBAL;
        varPtr->globalPtr = gVarPtr;
        varPtr->nextPtr = iPtr->varFramePtr->varPtr;
--- 450,469 ----
      for (argc--, argv++; argc > 0; argc--, argv++) {
        gVarPtr = FindVar(&iPtr->globalPtr, *argv);
        if (gVarPtr == NULL) {
!           gVarPtr = NewVar(iPtr, *argv, "");
!           if (gVarPtr == NULL) {
!               iPtr->result = "Exceeded allocation limit.";
!               return TCL_ERROR;
!           }
            gVarPtr->nextPtr = iPtr->globalPtr;
            iPtr->globalPtr = gVarPtr;
            gVarPtr->flags |= VAR_DOESNT_EXIST;
        }
!       varPtr = NewVar(iPtr, *argv, "");
!       if (varPtr == NULL) {
!           iPtr->result = "Exceeded allocation limit.";
!           return TCL_ERROR;
!       }
        varPtr->flags |= VAR_GLOBAL;
        varPtr->globalPtr = gVarPtr;
        varPtr->nextPtr = iPtr->varFramePtr->varPtr;
***************
*** 545,551 ****
      } else {
        char *cmd;

!       cmd = Tcl_Concat(argc, argv);
        result = Tcl_Eval(interp, cmd, 0, (char **) NULL);
      }
      if (result == TCL_ERROR) {
--- 576,586 ----
      } else {
        char *cmd;

!       cmd = TclConcat(interp, argc, argv);
!       if (cmd == NULL) {
!           interp->result = "Exceeded allocation limit.";
!           return TCL_ERROR;
!       }
        result = Tcl_Eval(interp, cmd, 0, (char **) NULL);
      }
      if (result == TCL_ERROR) {
***************
*** 656,664 ****

      for (varPtr = iPtr->globalPtr; varPtr != NULL; varPtr = varPtr->nextPtr) {
        if (varPtr->flags & VAR_DYNAMIC) {
!           free(varPtr->value);
        }
!       free((char *) varPtr);
      }
  }
```

93/06/02
11:40:58

TCLDiffs

19

```
--- 691,699 ----

      for (varPtr = iPtr->globalPtr; varPtr != NULL; varPtr = varPtr->nextPtr) {
        if (varPtr->flags & VAR_DYNAMIC) {
!           TclFree(iPtr, varPtr->value);
        }
!       TclFree(iPtr, (char *) varPtr);
      }
  }
```

```
***************
*** 734,742 ****
            if (argc < 0) {
                argc = 0;
            }
!           value = Tcl_Merge(argc, args);
!           argPtr = NewVar(formalPtr->name, value);
!           free(value);
            argPtr->nextPtr = frame.varPtr;
            frame.varPtr = argPtr;
            argc = 0;
--- 769,785 ----
            if (argc < 0) {
                argc = 0;
            }
!           value = TclMerge(iPtr, argc, args);
!           if (value == NULL) {
!               iPtr->result = "Exceeded allocation limit.";
!               return TCL_ERROR;
!           }
!           argPtr = NewVar(iPtr, formalPtr->name, value);
!           if (argPtr == NULL) {
!               iPtr->result = "Exceeded allocation limit.";
!               return TCL_ERROR;
!           }
!           TclFree(iPtr, value);
            argPtr->nextPtr = frame.varPtr;
            frame.varPtr = argPtr;
            argc = 0;
***************
*** 752,758 ****
            result = TCL_ERROR;
            goto procDone;
        }
!       argPtr = NewVar(formalPtr->name, value);
        argPtr->nextPtr = frame.varPtr;
        frame.varPtr = argPtr;
      }
--- 795,805 ----
            result = TCL_ERROR;
            goto procDone;
        }
!       argPtr = NewVar(iPtr, formalPtr->name, value);
!       if (argPtr == NULL) {
!               iPtr->result = "Exceeded allocation limit.";
!               return TCL_ERROR;
!       }
        argPtr->nextPtr = frame.varPtr;
        frame.varPtr = argPtr;
      }
***************
*** 795,803 ****
      procDone:
      for (argPtr = frame.varPtr; argPtr != NULL; argPtr = argPtr->nextPtr) {
        if (argPtr->flags & VAR_DYNAMIC) {
!           free(argPtr->value);
        }
!       free((char *) argPtr);
      }
      iPtr->framePtr = frame.callerPtr;
      iPtr->varFramePtr = frame.callerVarPtr;
--- 842,850 ----
      procDone:
```

93/06/02
11:40:58

TCLDiffs

20

```
        for (argPtr = frame.varPtr; argPtr != NULL; argPtr = argPtr->nextPtr) {
            if (argPtr->flags & VAR_DYNAMIC) {
!               TclFree(iPtr, argPtr->value);
            }
!           TclFree(iPtr, (char *) argPtr);
        }
        iPtr->framePtr = frame.callerPtr;
        iPtr->varFramePtr = frame.callerVarPtr;
***************
*** 828,841 ****
  {
        register Var *argPtr;

!       free((char *) procPtr->command);
        for (argPtr = procPtr->argPtr; argPtr != NULL; argPtr = argPtr->nextPtr) {
            if (argPtr->flags & VAR_DYNAMIC) {
!               free(argPtr->value);
            }
!           free((char *) argPtr);
        }
!       free((char *) procPtr);
  }
```

```
  /*
--- 875,888 ----
  {
        register Var *argPtr;

!       TclFree(procPtr->iPtr, (char *) procPtr->command);
        for (argPtr = procPtr->argPtr; argPtr != NULL; argPtr = argPtr->nextPtr) {
            if (argPtr->flags & VAR_DYNAMIC) {
!               TclFree(procPtr->iPtr, argPtr->value);
            }
!           TclFree(procPtr->iPtr, (char *) argPtr);
        }
!       TclFree(procPtr->iPtr, (char *) procPtr);
  }
```

93/06/02
11:40:58

```
  /*
***************
*** 907,913 ****
   */

  Var *
! NewVar(name, value)
      char *name;                         /* Name for variable. */
      char *value;                    /* Value for variable. */
  {
--- 954,961 ----
   */

  Var *
! NewVar(interp, name, value)
!     Tcl_Interp *interp;
      char *name;                         /* Name for variable. */
      char *value;                    /* Value for variable. */
  {
***************
*** 919,925 ****
      if (valueLength < 20) {
        valueLength = 20;
      }
!     varPtr = (Var *) malloc(VAR_SIZE(nameLength, valueLength));
      strcpy(varPtr->name, name);
      varPtr->value = varPtr->name + nameLength + 1;
      strcpy(varPtr->value, value);
--- 967,976 ----
      if (valueLength < 20) {
        valueLength = 20;
      }
!     varPtr = (Var *) TclMalloc(interp, VAR_SIZE(nameLength, valueLength));
!     if (varPtr == NULL) {
!       return NULL;
!       };
      strcpy(varPtr->name, name);
      varPtr->value = varPtr->name + nameLength + 1;
      strcpy(varPtr->value, value);
```

TCLDiffs

21

```
diff -c tcl.old/tclTest.c tcl/tclTest.c
*** tcl.old/tclTest.c   Fri Feb  8 18:29:30 1991
--- tcl/tclTest.c       Thu Feb 21 11:39:17 1991
***************
*** 83,88 ****
--- 83,115 ----
      return TCL_OK;
  }

+ int
+ cmdLimits(clientData, interp, argc, argv)
+     ClientData clientData;              /* Not used. */
+     Tcl_Interp *interp;
+     int argc;
+     int *argv;
+ {
+     if (argc != 4) {
+       sprintf(interp->result, "wrong # args:  should be \"%.50s commands bytes nesting\
"",
+               argv[0]);
+       return TCL_ERROR;
+     }
+     Tcl_Limits(interp, atoi(argv[1]), atoi(argv[2]), atoi(argv[3]));
+     return TCL_OK;
+ }
+
+ int
+ cmdReset(clientData, interp, argc, argv)
+     ClientData clientData;              /* Not used. */
+     Tcl_Interp *interp;
+     int argc;
+     int *argv;
+ {
+     Tcl_ResetInterp(interp);
+     return TCL_OK;
+ }
+
  main()
  {
      char line[1000], *cmd;
***************
*** 93,98 ****
--- 120,129 ----
              deleteProc);
      Tcl_CreateCommand(interp, "create", cmdCreate, (ClientData) "create",
              deleteProc);
+     Tcl_CreateCommand(interp, "limits", cmdLimits, (ClientData) "limits",
+             deleteProc);
+     Tcl_CreateCommand(interp, "reset", cmdReset, (ClientData) "reset",
+             deleteProc);
      buffer = Tcl_CreateCmdBuf();

      gotPartial = 0;
```

93/06/02
11:40:58

TCLDiffs

22

```
diff -c tcl.old/tclUtil.c tcl/tclUtil.c
*** tcl.old/tclUtil.c   Sun Mar 25 11:04:40 1990
--- tcl/tclUtil.c       Thu Feb 21 11:39:17 1991
***************
*** 265,270 ****
--- 265,279 ----
      int argc;                   /* How many strings to merge. */
      char **argv;                /* Array of string values. */
  {
+ return TclMerge(NULL, argc, argv);
+ }
+
+ char *
+ TclMerge(interp, argc, argv)
+     Tcl_Interp *interp;              /* Interpreter to use for accounting. */
+     int argc;                   /* How many strings to merge. */
+     char **argv;                /* Array of string values. */
+ {
      /*
       * This procedure operates in two passes.  In the first pass it figures
       * out how many bytes will be needed to store the result (actually,
***************
*** 314,321 ****
      if (argc <= LOCAL_SIZE) {
        flagPtr = localFlags;
      } else {
!       flagPtr = (int *) malloc((unsigned) argc*sizeof(int));
      }
      numChars = 0;
      for (i = 0; i < argc; i++) {
        int braceCount, nestingLevel, nestedBS, whiteSpace, brackets, dollars;
--- 323,333 ----
      if (argc <= LOCAL_SIZE) {
        flagPtr = localFlags;
      } else {
!       flagPtr = (int *) TclMalloc(interp, (unsigned) argc*sizeof(int));
      }
+     if (flagPtr == NULL) {
+       return NULL;
+     }
      numChars = 0;
      for (i = 0; i < argc; i++) {
        int braceCount, nestingLevel, nestedBS, whiteSpace, brackets, dollars;
***************
*** 387,393 ****
       * Pass two: copy into the result area.
       */.

!     result = (char *) malloc((unsigned) numChars + 1);
      dst = result;
      for (i = 0; i < argc; i++) {
        curFlags = flagPtr[i];
--- 399,408 ----
       * Pass two: copy into the result area.
       */

!     result = (char *) TclMalloc(interp, (unsigned) numChars + 1);
!     if (result == NULL) {
!       return NULL;
!     }
      dst = result;
      for (i = 0; i < argc; i++) {
        curFlags = flagPtr[i];
***************
*** 450,456 ****
      }

      if (flagPtr != localFlags) {
!       free((char *) flagPtr);
      }
      return result;
  }
--- 465,471 ----
      }

      if (flagPtr != localFlags) {
!       TclFree(interp, (char *) flagPtr);
      }
      return result;
  }
***************
*** 479,484 ****
--- 494,507 ----
      int argc;                   /* Number of strings to concatenate. */
      char **argv;                /* Array of strings to concatenate. */
  {
+ }
+
+ char *
+ TclConcat(interp, argc, argv)
+     Tcl_Interp *interp;              /* Interpreter to use for accounting. */
+     int argc;                   /* Number of strings to concatenate. */
+     char **argv;                /* Array of strings to concatenate. */
+ {
      int totalSize, i;
      register char *p;
      char *result;
***************
*** 486,492 ****
      for (totalSize = 1, i = 0; i < argc; i++) {
        totalSize += strlen(argv[i]) + 1;
      }
!     result = malloc((unsigned) totalSize);
      for (p = result, i = 0; i < argc; i++) {
        (void) strcpy(p, argv[i]);
        p += strlen(argv[i]);
--- 509,518 ----
      for (totalSize = 1, i = 0; i < argc; i++) {
        totalSize += strlen(argv[i]) + 1;
      }
!     result = TclMalloc(interp, (unsigned) totalSize);
!     if (result == NULL) {
!       return NULL;
!     }
      for (p = result, i = 0; i < argc; i++) {
        (void) strcpy(p, argv[i]);
        p += strlen(argv[i]);
***************
*** 542,554 ****
      } else {
        length = strlen(string);
        if (length > TCL_RESULT_SIZE) {
!           iPtr->result = (char *) malloc((unsigned) length+1);
            iPtr->dynamic = 1;
        } else {
            iPtr->result = iPtr->resultSpace;
            iPtr->dynamic = 0;
        }
```

93/06/02
11:40:58

TCLDiffs

23

```
        strcpy(iPtr->result, string);
      }

      /*
--- 568,585 ----
      } else {
        length = strlen(string);
        if (length > TCL_RESULT_SIZE) {
!           iPtr->result = (char *) TclMalloc(interp, (unsigned) length+1);
            iPtr->dynamic = 1;
        } else {
            iPtr->result = iPtr->resultSpace;
            iPtr->dynamic = 0;
        }
+
+       if (iPtr->result == NULL) {
+       iPtr->result = "Exceeded allocation limit.";
+       } else {
        strcpy(iPtr->result, string);
+       }
      }

      /*
***************
*** 558,564 ****
      */

      if (wasDynamic) {
!       free(oldResult);
      }
  }
--- 589,595 ----
      */

      if (wasDynamic) {
!       TclFree(iPtr, oldResult);
      }
  }
```

93/06/02
11:40:58

TCLDiffs

24

```
***************
*** 739,751 ****
              size++;
          }
      }
!     argv = (char **) malloc((unsigned)
              ((size * sizeof(char *)) + (p - list) + 1));
      for (i = 0, p = ((char *) argv) + size*sizeof(char *);
              *list != 0; i++) {
          result = TclFindElement(interp, list, &element, &list, &elSize, &brace);
          if (result != TCL_OK) {
!             free((char *) argv);
              return result;
          }
          if (*element == 0) {
--- 770,786 ----
              size++;
          }
      }
      argv = (char **) TclMalloc(interp, (unsigned)
              ((size * sizeof(char *)) + (p - list) + 1));
+     if (argv == NULL) {
+         Tcl_Return(interp, "Exceeded allocation limit", TCL_STATIC);
+         return TCL_ERROR;
+     }
      for (i = 0, p = ((char *) argv) + size*sizeof(char *);
              *list != 0; i++) {
          result = TclFindElement(interp, list, &element, &list, &elSize, &brace);
          if (result != TCL_OK) {
!             TclFree(interp, (char *) argv);
              return result;
          }
          if (*element == 0) {
***************
*** 1034,1036 ****
--- 1069,1134 ----
      }
      return p;
  }
+
+ /*
+  *----------------------------------------------------------------------
+  *
+  * TclMalloc --
+  *
+  *     Like malloc but checks to see if allocation limit would be exceeded
+  *     before doing the allocation.
+  *
+  * Results:
+  *     The return value is a pointer to the allocated space or NULL if
+  *     the request cannot be satisfied.
+  *
+  * Side effects:
+  *     Of course.
+  *
+  *----------------------------------------------------------------------
+  */
+
+ char *
+ TclMalloc(interp, size)
+     Tcl_Interp *interp;
+     int size;
+ {
+     register Interp *iPtr = (Interp *) interp;
+     char *ptr;
+
+     if ((iPtr != NULL) && (iPtr->allocLimit > -1)
+       && (iPtr->allocCount + size > iPtr->allocLimit)) {
+       return NULL;
+       }
+     ptr = malloc(size);
+     if (iPtr != NULL) {
+       iPtr->allocCount = iPtr->allocCount + size;
+       }
+       return ptr;
+ }
+
```

08/071649

25

93/06/02
11:40:58

TCLDiffs

```
+ /*
+  *----------------------------------------------------------------------
+  *
+  * TclFree --
+  *
+  *     Currently, identical to free.
+  *     Should really credit the allocation limit with the amount of storage
+  *     freed.
+  *
+  * Results:
+  *     1 if succeeded, 0 if failed.
+  *
+  * Side effects:
+  *     Of course.
+  *
+  *----------------------------------------------------------------------
+  */
+
+ int
+ TclFree(interp, ptr)
+     Tcl_Interp *interp;
+     char *ptr;
+ {
+     return free(ptr);
+ }
```

What is claimed is:

1. In a computing system comprising a server, a client, and at least one intermediary, a method of processing an ultimate request to the server, the ultimate request being delivered to the server as the final request in a chain comprising at least two linked requests, the client and all the intermediaries each being associated with one linked request of the chain, the intermediary that delivers the ultimate request to the server being the final intermediary in the chain and being designated as the requestor, the method comprising the steps of:

using the requestor to present to the server the ultimate request in conjunction with at least one executable access control program comprising at least one sequence of computer program instructions, the access control program being executable by a processor to express a specification of a set of access rights;

using the server to execute each access control program thus presented, each access control program being executed in a manner such that said access control program is prevented from compromising server security; and if and only if the execution of each access control program thus presented is successful, using the server to execute the ultimate request in a manner consistent with the set of access rights, any access rights not in the set of access rights not being delegated to any intermediary nor being granted by the server.

2. In a system comprising a client, a server, and one or more intermediaries that the client does not trust, a plurality of communications channels that connect the client, the server, and the intermediaries, one or more computing nodes, and a communications network, a method for performing a request issued by an intermediary to the server on behalf of the client, the method comprising the steps of:

using the client to create a client request;

using the client to create an executable access control program, the access control program comprising at least one sequence of computer program instructions, the access control program being executable by a processor to express a specification of an arbitrary set of access rights to be delegated from the client to a first intermediary untrusted by the client, any access rights not in the set not being delegated to the first intermediary;

using the client to associate the access control program with the client request;

in response to the client request, using the first intermediary and zero or more additional intermediaries untrusted by the client to issue intermediary requests, all these intermediary requests being accompanied by the access control program;

receiving a final intermediary request in the server; and using the server to execute the access control program in order to determine whether or not to grant the final intermediary request, the access control program being executed in a manner such that the access control program is prevented from compromising server security.

3. In a system comprising a client, a server, a number of intermediaries, the number being greater than or equal to one, a plurality of communications channels that connect the client, the server, and the intermediaries, and computing hardware to execute the client, server, and intermediaries and to support the communication channels, a method for performing a client request issued by the client to a first intermediary, the method comprising the steps of:

using the client to create the client request;

using the client to create an executable access control program comprising at least one sequence of computer program instructions executable by a processor, the access control program being executable to express a specification of a set of access rights to be delegated from the client to the first intermediary, any access rights not in the set not being delegated to the first intermediary;

using the client to associate the access control program with the client request;

using the client and a communications channel from the client to the first intermediary to transmit the client request and its associated access control program from the client to the first intermediary;

using the first intermediary to generate a first intermediary request;

using the first intermediary and a communications channel to issue the first intermediary request and to transmit the access control program along with the first intermediary request thus issued;

using the server to receive a service request and the access control program;

using the server to make a determination whether the client approves the service request by performing a test that comprises the steps of:

using the server to execute the access control program, the access control program being executed in a manner such that the access control program is prevented from compromising server security; and using the server to check a value returned by the access control program thus executed; and if and only if the determination thus made by the server is that the client approves the service request, using the server to execute the service request, and otherwise using the server to deny the service request.

4. The method of claim 1 wherein the number of intermediaries is exactly one, wherein the first intermediary request and the service request are one and the same, wherein the communications channel used by the first intermediary to issue the first intermediary request connects the first intermediary directly with the server, such that when the first intermediary issues the first intermediate request, the first intermediate request is transmitted directly to the server.

5. The method of claim 3 wherein the access control program is a procedure that takes as parameters a caller, an operation being performed, and any arguments required for this operation, and that returns an indication of whether or not the operation is allowed.

6. The method of claim 3 additionally comprising the step of using the client to digitally sign the access control program with a digital signature associated with the client, and wherein the step of using the server to make a determination whether the client approves the service request further comprises an additional test of using the server to verify that the access control program bears a digital signature that is authentic and that is the client's.

7. The method of claim 3 wherein the step of creating an access control program is performed independently of the server.

8. The method of claim 3 wherein the step of creating an access control program is performed at run time contemporaneously with the step of creating the client request.

9. The method of claim 1 wherein the number of intermediaries is strictly greater than one, wherein the intermediaries are ordered in an order from first to last, and:

a) wherein the step of using the first intermediary and a communications channel to issue the first intermediary request and to transmit the access control program along with the first intermediary request thus issued further comprises the additional steps of:

for each intermediary except the last:

using the intermediary to choose a next intermediary;

using the intermediary to create an additional intermediary request;

using the intermediary to create an additional executable access control program comprising at least one additional sequence of computer program instructions executable by a processor, the additional access control program being executable to express a specification of a set of access rights to be delegated from the intermediary to the next intermediary, any access rights not in said set not being delegated to the next intermediary;

using the intermediary to associate the additional access control program with the additional intermediary request; and using the intermediary and a communications channel from the intermediary to the next intermediary to transmit the access control program, the intermediary request and its associated additional access control program, and all additional access control programs already created by other intermediaries, from the intermediary to the next intermediary;

b) wherein the step of using the server to receive a service request and the access control program further comprises the steps of:

using the last intermediary to generate the service request; and using the last intermediary to issue the service request to the server and to transmit the access control program and all additional access control programs created by other intermediaries to the server; and c) wherein the step of using the server to make a determination whether the client approves the service request further comprises using the server to make additional determinations whether all intermediaries except the last approve the service request by performing additional tests, one additional test for each intermediary except the last, each additional test comprising the steps of:

using the server to execute the additional access control program associated with the intermediary, said additional access control program being executed in a manner such that said additional access control program is prevented from compromising server security; and using the server to check a value returned by the additional access control program thus executed.

10. The method of claim 9 additionally comprising the step, executed for each intermediary except the last, of using the intermediary to digitally sign the additional access control program with a digital signature associated with the intermediary, and wherein each additional test performed during the step of using the server to make additional determinations whether all intermediaries except the last approve the service request further comprises the step of using the server to verify that the additional access control programs bear digital signatures that are authentic and that are the intermediaries'.

11. The method of claim 9 further comprising the step, performed for each intermediary except the last, of using the intermediary to designate an additional revocation object associated with a right to be delegated that is among the rights of the set of access rights of the specification of the additional access control program.

12. The method of claim 3 wherein the access control program is a computer program written in a programming language.

13. The method of claim 12 wherein the programming language is a Turing-complete language and wherein the access control program provides a functionality not providable by an access control program written in a language that is not Turing-complete.

14. The method of claim 13 wherein the programming language is an interpreted language and wherein the access control program is an interpreted program.

15. The method of claim 12 in which the programming language is an extension language and the server provides a core set of access control concepts, and wherein the access control program extends the core set of access control concepts provided by the server.

16. The method of claim 12 wherein the programming language includes control constructs and the server has state information that the server makes available to the access control program, and wherein the access control program includes multiple possible paths of execution and thereby provides a conditional access right that is conditioned on the state information thus made available.

17. The method of claim 3 further comprising the step, performed by a programmer, of using a template to specify portions of the access control program to be created by the client.

18. The method of claim 3 wherein the server is chosen from the group a file server, a database server, a print server, an input/output server, or a compute server.

19. The method of claim 3 wherein the client is a user command process associated with a user, the first intermediary is an untrusted program, and the server is an operating system in the context of which the user command process executes and the untrusted program is to be executed.

20. The method of claim 3 wherein the at least one sequence of computer program instructions is a sequence of computer program instructions executable by a processor after conversion into a machine-executable form, and further comprising the step of converting the sequence of computer program instructions into the machine-executable form.

21. The method of claim 20 wherein the converting step comprises interpreting the sequence of computer program instructions with a safe interpreter.

22. The method of claim 20 wherein the at least one sequence of computer program instructions is a sequence of computer program instructions written in an interpreted programming language, and wherein the converting step comprises interpreting the sequence of computer program instructions.

23. The method of claim 3 wherein the at least one sequence of computer program instructions is a sequence of computer program instructions directly executable by a processor.

24. The method of claim 3 wherein the step of using the server to execute the access control program in a manner such that the access control program is prevented from compromising server security comprises accessing server resources with the access control program only in a manner in which the client would be authorized to access the server.

25. The method of claim 3 wherein the step of using the server to execute the access control program in a manner such that the access control program is prevented from compromising server security comprises invoking with the access control program only server system operation having no undesired side effects, regardless of whether the server grants or denies access.

26. In a system comprising a client, a server, a number of intermediaries, the number being greater than or equal to one, a plurality of communications channels that connect the client, the server, and the intermediaries, and computing hardware to execute the client, server, and intermediaries and to support the communication channels, a method for performing a client request issued by the client to a first intermediary, the method comprising the steps of:

using the client to create the client request;

using the client to create an executable access control program, the access control program encoding a specification of a set of access rights to be delegated from the client to the first intermediary;

using the client to digitally sign the access control program with a digital signature associated with the client;

using the client to associate the access control program with the client request;

using the client and a communications channel from the client to the first intermediary to transmit the client request and its associated access control program from the client to the first intermediary;

using the first intermediary to generate a first intermediary request;

using the first intermediary and a communications channel to issue the first intermediary request and to transmit the access control program along with the first intermediary request thus issued;

using the server to receive a service request and the access control program;

using the server to make a determination whether the client approves the service request by performing a test that comprises the steps of using the server to execute the access control program, and using the server to check a value returned by the access control program thus executed, performing an additional test comprising the step of using the server to verify that the access control program bears a digital signature that is authentic and that is the client's, and performing two further additional tests of using the server to verify the identity of the first intermediary, and using the server to verify that the client has the rights that it purports to delegate via the access control program; and if and only if the determination thus made by the server is that the client approves the service request, using the server to execute the service request, and otherwise using the server to deny the service request.

27. In a system comprising a client, a server, a number of intermediaries, the number being greater than or equal to one, a plurality of communications channels that connect the client, the server, and the intermediaries, and computing hardware to execute the client, server, and intermediaries and to support the communication channels, and additionally comprising an authentication server, an additional communications channel between the authentication server and the client, and computing hardware to execute the authentication server and the additional communications channel, a method for performing a client request issued by the client to a first intermediary, the method comprising the steps of:

using the client to create the client request;

using the client to create an executable access control program, the access control program encoding a specification of a set of access rights to be delegated from the client to the first intermediary;

using the client to associate the access control program with the client request;

using the client to request an authentication ticket;

using the additional communications channel to transmit the request for the authentication ticket to the authentication server;

using the authentication server to issue an authentication ticket;

using the additional communications channel to transmit the authentication ticket to the client;

using the client and a communications channel from the client to the first intermediary to transmit the client request and its associated access control program from the client to the first intermediary;

using the first intermediary to generate a first intermediary request;

using the first intermediary and a communications channel to issue the first intermediary request and to transmit the access control program along with the first intermediary request thus issued;

using the server to receive a service request and the access control program;

using the server to make a determination whether the client approves the service request by performing a test that comprises the steps of using the server to execute the access control program, and using the server to check a value returned by the access control program thus executed; and if and only if the determination thus made by the server is that the client approves the service request, using the server to execute the service request, and otherwise using the server to deny the service request.

28. The method of claim 27 wherein the additional communications channel is a secure channel.

29. The method of claim 27 wherein the step of using the server to make a determination whether the client approves the first intermediary request further comprises an additional test of using the server in conjunction with the authentication server and a channel between the server and the authentication server to verify that the access control program is authentic and is the client's.

30. The method of claim 29 wherein the channel between the server and the authentication server is a secure channel.

31. In a system comprising a client, a server, a number of intermediaries, the number being greater than or equal to one, a plurality of communications channels that connect the client, the server, and the intermediaries, and computing hardware to execute the client, server, and intermediaries and to support the communication channels, a method for performing a client request issued by the client to a first intermediary, the method comprising the steps of:

using the client to create the client request;

using the client to create an executable access control program, the access control program encoding a specification of a set of access rights to be delegated from the client to the first intermediary;

using the client to associate the access control program with the client request;

using the client and a communications channel from the client to the first intermediary to transmit the client request and its associated access control program from the client to the first intermediary;

using the first intermediary to generate a first intermediary request;

using the first intermediary and a communications channel to issue the first intermediary request and to transmit the access control program along with the first intermediary request thus issued;

using the server to receive a service request and the access control program;

using the server to make a determination whether the client approves the service request by performing a test that comprises the steps of using the server to execute the access control program, and using the server to check a value returned by the access control program thus executed;

if and only if the determination thus made by the server is that the client approves the service request, using the server to execute the service request, and otherwise using the server to deny the service request;

using the client to designate a revocation object at the server associated with a right to be delegated that is encoded in the specification of the access control program;

if and only if the server executes the service request, using the server to test for the existence of the revocation object thus designated; and if and only if the server finds that the revocation object exists, using the server to grant the delegated right associated with the revocation object, and otherwise using the server to deny the delegated right associated with the revocation object.

32. The method of claim 31 further comprising the step of using the client to revoke the right associated with the revocation object by eliminating the revocation object prior to the server's execution of the service request.

33. The method of claim 31 wherein the server is a file server and the revocation object is a file stored by the server.

34. The method of claim 31 wherein the client designates the revocation object independently of the server.

35. The method of claim 31 wherein the client designates the revocation object at run time contemporaneously with the step of creating the client request.

36. In a distributed file system comprising a plurality of nodes, each node comprising a processor and memory, a plurality of processes including at least one client, at least one file server, and at least one intermediary, each process executing on its own unique node, and a plurality of communications channels that connect the processes to one another, a method for performing a client request issued by the client to the intermediary, the method comprising the steps of:

using the client to create the client request;

using the client to create an executable access control program, the access control program encoding a specification of a set of access rights to be delegated from the client to the intermediary;

using the client to digitally sign the access control program;

using the client to associate the access control program thus digitally signed with the client request;

using the client and a communications channel from the client to the intermediary to transmit the client request and its associated access control program from the client to the intermediary;

using the intermediary to generate an intermediary request;

using the intermediary and a communications channel to issue the intermediary request and to transmit the access control program along with the intermediary request thus issued;

using the server to receive a service request and the access control program;

using the server to make a determination whether the access control program is valid by performing a test that comprises the steps of:

using the server to verify that the access control program bears a digital signature that is authentic and that is the client's;

using the server to verify the identity of the first intermediary; and using the server to verify that the client has the rights that it purports to delegate via the access control program;

if and only if the server thus determines that the access control program is valid, using the server to make a determination whether the client approves the service request by performing a test that comprises the steps of:

using the server to execute the access control program; and using the server to check a value returned by the access control program thus executed; and if and only if the determination thus made by the server is that the client approves the service request, using the server to execute the service request, and otherwise using the server to deny the service request.

* * * * *